(12) United States Patent
Inoue et al.

(10) Patent No.: US 7,803,449 B2
(45) Date of Patent: Sep. 28, 2010

(54) OPTICAL FILM AND PROCESS FOR PRODUCTION THE SAME, ANTIREFLECTION FILM AND PROCESS FOR PRODUCTION THE SAME, POLARIZING PLATE INCLUDING THE FILM, LIQUID CRYSTAL DISPLAY DEVICE INCLUDING THE POLARIZING PLATE, AND LIQUID CRYSTAL DISPLAY DEVICE

(75) Inventors: Katsumi Inoue, Minami-Ashigara (JP); Tetsuya Asakura, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 702 days.

(21) Appl. No.: 11/497,271

(22) Filed: Aug. 2, 2006

(65) Prior Publication Data
US 2007/0030430 A1      Feb. 8, 2007

(30) Foreign Application Priority Data
Aug. 2, 2005    (JP) .......................... P.2005-223979

(51) Int. Cl.
*B32B 3/00*     (2006.01)
*G02B 27/00*    (2006.01)

(52) U.S. Cl. ........................ 428/141; 428/143; 428/147; 264/165; 359/599; 359/601; 349/137

(58) Field of Classification Search ................. 428/141, 428/143, 147; 264/165; 359/599, 601; 349/137
See application file for complete search history.

(56) References Cited

U.S. PATENT DOCUMENTS

| | | | |
|---|---|---|---|
| 6,343,865 B1 | 2/2002 | Suzuki | |
| 6,577,756 B1 | 6/2003 | Furui | |
| 2004/0240070 A1 | 12/2004 | Suzuki et al. | |
| 2005/0157407 A1 | 7/2005 | Nishida et al. | |

FOREIGN PATENT DOCUMENTS

| | | |
|---|---|---|
| JP | 11-326608 A | 11/1999 |
| JP | 2000-304648 A | 11/2000 |
| JP | 3507719 B2 | 3/2004 |
| WO | WO 03/100477 A1 | 12/2003 |

*Primary Examiner*—William P Watkins, III
(74) *Attorney, Agent, or Firm*—Buchanan Ingersoll & Rooney PC

(57) ABSTRACT

An optical film comprising a transparent support and a layer having internal scattering properties, wherein the optical film has an image sharpness, as measured in an optical comb width of 0.5 mm in conformity to JIS K7105, of from 30.0% to 99.9%, a haze value as caused by surface scattering of less than 3%, and a haze value as caused by internal scattering of from 15 to 40%.

21 Claims, 7 Drawing Sheets

OPTICAL FILM AND PROCESS FOR PRODUCTION THE SAME, ANTIREFLECTION FILM AND PROCESS FOR PRODUCTION THE SAME, POLARIZING PLATE INCLUDING THE FILM, LIQUID CRYSTAL DISPLAY DEVICE INCLUDING THE POLARIZING PLATE, AND LIQUID CRYSTAL DISPLAY DEVICE

FIELD OF THE INVENTION

The present invention relates to an optical film, to an antireflection film (one example of an optical film), to a polarizing plate and to an image display device. In more detail, the invention relates to an antireflection film having a layer having internal scattering properties and a low refractive index layer, which is substantially free from white blurring in a bright room and is good in contrast in a bright room and which when used for the surface of a liquid display device, is able to improve the contrast in an oblique direction without reducing the front contrast; to a polarizing plate including the antireflection film as a surface protective film; and to an image display device including the antireflection film polarizing plate.

BACKGROUND OF THE INVENTION

In general, in display devices such as CRT, a plasma display (PDP), an electroluminescence display (ELD), and a liquid crystal display device (LCD), for the purpose of preventing reflection of an image due to the reflection of external light, an antireflection film is disposed on the outermost surface of a display. In the antireflection film, by forming a low refractive index layer on the surface of the film, the reflectance of the surface is reduced, thereby reducing reflection of an image onto the surface. In addition, for the purpose of reducing reflection on the surface, there is known an antiglare antireflection film utilizing a phenomenon in which irregularities are formed on the surface and an image as reflected onto the surface is blurred by utilizing surface scattering due to the irregularities. Furthermore, the antireflection film includes a film having internal scattering properties other than the surface scattering properties. In particular, in the case where an antireflection film having strong antiglare properties for the purpose of reducing the reflection, in recent years, following the progress of high definition of display devices, fine luminance unevenness as caused due to surface irregularities of the antireflection film (named as "glare") has become problematic. As means for improving this problem, there are disclosed technologies regarding an antiglare film having high internal scattering properties in addition to surface scattering (see U.S. Pat. No. 6,343,865 (corresponding to Japanese Patent 3507719)).

As disclosed in U.S. Publication 2005/063062 (corresponding to JP-A-2003-270409) and so on, in the case where a light scattering film is used in the uppermost surface of a display device, it is known that a film having not only an effect for suppressing the surface reflection of external light in a bright room but also an antireflection function is preferable.

In recent years, markets of application to a display device having a large screen represented by liquid crystal television sets and the like are rapidly expanding. In such an application, the display device is used in a bright room in high frequency. In the case where a conventional film having an antiglare layer is applied on the surface of a display device, it has become problematic that the surface shines whitely as a whole in a bright room (hereinafter referred to as "white blurring").

Also, recently, an antiglare film having high internal scattering properties, which is improved in the foregoing glare, has been used in this application. However, since there is caused a problem that the high internal scattering properties lower the contrast which a display device originally possesses, the antiglare film is not always optimum to this application. Also, U.S. Publication 2001/043302 (corresponding to Japanese Patent 3602438) discloses a technology in which color reproducibility of a liquid crystal display device having a polarizer and a retardation compensating element is improved by providing an antiglare layer having a specific haze value in an observer side of the liquid crystal device. However, U.S. Publication 2001/043302 (corresponding to Japanese Patent 3602438) does not describe the front contrast and the contrast in an oblique direction of the display device. Furthermore, U.S. Publication 2001/043302 (corresponding to Japanese Patent 3602438) does not describes the surface reflectance and the surface haze of the film, is not sufficient with respect to classification between an internal haze and a surface haze, and does not sufficiently describe improvements in an image display performance in a bright room.

SUMMARY OF THE INVENTION

In summary, it is the present state that there has not been proposed yet an antireflection film which is able to simultaneously achieve reduction of reflection and prevention of white blurring of an image, bright room contrast and when applied in an image display device, an improvement in the contrast in an oblique direction while controlling reduction of the front contrast to a level at which no problem is caused.

Accordingly, an object of the invention is to provide an antireflection film which has high antireflection properties and prevents white blurring from occurring and which when used in an image display device, is satisfactory with respect to the front contrast and the contrast in an oblique direction. Also, another object of the invention is to provide the foregoing antireflection film in high productivity.

In order to overcome the foregoing problems, the present inventors made extensive and intensive investigations. As a result, it has been found that the foregoing problems can be solved and the foregoing objects can be achieved by the following configurations (1) to (21), leading to accomplishment of the invention.

That is, the invention has achieved the foregoing objects according to the following configurations.

Configuration (1) An optical film comprising a transparent support and a layer having internal scattering properties, wherein the optical film has an image sharpness, as measured in an optical comb width of 0.5 mm in conformity to JIS K7105, of from 30.0% to 99.9%, a haze value as caused by surface scattering of less than 3%, and a haze value as caused by internal scattering of from 15 to 40%.

(2) An antireflection film comprising a transparent support, a layer having internal scattering properties and a low refractive index layer in this order, wherein the low refractive index layer has a refractive index of at least 0.04 lower than a refractive index of the layer having internal scattering properties; and the antireflection film has an integral reflectance of not more than 3.5%, an image sharpness, as measured in an optical comb width of 0.5 mm in conformity to JIS K7105, of from 30.0% to 99.9%, a haze value as caused by surface scattering of less than 3%, and a haze value as caused by internal scattering of from 15 to 40%.

(3) The antireflection film as set forth in the item (2), wherein the antireflection film has a mirror reflectance of 0.5% or more and not more than 3.3%.

(4) The antireflection film as set forth in the item (1), (2) or (3), wherein the antireflection film has a center line mean roughness Ra of from 0.01 to 0.25 μm and a ten-point mean roughness Rz of five times or more of Ra.

(5) The antireflection film as set forth in any one of the items (2) to (4), wherein the antireflection film has a center line mean roughness Ra of from 0.01 to 0.12 μm and an image sharpness, as measured in an optical comb width of 0.5 mm in conformity to JIS K7105, of from 45.0% to 90.0%; and a quantity of reflected light $I^{45°}$ in a direction inclined at +45° to a quantity of incident light $I_0$ as inclined at −60° against a vertical direction from the low refractive index layer side is satisfied with the following expression (A1).

$$-\mathrm{LOG}_{10}(I^{45°}/I_0) \geq 4.3 \qquad \text{Expression (A1)}$$

(6) The antireflection film as set forth in any one of the items (1) to (4), wherein the antireflection film has a center line mean roughness Ra of from 0.01 to 0.08 μm and an image sharpness, as measured in an optical comb width of 0.5 mm in conformity to JIS K7105, of from 75.0% to 99.0%; and a quantity of reflected light $I^{45°}$ in a direction inclined at +45° to a quantity of incident light $I_0$ as inclined at −60° against a vertical direction from the low refractive index layer side is satisfied with the following expression (A1').

$$-\mathrm{LOG}_{10}(I^{45°}/I_0) \geq 4.5 \qquad \text{Expression (A1')}$$

(7) The antireflection film as set forth in any one of the items (1) to (6), wherein the layer having internal scattering properties contains a translucent resin and at least one kind of a translucent particle and has a thickness of from 3 μm to 12 μm; the translucent particle has a particle size of from 3 to 4 μm and is contained in an amount of from 5 to 30% by weight of the whole of solids contained in the layer having internal scattering properties; the translucent resin has a refractive index falling within the range of 1.52±0.02; and 30% or more of the translucent particle has a difference in refractive index from the translucent resin of 0.008 or more and not more than 0.05.

(8) The antireflection film as set forth in any one of the item (7), wherein a density of a translucent particle is from 0.8 to 3.2 g/m².

(9) The antireflection film as set forth in the item (7) or (8), wherein the translucent particle having a difference in refractive index from the translucent resin of 0.008 or more and not more than 0.05 is made of a crosslinked poly(styrene-acryl) copolymer or a crosslinked acrylic resin and has a mole fraction of acryl component of from 20 to 100% by weight.

(10) The antireflection film as set forth in any one of the items (1) to (9), wherein the layer having internal scattering properties is formed by coating a coating composition containing a translucent resin, a translucent fine particle and plural kinds of solvents on a transparent support, followed by drying and hardening.

(11) The antireflection film as set forth in any one of the items (2) to (10), wherein the low refractive index layer is a hardened film formed by coating a hardenable composition containing at least two members of (A) a thermally hardenable and/or ionizing radiation hardenable fluorine-containing compound, (b) an inorganic fine particle, and (C) at least one member selected from an organosilane compound represented by the following formula (1), a hydrolyzate of the organosilane, and a partial condensate of the hydrolyzate of the organosilane, followed by hardening.

$$(R^{10})_m-Si(X)_{4-m} \qquad \text{Formula (1)}$$

In the formula (1), $R^{10}$ represents a substituted or unsubstituted alkyl group or a substituted or unsubstituted aryl group; X represents a hydroxyl group or a hydrolyzable group; and m, represents an integer of from 1 to 3.

(12) The antireflection film as set forth in the item (11), wherein the thermally hardenable and/or ionizing radiation hardenable fluorine-containing compound contains a fluorine atom in an amount in the range of from 35 to 80% by weight.

(13) The antireflection film as set forth in the item (11) or (12), wherein the inorganic fine particle is an inorganic fine particle having an average particle size of 10% or more and not more than 100% of a thickness of the low refractive index layer.

(14) The antireflection film as set forth in any one of the items (11) to (13), wherein the inorganic fine particle is an inorganic fine particle having a hollow structure within the particle thereof and has a refractive index of from 1.17 to 1.40.

(15) The antireflection film as set forth in any one of the items (1) to (14), wherein both the layer having internal scattering properties and the low refractive index layer are a hardened film formed by coating a hardenable coating composition containing a hydrolyzate of an organosilane represented by the formula (1) and/or a partial condensate thereof, followed by hardening.

(16) The antireflection film as set forth in any one of the items (1) to (15), wherein the antireflection film has a transparent conductive layer between the layer having internal scattering properties and the transparent support, or between the layer having internal scattering properties and the low refractive index layer.

(17) The antireflection film as set forth in any one of the items (1) to (16), wherein the antireflection film has a transparent conductive layer between the layer having internal scattering properties and the transparent support and/or contains a conductive particle within the layer having internal scattering properties.

(18) A polarizing plate comprising a polarizing film and two protective films for protecting both surfaces of the front side and rear side of the polarizing film, wherein at least one of the two protective films is the antireflection film as set forth in any one of the items (1) to (17).

(19) The polarizing plate as set forth in the item (18), wherein one of the two protective films is the antireflection film as set forth in any one of the items 1 to 17, and the other is an optical compensating film.

(20) An image display device containing at least one sheet of the antireflection film as set forth in any one of the items (1) to (17) or the polarizing plate as set forth in the item (18) or (19).

(21) A liquid crystal display device having a polarizer on the both surfaces of a liquid crystal cell and having at least one sheet of a retardation compensating element between the liquid crystal cell and the polarizer, wherein the liquid crystal display device has the antireflection film as set forth in any one of the items (1) to (17) on the surface thereof

(22) A process for producing the antireflection film as set forth in any one of the items (1) to (17), which includes a step for coating a coating composition for a layer having internal scattering properties, which contains a translucent particle, a translucent resin and a solvent, and/or a coating composition for a low refractive index layer, and/or a coating composition for a transparent conductive layer from a slot of a tip lip while making a land of the tip lip of a slot die close to the surface of a web of a continuously running transparent support as supported by a backup roll, thereby applying the layer having internal scattering properties and/or the low refractive index layer on the transparent support.

According to the invention, it is possible to provide an antireflection film which is simultaneously satisfied with high antireflection properties and reduction of white blurring and which when used in an image display device, is satisfactory with respect to the front contrast and the contrast in an oblique direction. In addition, it is possible to provide the foregoing antireflection film in high productivity.

DETAILED DESCRIPTION OF THE INVENTION

The invention will be hereunder described in more detail. Incidentally, in this specification, in the case where a numeral value exhibits a physical property value, a characteristic value or the like, the terms "from (numeral value 1) to (numeral value 2)" means "(numeral value 1) or more and not more than (numeral value 2)". Also, in this specification, the term "(meth)acrylate" means "at least one of acrylate and methacrylate". The same is also applicable to "(meth)acrylic acid" and so no.

With respect to the antireflection film of the invention, a basic configuration as one preferred embodiment thereof will be hereunder described with reference to the accompanying drawings.

Figure 1:
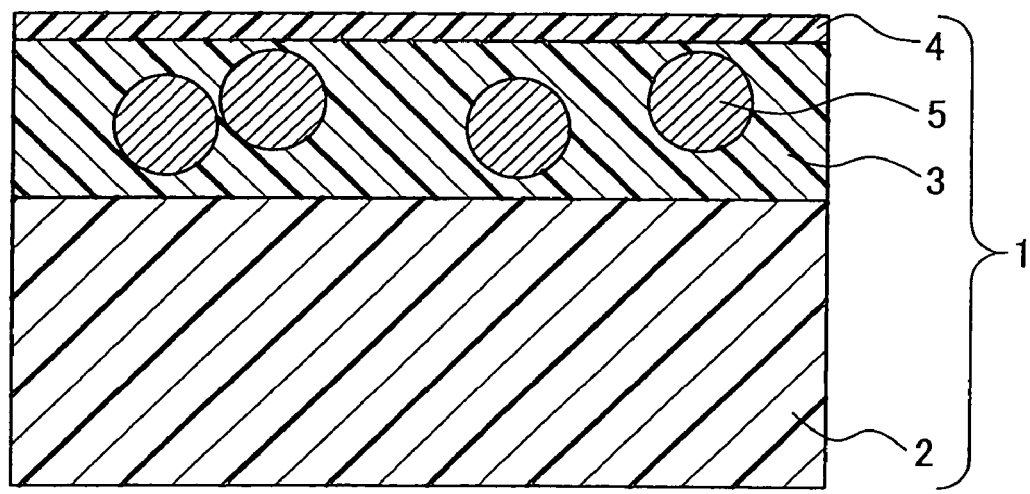
FIG. 1 is a cross-sectional view to schematically show one preferred embodiment of the antireflection film of the invention.

Here, FIG. 1 is a cross-sectional view to schematically show one preferred embodiment of the antireflection film of the invention.

An antireflection film 1 of the present embodiment as illustrated in FIG. 1 is composed of a transparent support 2, an internal scattering layer 3 formed on the transparent support 2, and a low refractive index layer 4 formed on the internal scattering layer 3. By forming the low refractive index layer 4 in a thickness of approximately ¼ of the wavelength of light on the internal scattering layer 3, it is possible to reduce the surface reflection by a principle of thin film interference. In the invention, even if the low refractive index layer is not provided, the white blurring may be improved, but, in order to obtain sufficient effect, it is preferable to provide the low refractive index layer.

The internal scattering layer 3 is a layer having internal scattering properties and is composed of a translucent resin and a translucent particle 5 dispersed in the translucent resin. It is preferable that the layer 3 having internal scattering properties has hard coat properties. In the present embodiment, though the layer having internal scattering properties is formed of a single layer, it may be configured by plural layers of, for example, from two layers to four layers.

Furthermore, for the antistatic purpose, it is desired that a transparent conductive layer is provided between the layer 3 having internal scattering properties and the transparent support 2, or between the layer 3 having internal scattering properties and the low refractive index layer 4; and it is especially desired that a transparent conductive layer is provided between the layer 3 having internal scattering properties and the transparent support 2. Furthermore, it is especially effective for the antistatic purpose that not only a transparent conductive layer is provided between the layer 3 having internal scattering properties and the transparent support 2, but also a conductive particle is present within the layer 3 having internal scattering properties. Furthermore, in addition to the transparent conductive layer, a functional layer such as a moisture-proof layer may be provided between the layer 3 having internal scattering properties and the transparent support 2.

It is preferable that the refractive indexes of the respective layers which constitute the antireflection film of the invention meet the following relationship.

(Refractive index of internal scattering layer)>(Refractive index of transparent support)>(Refractive index of low refractive index layer)

Furthermore, since the invention is aimed to provide an antireflection film which is especially excellent with respect to the reduction of white blurring in a bright room and the improvement in contrast, it is necessary to suppress the effect for preventing reflection utilizing surface scattering. Accordingly, it is necessary to thoroughly achieve the reduction of reflection due to the reduction of an integral reflectance. For that reason, a difference (na−nb) between a refractive index (na) of the internal scattering layer and a refractive index (nb) of the low refractive index layer must be 0.04 or more. This difference in refractive index therebetween is preferably 0.05 or more and not more than 0.35, more preferably 0.07 or more and not more than 0.35, still more preferably 0.10 or more and not more than 0.35, and further preferably 0.17 or more and not more than 0.30. When the difference in refractive index therebetween is too small, the reflectance cannot be sufficiently lowered, and the reflection of a reflected image onto the surface cannot be sufficiently prevented. On the other hand, when the difference in refractive index is too large, there are generated adverse influences such that the strength of the film is weak and that the color taste is strong. For the purpose of obtaining a specific difference in refractive index, there are two methods inclusive of a method of increasing a refractive index of the internal scattering layer and a method of decreasing a refractive index of the low refractive index. All of these methods can be employed. However, it is more preferred to make the refractive index of the internal scattering layer fall within the range of from 1.50 to 1.54 as described later. Accordingly, in order to more increase the difference in refractive index, it is preferred to lower the refractive index of the low refractive index layer. Even when the difference in refractive index is the same, from the viewpoint of reducing the color taste, it is preferable that the refractive index of the low refractive index layer is lower.

The refractive index (na) of the internal scattering layer is preferably 1.50 or more, more preferably 1.50 or more and not more than 1.70, and further preferably 1.50 or more and not more than 1.65. By increasing the refractive index of the internal scattering layer to a specific value or more, the difference in refractive index from the low refractive index layer can be increased, whereby it becomes possible to reduce the reflectance. However, what the refractive index is excessively increased is not preferable because a difference in refractive index between the translucent particle and the translucent resin becomes too large, and an internal haze value becomes too large. Furthermore, such is not preferable because a raw material which can be used is limited, leading to high costs. Accordingly, the refractive index (na) of the internal scattering layer is especially desirably from 1.50 to 1.54. Incidentally, in the invention, the refractive index of the internal scattering layer is a value as determined from a refractive index of a coating film containing solids from which the translucent particle is excluded.

Figure 2:
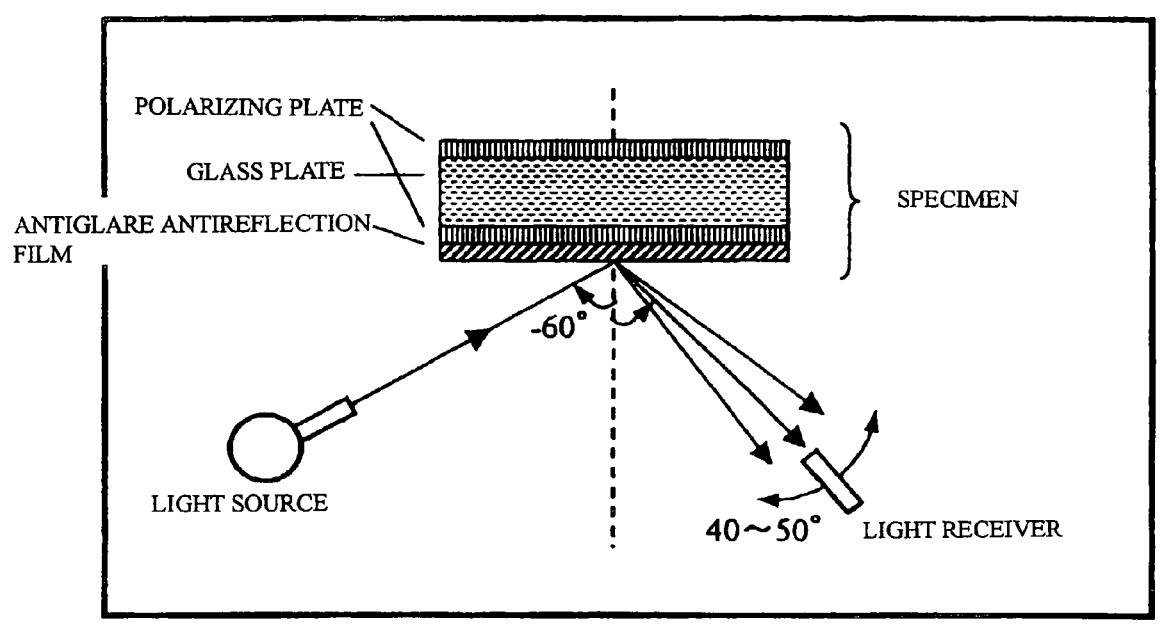
FIG. 2 is an outline view of a device for a quantity of reflected light in a direction of 40 to 50° when the light is made incident from a direction of −60° of the antireflection film of the invention.

In the antireflection film of the invention, it is desired that a quantity of reflected light $I^{45°}$ in a direction inclined at $+45°$ to a quantity of incident light $I_0$ as inclined at $-60°$ against a vertical direction from the low refractive index layer side is satisfied with the foregoing expression (A1). FIG. 2 is an outline view of an optical system for measuring such a scattering characteristic. As illustrated in FIG. 2, a direction vertical from the surface of an antireflection film is defined as $0°$; and a counterclockwise direction against this vertical direction is defined as "minus", whereas a clockwise direction against the vertical direction is defined as "plus". In the expression (A1), $I_0$ represents a quantity of incident light as inclined at $-60°$ towards the low refractive index layer of the antireflection film. The quantity of incident light can be adjusted by a light source.

On the other hand, a light receiver is disposed in a direction of $45°$, and a quantity of reflected light $I^{45°}$ as measured by the light receiver is defined as $I^{45°}$. As a device for the foregoing measurement, for example, "GoniophotoMeter" as manufactured by Murakami color Research Laboratory Co., Ltd. can be employed.

Incidentally, in FIG. 2, for the purpose of bringing it close to the black display condition of a display device, $I_0$ and $I^{45}$ are measured in a state that an antireflection film is stuck to a polarizing plate. However, the measurement may be carried out in such a manner that the opposite surface to the surface on which an antireflection layer is present as an antireflection film alone is treated with a black ink, thereby making it free from reflection on the back surface.

It is meant that the larger the value of $-LOG_{10}(I^{45°}/I_0)$ in the expression (A1), the smaller the scattered light in the $45°$ direction is, and in visually seeing from the $45°$ direction, the white blurring becomes good. As expressed in the expression (A1), the value of $-LOG_{10}(I^{45°}/I_0)$ is preferably 4.3 or more, and more preferably 4.5 or more. When the value of $-LOG_{10}(I^{45°}/I_0)$ is less than 4.3, the white blurring in a bright room is not sufficient with respect to the desired level of the invention.

Furthermore, the antireflection film preferably has a haze as caused due to surface scattering (hereinafter named as "surface haze") of less than 3%, more preferably not more than 2%, still more preferably not more than 1.5%, and especially preferably not more than 1.0%. When the surface haze exceeds 3%, the white blurring in a bright room is not sufficient with respect to the desired level of the invention.

Furthermore, the antireflection film preferably has a haze as caused due to internal scattering (hereinafter named as "internal haze") of from 15% to 40%, and more preferably from 20% to 32%. When the internal haze is low, while a lowering of the front contrast is hardly caused, an effect for improving the contrast in an oblique direction is low. When the internal haze exceeds 40%, there is some possibility that deterioration of the contrast or blurring of an image is caused.

Furthermore, the antireflection film must have an integral reflectance of not more than 4.6%. In the invention, since scattering due to the surface irregularities is suppressed for the purpose of reducing the white blurring, the reflectance is reduced for the purpose of preventing reflection from occurring, so that sufficient effect can be obtained. Accordingly, the integral reflectance is preferably not more than 3.5%, more preferably not more than 2.5%, still more preferably not more than 2.0%, and especially preferably not more than 1.5%. The antireflection film of the invention preferably has a mirror reflectance of not more than 3.3%, more preferably not more than 3.0%, still more preferably not more than 2.0%, further more preferably not more than 1.7%, and especially preferably not more than 1.4%. What the antireflection film of the invention has a transmittance of 90% or more is preferable because reflection of external light can be suppressed, reflection of an image onto the surface can be reduced, and visibility is improved.

What the antireflection film of the invention has an image sharpness, as measured in an optical comb width of 0.5 mm in conformity to JIS K7105, of from 30% to 99.9% is preferable because the white blurring can be sufficiently prevented from occurring. The image sharpness is more preferably from 45% to 99.9%, and further preferably from 65 to 99.9%.

Furthermore, what a ratio between a minimum value and a maximum value of a reflectance within the ranges of from $-2$ to 2 for the a* value and from $-3$ to 3 for the b* value at from 380 nm to 780 nm with respect to a color taste of reflected light in a CIE1976 L*, a* and b* color space under a C light source is from 0.5 to 0.99 is preferable because the color taste of reflected light becomes neutral. Furthermore, what the b* value of transmitted light under a C light source is from 0 to 3 is preferable because when applied to a display device, a yellow taste of the white display is reduced.

In addition, for the purpose of reducing the white blurring due to the surface irregularities, it is preferred to design the antireflection film of the invention so as to have a center line mean roughness Ra of from 0.01 to 0.25 μm and a ten-point mean roughness Rz of five times or more of Ra with respect to its surface irregular shape. The Ra is more preferably from 0.01 to 0.15 μm and further more preferably from 0.01 to 0.12 μm. In the case of attaching importance to an effect for preventing reflection from occurring, the Ra is preferably 0.05 μm or more, and more preferably 0.05 to 0.08 μm. According to a general production method, it is difficult to control the Ra to not more than 0.01 μm. When the Ra exceeds 0.15 μm, there may possibly be caused problems such as glare and white blurring.

Next, the internal scattering layer of the antireflection film will be described.

[Internal Scattering Layer]

The internal scattering layer is formed for the purpose of imparting to a film internal scattering properties and preferably hard coat properties for improving scar resistance of the film. Accordingly, the internal scattering layer preferably contains a translucent resin capable of imparting hard coat properties, a translucent fine particle for the purpose of imparting internal scattering properties and a solvent.

(Translucent Fine Particle)

The translucent fine particle preferably has an average particle size of from 0.5 to 10 μm, more preferably from 2.0 to 6.0 μm, and further preferably from 3.0 to 4.0 μm. When the average particle size is less than 0.5 μm, since light scattering angle distribution spreads to a wide angle, letter blurring of a display is caused, and therefore, such is not preferable. On the other hand, when it exceeds 10 μm, there are caused problems such that the thickness of the internal scattering layer must be thickened; that curl becomes large; and that the raw material costs increase.

Specific examples of the translucent fine particle which can be preferably used include resin particles such as a poly((meth)acrylate) particle, a crosslinked poly((meth)acrylate) particle, a polystyrene particle, a crosslinked polystyrene particle, a crosslinked poly(acryl-styrene) particle, a melamine particle, and a benzoguanamine particle. Of these, a crosslinked polystyrene particle, a crosslinked ((meth)acrylate) particle, and a crosslinked poly(acryl-styrene) particle are especially preferably used. By adjusting the refractive index of the translucent resin adaptive to the refractive index of each of the translucent fine particles as selected among these particles, it is possible to make each of the internal haze and the surface haze fall within a desired range. By adjusting a combination and each of addition amounts of the translucent resin, the translucent fine particle and the solvent of a coating composition, it is possible to make the center line mean roughness fall within a desired range.

Concretely, in the case where a translucent resin composed of, as the major component, a trifunctional or polyfunctional (meth)acrylate monomer (refractive index after hardening: 1.50 to 1.54) which is preferably used in the internal scattering layer as described later is used, it is preferred to combine it with a translucent fine particle made of a crosslinked poly(meth)acrylate polymer having an acryl content of from 20 to 100% by weight. A combination of the foregoing translucent resin with a translucent fine particle made of a crosslinked poly(styrene-acrylate)copolymer (refractive index: 1.48 to 1.58) is especially preferable.

The "translucent resin composed of, as the major component, a trifunctional or polyfunctional (meth)acrylate monomer" as referred to herein means that a repeating unit composed of a trifunctional or polyfunctional (meth)acrylate monomer is contained in an amount of from 50 to 100% by weight in the translucent resin. The content of the repeating unit composed of a trifunctional or polyfunctional (meth)acrylate monomer is preferably from 60 to 100% by weight.

Furthermore, two or more kinds of translucent fine particles having a different particle size may be used together.

It is preferable that the foregoing translucent particle is blended such that it is contained in an amount of from 5 to 30% by weight in the whole of solids of the internal scattering layer in the formed internal scattering layer. The amount of the translucent particle is more preferably from 8 to 25% by weight, and further preferably from 8 to 15% by weight. When the amount of the translucent particle is less than 5% by weight, the internal scattering properties are insufficient, whereas when it exceeds 30% by weight, problems such as blurring of an image, cloudiness of surface, and glare are caused.

Furthermore, the translucent fine particle preferably has a density of from 0.8 to 3.2 $g/m^2$, and more preferably from 0.9 to 2.8 $g/m^2$.

It is preferable that the refractive index of each of the translucent resin and the translucent fine particle falls within the foregoing range. Furthermore, a difference in refractive index between the translucent resin and the translucent fine particle [(refractive index of translucent fine particle)−(refractive index of translucent resin)] is preferably from 0.008 to 0.15, and more preferably from 0.01 to 0.10 in terms of an absolute value thereof. It is especially preferred to use a translucent particle having a difference in refractive index in the range of from 0.008 to 0.05 in an amount of 30% or more of the whole of translucent particles. By employing such a range, it is possible to obtain a good performance in blurring of an image, cloudiness of surface, contrast, and so on.

The refractive index of the translucent fine particle is measured by dispersing an equivalent amount of the translucent fine particle in a solvent having a varied refractive index by varying a mixing ratio of two kinds of solvents having a different refractive index to measure a turbidity and measuring a refractive index of the solvent at which the turbidity becomes minimum by an Abbe's refractometer.

Furthermore, the refractive index of the translucent resin can be quantitatively determined and evaluated by, for example, direct measurement by an Abbe's refractometer or measurement of a spectral reflection spectrum or spectral ellipsometry. When the translucent resin is hardenable, the refractive index refers to a refractive index after hardening.

The internal scattering layer preferably has a thickness of from 3 to 12 μm, more preferably from 3 to 9 μm, still more preferably from 4.5 to 8 μm, and further preferably from 5 to 7 μm. When the thickness of the internal scattering layer is too thin, the hardness is insufficient, whereas when it is too thick, there may be caused problems such that curl or brittleness is deteriorated, thereby lowering processing adaptability; that the costs increase; and that unevenness is likely generated.

With respect to the density of the translucent particle of the internal scattering layer, the range of refractive index of the translucent particle to be used and the content of each particle when two kinds of particles are used, it has been found that there are optimum ranges in more detail. The relation thereof is summarized in Table 1. Use of two kinds of particles is preferable because by adjusting a ratio thereof, it is possible to obtain desired internal haze value and surface haze value without changing the amount of particle. Though use of three or more kinds of particles is possible, there is a problem that the system becomes complicated. In the preferred ranges in the table, preferred internal haze values and surface haze values can be obtained, and good performances regarding blurring of an image, cloudiness of surface, contrast, and so on can be obtained. Furthermore, better performances can be obtained within more preferred ranges. In the table, the difference in refractive index refers to a difference in refractive index between the translucent particle and translucent resin which are used in the internal scattering layer.

TABLE 1

| Density of particle (g/m$^2$) | Particle 1 Preferred difference in refractive index (—) | Particle 1 More preferred difference in refractive index (1) | Particle 2 Preferred difference in refractive index (—) | Particle 2 More preferred difference in refractive index (1) | Particle 1 Preferred content (%) | Particle 1 More preferred content (%) |
|---|---|---|---|---|---|---|
| 0.8 to 0.95 | 0.008 to 0.025 | 0.01 to 0.02 | 0.05 to 0.15 | 0.06 to 0.09 | 30 to 70 | 30 to 60 |
| | 0.025 to 0.05 | 0.03 to 0.045 | 0.05 to 0.15 | 0.06 to 0.09 | 30 to 100 | 30 to 100 |
| | 0.008 to 0.025 | 0.01 to 0.02 | 0.025 to 0.05 | 0.03 to 0.045 | 60 to 100 | 70 to 100 |
| 0.95 to 1.15 | 0.008 to 0.025 | 0.01 to 0.02 | 0.05 to 0.15 | 0.06 to 0.09 | 30 to 90 | 30 to 80 |
| | 0.025 to 0.05 | 0.03 to 0.045 | 0.05 to 0.15 | 0.06 to 0.09 | 30 to 100 | 30 to 100 |
| | 0.008 to 0.025 | 0.01 to 0.02 | 0.025 to 0.025 | 0.03 to 0.045 | 0 to 70 | 0 to 60 |
| 1.15 to 1.5 | 0.008 to 0.025 | 0.01 to 0.02 | 0.05 to 0.15 | 0.06 to 0.09 | 30 to 80 | 30 to 75 |
| | 0.025 to 0.05 | 0.03 to 0.045 | 0.05 to 0.15 | 0.06 to 0.09 | 70 to 100 | 80 to 100 |
| | 0.008 to 0.025 | 0.01 to 0.02 | 0.025 to 0.05 | 0.03 to 0.045 | 0 to 55 | 0 to 50 |
| 1.5 to 2.7 | 0.08 to 0.025 | 0.01 to 0.02 | 0.05 to 0.15 | 0.06 to 0.09 | 50 to 100 | 60 to 100 |
| | 0.08 to 0.025 | 0.01 to 0.02 | 0.025 to 0.05 | 0.03 to 0.045 | 30 to 100 | 35 to 100 |
| 2.7 to 3.2 | 0.08 to 0.025 | 0.01 to 0.02 | 0.05 to 0.15 | 0.06 to 0.09 | 70 to 100 | 80 to 100 |
| | 0.08 to 0.025 | 0.01 to 0.02 | 0.025 to 0.05 | 0.03 to 0.045 | 60 to 100 | 70 to 100 |

(Translucent Resin)

The translucent resin is preferably a binder polymer containing a saturated hydrocarbon chain or a polyether chain as a principal chain thereof, and more preferably a binder polymer containing a saturated hydrocarbon chain as a principal chain thereof Furthermore, it is preferable that the binder polymer has a crosslinking structure.

The binder polymer containing a saturated hydrocarbon chain as a principal chain thereof is preferably a polymer of an ethylenically unsaturated monomer. The binder polymer containing a saturated hydrocarbon chain as a principal chain thereof and having a crosslinking structure is preferably a (co)polymer of a monomer containing two or more ethylenically unsaturated groups.

Examples of the monomer containing two or more ethylenically unsaturated groups include esters of a polyhydric alcohol and (meth)acrylic acid [for example, ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyarylates], ethylene oxide modified compounds or caprolactone modified compounds of the foregoing esters, vinylbenzene and derivatives thereof [for example, 1,4-divinylbenzene, 2-acryloylethyl 4-vinylbenzoate, and 1,4-divinylcyclohexanone], vinylsulfones (for example, divinylsulfone), acrylamides (for example, methylenebisacrylamide), and methacrylamides. Two or more kinds of such a monomer may be used together.

In order to make the binder polymer have a high refractive index, a high refractive index monomer containing an aromatic ring in the monomer structure or containing at least one atom selected from a halogen atom other than a fluorine atom, a sulfur atom, a phosphorus atom and a nitrogen atom, a monomer having a fluorene skeleton in the molecule thereof, or the like can also be selected.

Specific examples of the high refractive index monomer include (meth)acrylates having a fluorene skeleton, bis(4-methacryloylthiophenyl)sulfide, vinylnaphthalene, vinylphenyl sulfide, and 4-methacryloxyphenyl-4'-methoxyphenyl thioether. Two of more kinds of such a monomer may be used together.

The polymerization of such a monomer can be carried out by irradiation with ionizing radiations or heating in the presence of a photo radical initiator or a heat radical initiator.

Accordingly, the foregoing internal scattering layer can be formed by preparing a coating solution containing a monomer for forming a translucent resin such as the foregoing ethylenically unsaturated monomers, a photo radical initiator or a heat radical initiator, a translucent fine particle, and optionally an inorganic filler as described later, coating the coating solution on a transparent support, and then hardening it through a polymerization reaction by ionizing radiations or heat.

Examples of the photo radical (polymerization) initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone. Examples of the benzoins include benzoin benzenesulfonic acid ester, benzoin toluenesulfonic acid ester, benzoin methyl ether, benzoin ethyl ether, and benzoin isopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyldiphenyl phosphine oxide.

A variety of examples are also described in *Saishin UV Koka Gijutsu* (Latest UV Curing Technologies) (page 159, issuer: Kazuhiro Takasusuki, publishing office: Technical Information Institute Co., Ltd., published in 1991) and are useful in the invention.

As a commercially available photo cleavage type photo radical (polymerization) initiator, IRGACURE Series as manufactured by Ciba Speciality Chemicals (for example, 651, 184 and 907) are preferably enumerated.

The photo radical (polymerization) initiator is preferably used in an amount in the range of from 0.1 to 15 parts by weight, and more preferably in the range of from 1 to 10 parts by weight based on 100 parts by weight of the polyfunctional monomer.

In addition to the photo radical (polymerization) initiator, a photosensitizer may be used. Specific examples of the photosensitizer include n-butylamine, triethylamine, tri-n-butyl phosphine, Michler's ketone, and thioxanthone.

As the heat radical initiator, organic or inorganic peroxides, and organic azo or diazo compounds can be used.

Concretely, examples of the organic peroxides include benzoyl peroxide, halogen benzoyl peroxides, lauroyl peroxide, acetyl peroxide, dibutyl peroxide, cumene hydroperoxide, and butyl hydroperoxide; examples of the inorganic peroxides include hydrogen peroxide, ammonium persulfate, and potassium persulfate; examples of the azo compounds include 2,2'-azobis-isobutyronitrile, 2,2'-azobis-propionitrile, and 2-azobis-cyclohexanedinitrile; and examples of the diazo compounds include diazoaminobenzene and p-nitrobenzene diazonium.

The crosslinking structure may be introduced into the binder polymer by using a monomer containing a crosslinking functional group in place of, or in addition to, the monomer containing two or more ethylenically unsaturated groups, thereby introducing a crosslinking functional group and then making this crosslinking group to react.

Examples of the crosslinking functional group include an isocyanate group, an epoxy group, an aziridine group, an oxazoline group, an aldehyde group, a carbonyl group, a hydrazine group, a carboxyl group, a methylol group, and an active methylene group. Vinylsulfonic acid, acid anhydrides, cyano acrylate derivatives, melamine, etherified methylol, esters and urethanes, and metal alkoxides such as tetra-methoxysilane can also be used as the monomer for introducing a crosslinking structure. A functional group exhibiting crosslinking properties as a result of decomposition reaction, such as a block isocyanate group, may be used. That is, the crosslinking functional group which does not immediately exhibit reactivity but exhibits reactivity as a result of decomposition may also be employed.

After coating, the binder polymer containing such a crosslinking functional group is able to form a crosslinking structure by heating.

The polymer containing a polyether as a principal chain thereof is preferably a ring-opened polymer of a polyfunctional epoxy compound. The ring opening polymerization of a polyfunctional epoxy compound can be carried out upon irradiation with ionizing radiations or by heating in the presence of a photo acid generator or a heat acid generator.

(Inorganic Filler)

For the purpose of adjusting the refractive index of the layer to fine adjust a haze value as caused due to internal scattering, or adjusting a difference in refractive index from the low refractive index layer to make the reflectance and color taste fall within the preferred ranges, an inorganic filler may be contained in addition to the foregoing translucent fine particle. It is preferable that the inorganic filler is made of an oxide of at least one metal selected from silicon, titanium, zirconium, aluminum, indium, zinc, tin, and antimony. Furthermore, the inorganic filler preferably has an average particle size of not more than 0.2 μm, more preferably not more than 0.1 μm, and further preferably not more than 0.06 μm. Since such an inorganic filler generally has a high specific gravity as compared with organic compounds and is able to increase the density of a coating composition, it also has an effect for making the sedimentation rate of the translucent fine particle slow. Incidentally, in such an inorganic filler, since its particle size is sufficiently small as compared with the wavelength of light, scattering is not caused, and a dispersion having such a filler in the binder polymer acts as an optically uniform substance.

In the inorganic filler which is used in the internal scattering layer, the surface thereof is preferably subjected to a silane coupling treatment or a titanium coupling treatment. In this case, a surface treating agent containing a functional group capable of reacting with a binder species on the filler surface is preferably used.

The amount of addition of the inorganic filler is preferably from 10 to 90%, more preferably from 20 to 80%, and especially preferably from 30 to 75% of the total weight of the internal scattering layer.

(Organosilane Compound).

It is possible to use an organosilane compound in the internal scattering layer. The amount of addition of the organosilane compound is preferably from 0.001 to 50% by weight, more preferably from 0.01 to 20% by weight, further preferably from 0.05 to 10% by weight, and especially preferably from 0.1 to 5% by weight based on the whole of solids of the layer containing the organosilane compound (the layer to which the organosilane compound is added).

As the organosilane compound which is used in the internal scattering layer, compounds the same as an organosilane compound for low refractive index layer as described later can be used.

(Surfactant for Internal Scattering Layer)

In particular, in order to ensure uniformity in surface properties such as coating unevenness, drying unevenness, and point defect, it is preferable that any one or both of a fluorine based surfactant and a silicone based surfactant are contained in a coating composition for forming an internal scattering layer. By enhancing the uniformity in surface properties, it becomes possible to undergo high-speed coating and to enhance productivity. In particular, a fluorine based surfactant is preferably used because it reveals an effect for improving a fault of surface properties such as coating unevenness, drying unevenness, and point defect of the antireflection film in a smaller addition amount.

Preferred examples of the fluorine based surfactant include fluoro aliphatic group-containing copolymers (sometimes abbreviated as "fluorine based polymer"). As the fluorine based polymer, a resin made of a repeating unit corresponding to the following monomer (i) or an acrylic resin or methacrylic resin which contains a repeating unit corresponding to the following monomer (ii), or a copolymer thereof with a copolymerizable vinyl based monomer (for example, the following monomer (i) is preferable) is useful.

(i) Fluoro aliphatic group-containing monomer represented by the following formula (a):

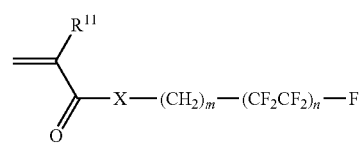

Formula (a)

In the formula (a), $R^{11}$ represents a hydrogen atom or a methyl group; and X represents an oxygen atom, a sulfur atom, or $-N(R^{12})-$. $R^{12}$ represents a hydrogen atom or an alkyl group having from 1 to 4 carbon atoms, specifically a methyl group, an ethyl group, a propyl group or a butyl group, with a hydrogen atom and a methyl group being preferable. X is preferably an oxygen atom. $\underline{m}$ represents an integer of 1 or more and not more than 6; and $\underline{n}$ represents an integer of from 2 to 4.

(ii) Monomer represented by the following formula (b), which is copolymerizable with the monomer of the foregoing (i):

$$\begin{array}{c} R^{13} \\ | \\ CH_2=C \\ | \\ C(=O)-Y-R^{14} \end{array}$$ Formula (b)

In the formula (b), $R^{13}$ represents a hydrogen atom or a methyl group; Y represents an oxygen atom, a sulfur atom, or —N($R^{15}$)—; and $R^{15}$ represents a hydrogen atom or an alkyl group having from 1 to 4 carbon atoms, specifically a methyl group, an ethyl group, a propyl group or a butyl group, with a hydrogen atom and a methyl group being preferable. Y is preferably an oxygen atom, —N(H)—, or —N($CH_3$)—.

$R^{14}$ represents an optionally substituted linear, branched or cyclic alkyl group having 4 or more and not more than 20 carbon atoms. Examples of a substituent of the alkyl group represented by $R^{14}$ include a hydroxyl group, an alkylcarbonyl group, an arylcarbonyl group, a carboxyl group, an alkyl ether group, an aryl ether group, a halogen atom (for example, a fluorine atom, a chlorine atom, and a bromine atom), a nitro group, a cyano group, and an amino group. However, it should not be construed that the invention is limited thereto. As the linear, branched or cyclic alkyl group having 4 or more and not more than 20 carbon atoms, there are suitably used a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadeyl group, and an eicosanyl group, each of which may be linear or branched; monocyclic cycloalkyl groups such as a cyclohexyl group and a cycloheptyl group; and polycyclic cycloalkyl groups such as a bicycloheptyl group, a bicyclodecyl group, a tricycloundecyl group, a tetracyclododecyl group, an adamantyl group, a norbornyl group, and a tetracyclodecyl group.

The amount of the fluoro aliphatic group-containing monomer represented by the formula (a) which is used in the fluorine based polymer is preferably in the range of 10% by mole or more, more preferably from 15 to 70% by mole, and further preferably from 20 to 60% by mole based on each of the monomers of the fluorine based polymer.

Furthermore, the amount of the monomer represented by the formula (b) which is used in the fluorine based polymer is preferably in the range of 1% by mole or more, more preferably from 5 to 70% by mole, and further preferably from 10 to 60% by mole based on each of the monomers of the fluorine based polymer.

Specific examples of a structure of the fluorine based polymer composed of a fluoro aliphatic group-containing monomer represented by the formula (a) will be given below, but it should not be construed that the invention is limited thereto. Incidentally, the numerals in the formulae express a molar ratio of each monomer component. Mw represents a weight average molecular weight.

FP-1

$-(CH_2-CH)_{40}-$
     |
     C(=O)-O-$CH_2CH_2-(CF_2CF_2)_2F$

FP-2

$-(CH_2-CH)_{60}-$
     |
     C(=O)-O-$(C_2H_4O)_{20}CH_3$

Mw 15,000

$-(CH_2-CH)_{50}-$
     |
     C(=O)-O-$CH_2CH_2-(CF_2CF_2)_2F$ $-(CH_2-CH)_{50}-$
     |
     C(=O)-O-$(C_2H_4O)_7CH_3$

Mw 15,000

FP-3

$-(CH_2-CH)_{40}-$
     |
     C(=O)-O-$CH_2CH_2-(CF_2CF_2)_2F$ $-(CH_2-CH)_{60}-$
     |
     C(=O)-O-$(C_3H_6O)_{20}CH_3$

Mw 30,000

FP-4

$-(CH_2-CH)_{40}-$
     |
     C(=O)-O-$CH_2CH_2-(CF_2CF_2)_2F$ $-(CH_2-CH)_{60}-$
     |
     C(=O)-O-$(C_3H_6O)_{20}CH_3$

Mw 50,000

FP-5

$-(CH_2-CH)_{45}-$
     |
     C(=O)-O-$CH_2CH_2-(CF_2CF_2)_3F$ $-(CH_2-CH)_{55}-$
     |
     C(=O)-O-$(C_2H_4O)_7CH_3$

Mw 15,000

FP-6

$-(CH_2-CH)_{40}-$
     |
     C(=O)-O-$CH_2CH_2-(CF_2CF_2)_3F$ $-(CH_2-CH)_{60}-$
     |
     C(=O)-O-$(C_3H_6O)_{20}CH_3$

Mw 7,000

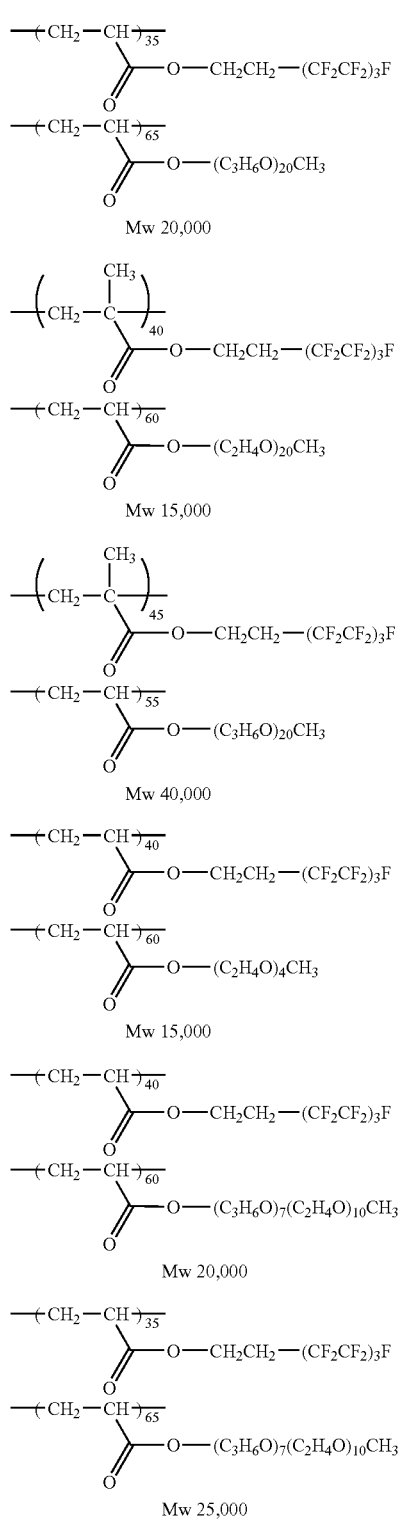

FP-7

FP-8

FP-9

FP-10

FP-11

FP-12

When the fluorine based polymer composed of the monomer represented by the formula (a) is used, surface energy of the internal scattering layer is lowered due to segregation of an F atom-containing functional group on the surface of the internal scattering layer. As a result, when the low refractive index layer is subjected to overcoating on the internal scattering layer, there may possibly be caused a problem that the antireflection performance is deteriorated. It is estimated that since wettability of a hardenable composition which is used for forming a low refractive index layer is deteriorated, fine unevenness which cannot be visually detected is formed on the low refractive index layer, whereby the antireflection performance is deteriorated.

In order to solve such a problem, it has been found that it is effective to control the surface energy of the internal scattering layer preferably at from 20 mN·m$^{-1}$ to 50 mN·m$^{-1}$, and more preferably at from 30 mN·m$^{-1}$ to 40 mN·m$^{-1}$ by adjusting the structure and amount of addition of the fluorine based polymer. In order to realize the foregoing surface energy, F/C which is a ratio of a peak derived from a fluorine atom to a peak derived from a carbon atom as measured by X-ray photoelectron spectroscopy must be from 0.1 to 1.5.

Alternatively, when an upper layer is coated, by selecting a fluorine based polymer which is able to be extracted with a solvent for forming the upper layer, the fluorine based polymer is not unevenly distributed on the surface of a lower layer (=interface), thereby bringing adhesiveness between the upper layer and the lower layer. Then, uniformity in surface properties is kept even in high-speed coating, and a lowering of surface free energy capable of providing an antireflection film having strong scar resistance is prevented from occurring, thereby controlling the surface energy of the internal scattering layer prior to coating a low refractive index layer within the foregoing range. Thus, the object of the invention can be achieved. Examples of such a raw material include acrylic resins or methacrylic resins containing a repeating unit corresponding to a fluoro aliphatic group-containing monomer represented by the following formula (c), and copolymers thereof with a copolymerizable vinyl based monomer (for example, the following monomer (iv) is preferable).

(iii) Fluoro aliphatic group-containing monomer represented by the following formula (c):

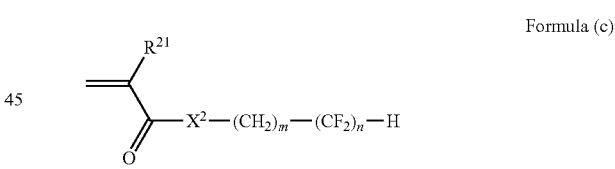

Formula (c)

In the formula (c), $R^{21}$ represents a hydrogen atom, a halogen atom or a methyl group, and more preferably a hydrogen atom or a methyl group. $X^2$ represents an oxygen atom, a sulfur atom, or —N($R^{22}$)—, more preferably an oxygen atom or —N($R^{22}$)—, and further preferably an oxygen atom. $\underline{m}$ represents an integer of 1 or more and not more than 6 (more preferably from 1 to 3, and further preferably 1); and $\underline{n}$ represents an integer of 1 or more and not more than 18 (more preferably from 4 to 12, and further preferably from 6 to 8). $R^{22}$ represents a hydrogen atom or an optionally substituted alkyl group having from 1 to 8 carbon atoms, more preferably a hydrogen atom or an alkyl group having from 1 to 4 carbon atoms, and further preferably a hydrogen atom or a methyl group. $X^2$ preferably represents an oxygen atom.

Furthermore, two or more kinds of the fluoro aliphatic group-containing monomer represented by the formula (c) may be contained as a constitutional component in the fluorine based polymer.

(iv) Monomer represented by the following formula (d), which is copolymerizable with the monomer of the foregoing (iii):

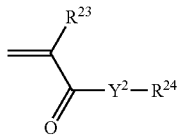

Formula (d)

In the formula (d), $R^{23}$ represents a hydrogen atom, a halogen atom or a methyl group, and more preferably a hydrogen atom or a methyl group. $Y^2$ represents an oxygen atom, a sulfur atom, or $-N(R^{25})-$, more preferably an oxygen atom or $-N(R^{25})-$, and further preferably an oxygen atom. $R^{25}$ represents a hydrogen atom or an alkyl group having from 1 to 8 carbon atoms, more preferably a hydrogen atom or an alkyl group having from 1 to 4 carbon atoms, and further preferably a hydrogen atom or a methyl group.

$R^{24}$ represents an optionally substituted linear, branched or cyclic alkyl group having from 1 to 20 carbon atoms, a poly(alkyleneoxy) group-containing alkyl group, or an optionally substituted aromatic group (for example, a phenyl group and a naphthyl group), more preferably a linear, branched or cyclic alkyl group having from 1 to 12 carbon atoms or an aromatic group having from 6 to 18 carbon atoms in total, and further preferably a linear, branched or cyclic alkyl group having from 1 to 8 carbon atoms.

The amount of the fluoro aliphatic group-containing monomer represented by the formula (c) which is used in the fluorine based polymer is preferably in the range of 10% by mole or more, more preferably from 50 to 100% by mole, and further preferably from 60 to 100% by mole based on each of the monomers of the fluorine based polymer.

Furthermore, the amount of the monomer represented by the formula (d) which is used in the fluorine based polymer is preferably in the range of 0% by mole or more, more preferably from 0 to 50% by mole, and further preferably from 0 to 40% by mole based on each of the monomers of the fluorine based polymer.

Specific examples of a structure of the fluorine based polymer containing a repeating unit corresponding to the fluoro aliphatic group-containing monomer represented by the formula (c) will be given below, but it should not be construed that the invention is limited thereto. Incidentally, the numerals in the formulae express a molar ratio of each monomer component. Mw represents a weight average molecular weight.

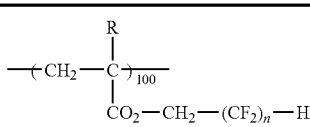

| | R | n | Mw |
|---|---|---|---|
| P-1 | H | 4 | 8000 |
| P-2 | H | 4 | 16000 |
| P-3 | H | 4 | 33000 |
| P-4 | CH$_3$ | 4 | 12000 |
| P-5 | CH$_3$ | 4 | 28000 |
| P-6 | H | 6 | 8000 |
| P-7 | H | 6 | 14000 |
| P-8 | H | 6 | 29000 |
| P-9 | | CH$_3$ | 6 | 10000 |
| P-10 | | CH$_3$ | 6 | 21000 |
| P-11 | | H | 8 | 4000 |
| P-12 | | H | 8 | 16000 |
| P-13 | | H | 8 | 31000 |
| P-14 | | CH$_3$ | 8 | 3000 |

$$-(CH_2-\underset{\underset{CO_2-(CH_2)_p-(CF_2)_q-H}{|}}{\overset{\overset{R^1}{|}}{C}})_x-(CH_2-\underset{\underset{CO_2-(CH_2)_r-(CF_2)_s-H}{|}}{\overset{\overset{R^2}{|}}{C}})_{100-x}$$

| | x | R$^1$ | p | q | R$^2$ | r | s | Mw |
|---|---|---|---|---|---|---|---|---|
| P-15 | 50 | H | 1 | 4 | CH$_3$ | 1 | 4 | 10000 |
| P-16 | 40 | H | 1 | 4 | H | 1 | 6 | 14000 |
| P-17 | 60 | H | 1 | 4 | CH$_3$ | 1 | 6 | 21000 |
| P-18 | 10 | H | 1 | 4 | H | 1 | 8 | 11000 |
| P-19 | 40 | H | 1 | 4 | H | 1 | 8 | 16000 |
| P-20 | 20 | H | 1 | 4 | CH$_3$ | 1 | 8 | 8000 |
| P-21 | 10 | CH$_3$ | 1 | 4 | CH$_3$ | 1 | 8 | 7000 |
| P-22 | 50 | H | 1 | 6 | CH$_3$ | 1 | 6 | 12000 |
| P-23 | 50 | H | 1 | 6 | CH$_3$ | 1 | 6 | 22000 |
| P-24 | 30 | H | 1 | 6 | CH$_3$ | 1 | 6 | 5000 |

$$-(CH_2-\underset{\underset{CO_2-CH_2-(CF_2)_n-H}{|}}{\overset{\overset{R^1}{|}}{C}})_x-(CH_2-\underset{\underset{CO_2-R^3}{|}}{\overset{\overset{R^2}{|}}{C}})_{100-x}$$

| | x | R$^1$ | n | R$^2$ | R$^3$ | Mw |
|---|---|---|---|---|---|---|
| FP-148 | 80 | H | 4 | CH$_3$ | CH$_3$ | 1100 |
| FP-149 | 90 | H | 4 | H | C$_4$H$_9$(n) | 7000 |
| FP-150 | 95 | H | 4 | H | C$_6$H$_{13}$(n) | 5000 |
| FP-151 | 90 | CH$_3$ | 4 | H | CH$_2$CH(C$_2$H$_5$)C$_4$H$_9$(n) | 15000 |
| FP-152 | 70 | H | 6 | CH$_3$ | C$_2$H$_5$ | 18000 |
| FP-153 | 90 | H | 6 | CH$_3$ | ⟨cyclohexyl-H⟩ | 12000 |
| FP-154 | 80 | H | 6 | H | C$_4$H$_9$(sec) | 9000 |
| FP-155 | 90 | H | 6 | H | C$_{13}$H$_{25}$(n) | 21000 |
| FP-156 | 60 | CH$_3$ | 6 | H | CH$_3$ | 15000 |
| FP-157 | 60 | H | 8 | H | CH$_3$ | 10000 |
| FP-158 | 70 | H | 8 | H | C$_2$H$_5$ | 24000 |
| FP-159 | 70 | H | 8 | H | C$_4$H$_9$(n) | 5000 |
| FP-160 | 50 | H | 8 | H | C$_4$H$_9$(n) | 16000 |
| FP-161 | 80 | H | 8 | CH$_3$ | C$_4$H$_9$(iso) | 13000 |
| FP-162 | 80 | H | 8 | CH$_3$ | C$_4$H$_9$(t) | 9000 |
| FP-163 | 60 | H | 8 | H | ⟨cyclohexyl-H⟩ | 7000 |
| FP-164 | 80 | H | 8 | H | CH$_2$CH(C$_2$H$_5$)C$_4$H$_9$(n) | 8000 |
| FP-165 | 90 | H | 8 | H | C$_{12}$H$_{25}$(n) | 6000 |
| FP-166 | 80 | CH$_3$ | 8 | CH$_3$ | C$_4$H$_9$(sec) | 18000 |
| FP-167 | 70 | CH$_3$ | 8 | CH$_3$ | CH$_3$ | 22000 |
| FP-168 | 70 | H | 10 | CH$_3$ | H | 17000 |
| FP-169 | 90 | H | 10 | H | H | 9000 |
| FP-170 | 95 | H | 4 | CH$_3$ | —(CH$_3$CH$_2$O)$_2$— | 18000 |
| FP-171 | 80 | H | 4 | H | —(CH$_3$CH$_2$O)$_2$—CH$_3$ | 16000 |
| FP-172 | 80 | H | 4 | H | —(C$_3$H$_6$O)$_7$—H | 24000 |
| FP-173 | 70 | CH$_3$ | 4 | H | —(C$_3$H$_6$O)$_{13}$—H | 18000 |
| FP-174 | 90 | H | 6 | H | —(CH$_3$CH$_2$O)$_2$—H | 21000 |
| FP-175 | 90 | H | 6 | CH$_3$ | —(CH$_3$CH$_2$O)$_2$—H | 9000 |
| FP-176 | 80 | H | 6 | H | —(CH$_3$CH$_2$O)$_2$—C$_4$H$_9$(n) | 12000 |
| FP-177 | 90 | H | 6 | H | —(C$_3$H$_6$O)$_7$—H | 34000 |
| FP-178 | 75 | F | 6 | H | —(C$_3$H$_6$O)$_{13}$—H | 11000 |
| FP-179 | 85 | CH$_3$ | 6 | CH$_3$ | —(C$_3$H$_6$O)$_{20}$—H | 18000 |

-continued

| | | | | | | |
|---|---|---|---|---|---|---|
| FP-180 | 95 | $CH_3$ | 6 | $CH_3$ | $-CH_2CH_2OH$ | 27000 |
| FP-181 | 80 | H | 8 | $CH_3$ | $-(CH_2CH_2O)_8-H$ | 12000 |
| FP-182 | 95 | H | 8 | H | $-(CH_2CH_2O)_9-CH_3$ | 20000 |
| FP-183 | 90 | H | 8 | H | $-(C_3H_6O)_7-H$ | 8000 |
| FP-184 | 95 | H | 8 | H | $-(C_3H_6O)_{20}-H$ | 15000 |
| FP-185 | 90 | F | 8 | H | $-(C_3H_6O)_{13}-H$ | 12000 |
| FP-186 | 80 | H | 8 | $CH_3$ | $-(CH_3CH_2O)_2-H$ | 20000 |
| FP-187 | 95 | $CH_3$ | 8 | H | $-(CH_3CH_2O)_2-CH_3$ | 17000 |
| FP-188 | 90 | $CH_3$ | 8 | H | $-(C_3H_6O)_7-H$ | 34000 |
| FP-189 | 80 | H | 10 | H | $-(CH_3CH_2O)_2-H$ | 19000 |
| FP-190 | 90 | H | 10 | H | $-(C_3H_6O)_7-H$ | 8000 |
| FP-191 | 80 | H | 12 | H | $-(CH_3CH_2O)_7-CH_3$ | 7000 |
| FP-192 | 95 | $CH_3$ | 12 | H | $-(C_3H_6O)_7-H$ | 10000 |

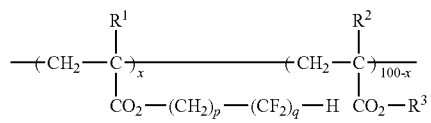

| | x | $R^1$ | p | q | $R^2$ | $R^3$ | Mw |
|---|---|---|---|---|---|---|---|
| FP-193 | 80 | H | 2 | 4 | H | $C_4H_9(n)$ | 18000 |
| FP-194 | 90 | H | 2 | 4 | H | $-(CH_2CH_2O)_9-CH_3$ | 16000 |
| FP-195 | 90 | $CH_3$ | 2 | 4 | F | $C_6H_{13}(n)$ | 24000 |
| FP-196 | 80 | $CH_3$ | 1 | 6 | F | $C_4H_9(n)$ | 18000 |
| FP-197 | 95 | H | 2 | 6 | H | $-(C_3H_6O)_7-H$ | 21000 |
| FP-198 | 90 | $CH_3$ | 3 | 6 | H | $-CH_2CH_2OH$ | 9000 |
| FP-199 | 75 | H | 1 | 8 | F | $CH_3$ | 12000 |
| FP-200 | 80 | H | 2 | 8 | H | $CH_2CH(C_2H_5)C_4H_9(n)$ | 34000 |
| FP-201 | 90 | $CH_3$ | 2 | 8 | H | $-(C_3H_6O)_7-H$ | 11000 |
| FP-202 | 80 | H | 3 | 8 | $CH_3$ | $CH_3$ | 18000 |
| FP-203 | 90 | H | 1 | 10 | F | $C_4H_9(n)$ | 27000 |
| FP-204 | 95 | H | 2 | 10 | H | $-(CH_2CH_2O)_9-CH_3$ | 12000 |
| FP-205 | 85 | $CH_3$ | 2 | 10 | $CH_3$ | $C_4H_9(n)$ | 20000 |
| FP-206 | 80 | H | 1 | 12 | H | $C_6H_{13}(n)$ | 8000 |
| FP-207 | 90 | H | 1 | 12 | H | $-(C_3H_6O)_{13}-H$ | 15000 |
| FP-208 | 60 | $CH_3$ | 3 | 12 | $CH_3$ | $C_2H_5$ | 12000 |
| FP-209 | 60 | H | 1 | 16 | H | $CH_2CH(C_2H_5)C_4H_9(n)$ | 20000 |
| FP-210 | 80 | $CH_3$ | 1 | 16 | H | $-(CH_2CH_2O)_2-C_4H_9(n)$ | 17000 |
| FP-211 | 90 | H | 1 | 18 | H | $-CH_2CH_2OH$ | 34000 |
| FP-212 | 60 | H | 3 | 18 | $CH_3$ | $CH_3$ | 19000 |

If a lowering of the surface energy can be prevented at a point of time when a low refractive index layer is subjected to overcoating on the internal scattering layer, deterioration of the antireflection performance can be prevented. For that reason, by using a fluorine based polymer at the time of coating the internal scattering layer to lower a surface tension of the coating solution, thereby enhancing uniformity in surface properties and keeping high productivity by high-speed coating and after coating the internal scattering layer, employing a surface treatment measure such as a corona treatment, a UV treatment, a heat treatment, a saponification treatment, and a solvent treatment, thereby preventing a lowering of surface free energy, the surface energy of the internal scattering layer prior to coating a low refractive index layer is controlled within the foregoing range, thereby enabling one to achieve the object. A corona treatment is especially preferable as the surface treatment measure.

Furthermore, a thixotropic agent may be added in the coating composition for forming an internal scattering layer. Examples of the thixotropic agent include silica and mica each having a particle size of not more than 0.1 μm. It is suitable that the content of such an additive is usually from approximately 1 to 10 parts by weight based on 100 parts by weight of the ultraviolet ray hardenable resin.

The fluorine based polymer preferably has a weight average molecular weight of from 3,000 to 100,000, and more preferably from 5,000 to 80,000.

In addition, the amount of addition of the fluorine based polymer is preferably in the range of from 0.001 to 5% by weight, more preferably in the range of from 0.005 to 3% by weight, and further preferably in the range of from 0.01 to 1% by weight based on the coating solution. When the amount of addition of the fluorine based polymer is less than 0.001% by weight, the effect is insufficient, whereas when it exceeds 5% by weight, there may possibly be caused problems such that drying of the coating film is not sufficiently achieved and that the performance (for example, reflectance and scar resistance) as a coating film is adversely affected.

(Solvent)

In many cases, the layer having internal scattering properties is wet coated directly on the transparent support. Accordingly, a solvent which is used in the coating composition is an important factor. It is preferable that the solvent meets requirements that it sufficiently dissolves a variety of solutes such as the foregoing translucent resin therein; that it does not dissolve the foregoing translucent particle therein; that it hardly causes coating unevenness or drying unevenness in coating to drying processes; that it does not dissolve the support therein (an aspect of which is required for preventing faults such as deterioration of flatness and whitening from occurring); and that it inversely swells the support to a minimum extent (an aspect of which is required for adhesiveness).

It is preferable that the solvent contains, as a prime solvent, at least a solvent which is low in swelling properties against the transparent support and which does not dissolve the transparent support therein. In the case where triacetyl cellulose is used as the support, a variety of ketones (for example, methyl ethyl ketone, acetone, methyl isobutyl ketone, and cyclohexanone), a variety of cellosolves (for example, ethyl cellosolve, butyl cellosolve, and propylene glycol monomethyl ether), and besides, a variety of alcohols (for example, propylene glycol, ethylene glycol, ethanol, methanol, isopropyl alcohol, 1-butanol, and 2-butanol), toluene, and so on are preferably used.

Furthermore, by adding a small-amount solvent having high swelling properties in the prime solvent having low swelling properties against the transparent support, which is selected among the foregoing solvents, it is possible to improve the adhesiveness to the transparent support without deteriorating other performances and surface properties. Concretely, in the case where methyl isobutyl ketone or toluene is used as the prime solvent, it is possible to use, as the small-amount solvent, methyl ethyl ketone, acetone, cyclohexanone, propylene glycol, ethylene glycol, ethanol, methanol, isopropyl alcohol, 1-butanol, 2-butanol, or the like. It is especially preferable that methyl isobutyl ketone or toluene is used as the prime solvent, whereas methyl ethyl ketone or cyclohexanone is used as the small-amount solvent. Furthermore, for the purpose of controlling hydrophilicity of the solvent, it is also possible to add and use propylene glycol, ethylene glycol, ethanol, methanol, isopropyl alcohol, 1-butanol, 2-butanol, or the like. Propylene glycol and ethylene glycol can be especially preferably used.

A mixing ratio of the prime solvent and the small-amount solvent is preferably from 99/1 to 50/50, and more preferably from 95/5 to 60/40 in terms of a weight ratio. When the mixing ratio exceeds 50/50, the scattering in surface quality in a drying process after coating becomes large and therefore, such is not preferable.

Furthermore, the addition of the small-amount solvent containing a hydroxyl group to the prime solvent as selected among the foregoing solvents is preferable because the surface irregularities can be adjusted. Since the small-amount solvent containing a hydroxyl group remains to the last in the drying process of the coating composition as compared with the prime solvent, thereby making the surface irregular properties large, it is preferable that the small-amount solvent containing a hydroxyl group has a vapor pressure at a temperature in the range of from 20 to 30° C. lower than the prime solvent. For example, a combination of methyl isobutyl ketone (vapor pressure at 21.7° C.: 16.5 mmHg) as the prime solvent with propylene glycol (vapor pressure at 20.0° C.: 0.08 mmHg) as the small-amount solvent containing a hydroxyl group is enumerated as one of preferred examples. A mixing ratio of the prime solvent to the small-solvent containing a hydroxyl group is preferably from 100/0 to 50/50, and more preferably from 100/0 to 80/20 in terms of a weight ratio. When this mixing ratio exceeds 50/50, the scattering in stability of the coating solution or surface quality in the drying process after coating becomes large and therefore, such is not preferable. In particular, for the purpose of controlling the surface scattering as caused due to the surface irregularities as in the invention, the mixing ratio of the prime solvent to the small-solvent containing a hydroxyl group is more preferably from 100/0 to 97/3.

Next, the low refractive index layer will be hereunder described.

[Low Refractive Index Layer]

The low refractive index layer in the antireflection film of the invention preferably has a refractive index in the range of from 1.30 to 1.55, and more preferably from 1.35 to 1.45. When the refractive index is less than 1.30, though the antireflection performance is improved, the mechanical strength of the film is lowered, whereas when it exceeds 1.55, the antireflection performance is remarkably deteriorated.

In addition, for the purpose of realizing a low reflectance, it is preferable that the low refractive index layer is satisfied with the following numerical expression (I).

$$(m\lambda/4) \times 0.7 < n1 \times d1 < (m\lambda/4) \times 1.3 \qquad \text{Numerical Expression (I)}$$

In the expression, $\underline{m}$ represents a positive odd number; n1 represents a refractive index of the low refractive index layer; and d1 represents a thickness (nm) of the low refractive index layer. Furthermore, $\lambda$ represents a wavelength and is a value in the range of from 500 to 550 nm.

Incidentally, what the low refractive index layer is satisfied with the foregoing numerical expression (I) means that $\underline{m}$ (a positive odd number, and usually 1) which is satisfied with the numerical expression (I) within the foregoing wavelength range is present.

The low refractive index layer is, for example, a hardened film as formed by coating a hardenable composition containing, as the major component, a fluorine-containing polymer, followed by drying and hardening. It is meant by the terms "hardenable composition containing, as the major component, a fluorine-containing polymer" as referred to herein that when a low refractive index layer is formed, a fluorine-containing polymer is contained in an amount to such an extent that it is able to function as a binder polymer. A preferred range of the content of the fluorine-containing polymer is described later.

Furthermore, it is preferable that the low refractive index layer contains at least one of an inorganic particle and an organosilane compound in addition to the fluorine-containing polymer. A raw material for forming the low refractive index layer will be described below.

(Fluorine-Containing Polymer for Low Refractive Index Layer)

What the fluorine-containing polymer is a polymer which when formed into a hardened coating film, has a dynamic friction coefficient of from 0.03 to 0.20, a contact angle against water of from 90 to 120° and a slip angle of pure water of not more than 70° with respect to the coating film and which is crosslinked by heat or upon irradiation with ionizing radiations is preferable in view of improving the productivity in the case of coating and hardening while conveying a roll film by a web.

Furthermore, when the antireflection film is installed in an image display device, when a peeling force from a commercially available pressure sensitive adhesive tape is low, it is readily peeled away after sticking a seal or memorandum. Accordingly, the peeling force is preferably not more than 500 gf, more preferably not more than 300 gf, and most preferably not more than 100 gf Furthermore, when a surface hardness as measured by a micro hardness meter is high, a scar is readily formed. Accordingly, the surface hardness is preferably 0.3 GPa or more, and more preferably 0.5 GPa or more.

The fluorine-containing polymer which is used for the low refractive index layer is preferably a fluorine-containing polymer containing a fluorine atom in an amount in the range of from 35 to 80% by weight and containing a crosslinking or polymerizable functional group. Examples of such a fluorine-containing polymer include fluorine-containing copolymers containing, as constitutional unites, a fluorine-containing monomer unit and a crosslinking reactive unit in addition to hydrolyzates or dehydrated condensates of a perfluoroalkyl group-containing silane compound [for example, (heptadecafluoro-1,1,2,2-tetrahydrodecyl)triethoxysilane]. In the case of a fluorine-containing copolymer, it is preferable that its principal chain is composed of only carbon atoms. That is, it is preferable that the principal chain skeleton does not contain an oxygen atom or a nitrogen atom.

Specific examples of the foregoing fluorine-containing monomer unit include fluoroolefins (for example, fluoroethylene, vinylidene fluoride, tetrafluoroethylene, perfluorooctylethylene, hexafluoropropylene, and perfluoro-2,2-dimethyl-1,3-dioxonol), partially or completely fluorinated alkyl ester derivatives of (meth)acrylic acid (for example, VIS-COAT 6FM (manufactured by Osaka Organic Chemical Industry Ltd.) and M-2020 (manufactured by Daikin Industries, Ltd.), and completely or partially fluorinated vinyl ethers. Of these, perfluoroolefins are preferable; and hexafluoropropylene is especially preferable from the viewpoints of refractive index, solubility, transparency, and easiness of availability.

Examples of the foregoing crosslinking reactive unit include constitutional units obtainable by polymerization of a monomer which contains a self-crosslinking functional group in the molecule thereof, such as glycidyl(meth)acrylate and glycidyl vinyl ether, in advance; and constitutional units in which a crosslinking reactive group such as a (meth)acryloyl group is introduced into a constitutional unit obtainable by polymerization of a monomer containing a carboxyl group, a hydroxyl group, an amino group, a sulfo group, etc. [for example, (meth)acrylic acid, methylol(meth)acrylate, hydroxyalkyl(meth)acrylate, allyl acrylate, hydroxyethyl vinyl ether, hydroxybutyl vinyl ether, maleic acid, and crotonic acid] through a polymeric reaction (for example, such a crosslinking reactive group can be introduced by making acrylic acid chloride act to a hydroxyl group).

Furthermore, besides the foregoing fluorine-containing monomer unit and the foregoing crosslinking reactive unit, from the viewpoints of solubility in a solvent, transparency of a film and so on, other polymerization unit can also be introduced by properly copolymerizing a fluorine atom-free monomer. The monomer unit which can be used together is not particularly limited, and examples thereof include olefins [for example, ethylene, propylene, isoprene, vinyl chloride, and vinylidene chloride], acrylic esters [for example, methyl acrylate, methyl acrylate, ethyl acrylate, and 2-ethylhexyl acrylate], methacrylic esters [for example, methyl methacrylate, ethyl methacrylate, butyl methacrylate, and ethylene glycol dimethacrylate], styrene derivatives [for example, styrene, divinylbenzene, vinyltoluene, and α-methylstyrene], vinyl ethers [for example, methyl vinyl ether, ethyl vinyl ether, and cyclohexyl vinyl ether], vinyl esters [for example, vinyl acetate, vinyl propionate, and vinyl cinnamate], acrylamides [for example, N-tert-butyl acrylamide and N-cyclohexyl acrylamide], methacrylamides, and acrylonitrile derivatives.

A hardening agent may be properly used together with the foregoing fluorine-containing polymer as described in JP-A-10-25388 and JP-A-10-147739.

An especially useful fluorine-containing polymer is a random copolymer of a perfluoroolefin and a vinyl ether or a vinyl ester. It is especially preferable that the fluorine-containing polymer contains a group which is able to undergo a crosslinking reaction singly [for example, a radical reactive group such as a (meth)acryloyl group and a ring-opening polymerizable group such as an epoxy group and an oxetanyl group].

Such a polymerization unit containing a crosslinking reactive group preferably accounts for from 5 to 70% by mole, and especially preferably from 30 to 60% by mole of the whole of polymerization units of the polymer.

A preferred form of the fluorine-containing polymer for low refractive index layer is a copolymer represented by the following formula (X1).

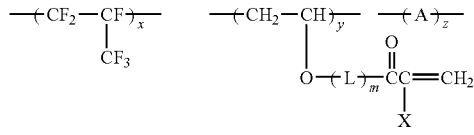

Formula (X1)

In the foregoing formula (X1), L represents a connecting group having from 1 to 10 carbon atoms, more preferably a connecting group having from 1 to 6 carbon atoms, and especially preferably a connecting group having from 2 to 4 carbon atoms; may have a linear or branched structure or a cyclic structure and may contain a hetero atom selected from O, N and S.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—**, and *—$CH_2CH_2OCONH(CH_2)_3$—O—** (* represents a connecting site of the polymer principal chain side; and ** represents a connecting site of the (meth)acryloyl group side). $\underline{m}$ represents 0 or 1.

In the formula (X1), X represents a hydrogen atom or a methyl group. From the viewpoint of hardening reactivity, X is more preferably a hydrogen atom.

In the formula (X1), A represents a repeating unit derived from an arbitrary vinyl monomer and is not particularly limited so far as it is a constitutional component of a monomer which is copolymerizable with hexafluoropropylene. $\underline{A}$ can be properly selected from a variety of viewpoints such as adhesiveness to a substrate, Tg of a polymer (contributing to the film hardness), solubility in a solvent, transparency, slipperiness, and dust-proof or antifouling properties and may be constituted of a single vinyl monomer or plural vinyl monomers according to the purpose.

Preferred examples include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, and allyl vinyl ether; vinyl esters such as vinyl acetate, vinyl propionate, and vinyl butyrate; (meth)acrylates such as methyl(meth)acrylate, ethyl(meth)acrylate, hydroxyethyl(meth)acrylate, glycidyl methacrylate, allyl(meth)acrylate, and (meth)acryloyloxypropyl trimethoxysilane; styrene derivatives such as styrene and p-hydroxymethylstyrene; and unsuaturate carboxylic acids such as crotonic acid, maleic acid, and itaconic acid, and derivatives thereof. Of these, vinyl ether derivatives and vinyl ester derivatives are more preferable; and vinyl ether derivatives are especially preferable.

$\underline{x}$, $\underline{y}$ and $\underline{z}$ each represents % by mole of the respective constitutional component; the case of $30 \leq x \leq 60$, $5 \leq y \leq 70$ and $0 \leq z \leq 65$ is preferable; the case of $35 \leq x \leq 55$, $30 \leq y \leq 60$ and $0 \leq z \leq 20$ is more preferable; and the case of $40 \leq x \leq 55$, $40 \leq y \leq 55$ and $0 \leq z \leq 10$ is especially preferable, provide that $(x+y+z)=100$.

An especially preferred form of the copolymer which is used in the invention is a copolymer represented by the following formula (X2).

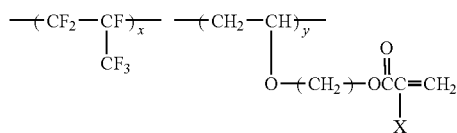

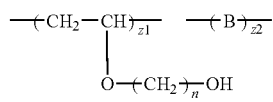

Formula (X2)

In the foregoing formula (X2), X has the same meaning as in the formula (X1), and a referred range thereof is also the same.

n represents an integer which is satisfied with the relationship of $2 \leq n \leq 10$, preferably $2 \leq n \leq 6$, and especially preferably $2 \leq n \leq 4$.

B represents a repeating unit derived from an arbitrary vinyl monomer and may be constituted of a single composition or plural compositions. Examples thereof include those enumerated as in A in the foregoing formula (X1).

x, y, z1 and z2 each represents % by mole of the respective repeating unit. With respect to x and y, the case of $30 \leq x \leq 60$ and $5 \leq y \leq 70$ is preferable; the case of $35 \leq x \leq 50$ and $30 \leq y \leq 60$ is more preferable; and the case of $40 \leq x \leq 55$ and $40 \leq y \leq 55$ is especially preferable. With respect to z1 and z2, the case of $0 \leq z1 \leq 65$ and $0 \leq z2 \leq 65$ is preferable; the case of $0 \leq z1 \leq 30$ and $0 \leq z2 \leq 10$ is more preferable; and the case of $0 \leq z1 \leq 10$ and $0 \leq z2 \leq 5$ is especially preferable, provided that (x+y+z1+z2) is 100.

The copolymer represented by the formula (X1) or the generation formula (X2) can be synthesized by introducing a (meth)acryloyl group into a copolymer composed of a hexafluoropropylene component and a hydroxyalkyl vinyl ether component by any one of the foregoing measures. On that occasion, isopropanol, hexane, methanol, and so on are preferable as a reprecipitation solvent.

Specific examples of the preferred copolymer represented the formula (X1) or the formula (X2) include those as described in paragraphs [0035] to [0047] of JP-A-2004-45462. Such a copolymer can be synthesized by the method as described in JP-A-2004-45462.

(Inorganic Fine Particle for Low Refractive Index Layer)

The blending amount of the inorganic fine particle is preferably from 1 mg/m² to 100 mg/m², more preferably from 5 mg/m² to 80 mg/m², and further preferably from 10 mg/m² to 60 mg/m². When the blending amount of the inorganic fine particle is too low, an effect for improving the scar resistance becomes low, whereas when it is too high, there is some possibility that fine irregularities are formed on the surface of the low refractive index layer and that the appearance such as deep black and integral reflectance are deteriorated. Thus, it is preferred to make the blending amount of the inorganic fine particle fall within the foregoing range.

It is desired that the inorganic fine particle has a low refractive index for the reason that it is contained in the low refractive index layer. Examples of the inorganic fine particle include of fine particles of magnesium fluoride or silica. Above all, a silica fine particle is especially preferable in view of refractive index, dispersion stability and costs.

The average particle size of the inorganic fine particle is preferably 30% or more and not more than 100%, more preferably 35% or more and not more than 80%, and further preferably 40% or more and not more than 60% of the thickness of the low refractive index layer. That is, when the thickness of the low refractive index layer is 100 nm, the particle size of the inorganic fine particle is preferably 30 nm or more and not more than 100 nm, more preferably 35 nm or more and not more than 80 nm, and further preferably 40 nm or more and not more than 60 nm.

When the particle size of the inorganic fine particle is too small, an effect for improving the scar resistance becomes low, whereas when it is too large, there is some possibility that fine irregularities are formed on the surface of the low refractive index layer and that the appearance such as deep black and integral reflectance are deteriorated. Thus, it is preferred to make the particle size of the inorganic fine particle fall within the foregoing range. The inorganic fine particle may be either crystalline or amorphous. Furthermore, the inorganic fine particle may be a monodispersed particle, or may be a coagulated particle so far as it meets a prescribed particle size. Though the shape of the inorganic fine particle is most preferably spherical, even when it is amorphous, there is no problem.

Here, the particle size of the inorganic fine particle can be measured by a Coulter counter.

In order to suppress the increase of the refractive index of the low refractive index layer much more, the foregoing inorganic fine particle is preferably of a hollow structure. Furthermore, the inorganic fine particle preferably has a refractive index of from 1.17 to 1.40, more preferably from 1.17 to 1.35, and further preferably from 1.17 to 1.30. The refractive index as referred to herein expresses a refractive index as the whole of the particle but does not express a refractive index of only the inorganic material of an outer shell in the case of the inorganic fine particle having a hollow structure. At this time, when a radius of a void within the particle is defined as "a" and a radius of the outer shell of the particle is defined as "b", a porosity x which is expressed by the following numerical expression (II) is preferably from 10 to 60%, more preferably from 20 to 60%, and most preferably from 30 to 60%.

$$x=(4\pi a3/3)/(4\pi b3/3)\times 100 \qquad \text{Expression (II)}$$

When it is intended to make the hollow inorganic fine particle so as to have a lower refractive index and a larger porosity, the thickness of the outer shell becomes thin so that the strength as the particle is weakened. Accordingly, a particle having a low refractive index of less than 1.17 is not applicable from the viewpoint of scar resistance.

Incidentally, the refractive index of the inorganic fine particle can be measured by an Abbe's refractometer (manufactured by Atago Co., Ltd.).

Furthermore, at least one kind of an inorganic fine particle having an average particle size of less than 25% of the thickness of the low refractive index layer (hereinafter referred to as "small-sized inorganic fine particle") may be used together with the inorganic fine particle having a particle size falling within the foregoing preferred range (hereinafter referred to as "large-sized inorganic fine particle").

Since the small-sized inorganic fine particle can exist in a gap between the large-sized inorganic fine particles, it can contribute as a holding agent of the large-sized inorganic fine particle.

In the case where the low refractive index layer has a thickness of 100 nm, the average particle size of the small-sized inorganic fine particle is preferably 1 nm or more and not more than 20 nm, more preferably 5 nm or more and not more than 15 nm, and especially preferably 10 nm or more and not more than 15 nm. The use of such an inorganic fine particle is preferable in view of the raw material costs and effect as a holding agent.

For the purpose of seeking dispersion stability or enhancing affinity with or binding properties to the binder component in the dispersion or coating solution, the inorganic fine particle may be subjected to a physical surface treatment such as a plasma discharge treatment and a corona discharge treatment, or a chemical surface treatment with a surfactant, a coupling agent or the like. Above all, the use of a coupling agent is especially preferable. Alkoxy metal compounds (for example, titanium coupling agents and silane coupling agents) are preferably used as the coupling agent. Above all, a silane coupling treatment is especially effective.

The coupling agent is used for undergoing a surface treatment in advance prior to the preparation of a coating solution as a surface treating agent of the inorganic fine particle of the low refractive index layer. It is preferred to contain the coupling agent in the subject layer by further addition as an additive at the time of preparation of the coating solution for the layer.

For the purpose of reducing a load of the surface treatment, it is preferable that the inorganic fine particle is dispersed in advance in a medium prior to the surface treatment.

(Organosilane Compound for Low Refractive Index Layer and its Derivative)

From the standpoint of scar resistance, especially for the purpose of realizing both an antireflection ability and scar resistance, it is preferable that at least one member selected from an organosilane compound, a hydrolyzate of the organosilane, and a partial condensate of the organosilane is contained in the foregoing hardenable composition.

A reaction solution containing a hydrolyzate of an organosilane and a partial condensate thereof will be also hereinafter referred to as "sol component".

This organosilane compound or its sol component functions as a binder such that after coating, the foregoing hardenable composition is condensed in drying and heating processes to form a hardened material. Furthermore, in the case where the foregoing fluorine-containing polymer is contained, a binder having a three-dimensional structure is formed upon irradiation with active rays.

The foregoing organosilane compound is preferably one represented by the following formula [A].

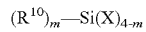

Formula [A]

In the foregoing formula [A], $R^{10}$ represents a substituted or unsubstituted alkyl group or a substituted or unsubstituted aryl group. Examples of the alkyl group include methyl, ethyl, propyl, isopropyl, hexyl, decyl, and hexadecyl. The alkyl group preferably has from 1 to 30 carbon atoms, more preferably from 1 to 16 carbon atoms, and especially preferably from 1 to 6 carbon atoms. Examples of the aryl group include phenyl and naphthyl. Of these, a phenyl group is preferable.

X represents a hydroxyl group or a hydrolyzable group. Examples of the hydrolyzable group include an alkoxy group (preferably an alkoxy group having from 1 to 5 carbon atoms, for example, a methoxy group and an ethoxy group), a halogen atom (for example, Cl, Br, and I), and $R^2COO$ (wherein $R^2$ is preferably a hydrogen atom or an alkyl group having from 1 to 5 carbon atoms; and examples thereof include $CH_3COO$ and $C_2H_5COO$). Of these, an alkoxy group is preferable; and a methoxy group and an ethoxy group are especially preferable.

m represents an integer of from 1 to 3, preferably 1 or 2, and especially preferably 1.

When plural $R^{10}$s or Xs are present, the plural $R^{10}$s or Xs may be the same or different.

The substituent which is contained in $R^{10}$ is not particularly limited, and examples thereof include a halogen atom (for example, fluorine, chlorine, and bromine), a hydroxyl group, a mercapto group, a carboxyl group, an epoxy group, an alkyl group (for example, methyl, ethyl, isopropyl, propyl, and t-butyl), an aryl group (for example, phenyl and naphthyl), an aromatic heterocyclic group (for example, furyl, pyrazolyl, and pyridyl), an alkoxy group (for example, methoxy, ethoxy, isopropoxy, and hexyloxy), an aryloxy group (for example, phenylthio), an alkylthio group (for example, methylthio and ethylthio), an arylthio group (for example, phenylthio), an alkenyl group (for example, vinyl and 1-propenyl), an acyloxy group (for example, acetoxy, acryloyloxy, and methacryloyloxy), an alkoxycarbonyl group (for example, methoxycarbonyl and ethoxycarbonyl), an aryloxycarbonyl group (for example, phenoxycarbonyl), a carbamoyl group (for example, carbamoyl, N-methylcarbamoyl, N,N-dimethylcarbamoyl, and N-methyl-N-octylcarbamoyl), and an acylamino group (for example, acetylamino, benzoylamino, acrylamino, and methacrylamino). Such a substituent may be further substituted.

In the case where plural $R^{10}$s are present, it is preferable that at least one of them is a substituted alkyl group or a substituted aryl group.

Among the organosilane compounds represented by the foregoing formula [A], a vinyl polymerizable substituent-containing organosilane compound represented by the following formula [B] is preferable.

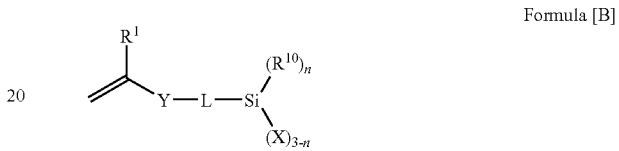

Formula [B]

In the foregoing formula [B], $R^1$ represents a hydrogen atom, a methyl group, a methoxy group, an alkoxycarbonyl group, a cyano group, a fluorine atom, or a chlorine atom. Examples of the alkoxycarbonyl group include a methoxycarbonyl group and an ethoxycarbonyl group. Above all, a hydrogen atom, a methyl group, a methoxy group, a methoxycarbonyl group, a cyano group, a fluorine atom, and a chlorine atom are preferable; a hydrogen atom, a methyl group, a methoxycarbonyl group, a fluorine atom, and a chlorine atom are more preferable; and a hydrogen atom and a methyl group are especially preferable.

Y represents a single bond, *—COO—**, *—CONH—**, or *—O—**. Of these, a single bond, *—COO—**, and *—CONH—** are preferable; a single bond and *—COO—** are more preferable; and *—COO—** is especially preferable. Here, * represents the binding position to =C($R^1$); and ** represents the binding position to L.

L represents a divalent connecting chain. Specific examples thereof include a substituted or unsubstituted alkylene group, a substituted or unsubstituted arylene group, a substituted or unsubstituted alkylene group containing a connecting group (for example, ethers, esters, and amides) therein, and a substituted or unsubstituted arylene group containing a connecting group therein. Of these, a substituted or unsubstituted alkylene group, a substituted or unsubstituted arylene group, and an alkylene group containing a connecting group therein are preferable; an unsubstituted alkylene group, an unsubstituted arylene group, and an alkylene group containing an ether or ester connecting group therein are more preferable; and an unsubstituted alkylene group and an alkylene group containing an ether or ester connecting group therein are especially preferable. Examples of the substituent include a halogen, a hydroxyl group, a mercapto group, a carboxyl group, an epoxy group, an alkyl group, and an aryl group. Such a substituent may be further substituted.

n represents 0 or 1 and is preferably 0.

$R^{10}$ is synonymous with $R^{10}$ in the formula [A] and is preferably a substituted or unsubstituted alkyl group or an unsubstituted aryl group, and more preferably an unsubstituted alkyl group or an unsubstituted aryl group.

X is synonymous with X in the formula [A]. Above all, a halogen atom, a hydroxyl group, and an unsubstituted alkoxy group are preferable; a chlorine atom, a hydroxyl group, and an alkoxy group having from 1 to 6 carbon atoms are more preferable; a hydroxyl group and an alkoxy group having from 1 to 3 carbon atoms are further preferable; and a methoxy group is especially preferable.

The compound of the formula [A] or formula [B] may be used in combination of two or more kinds thereof Specific examples of the compound represented by the formula [A] or formula [B] will be given below, but it should not be construed that the invention is limited thereto.

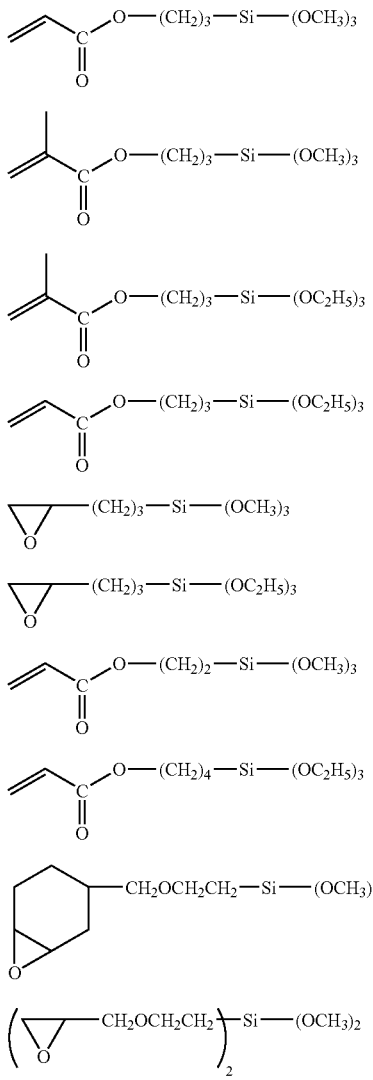

Of these, (M-1), (M-2) and (M-5) are especially preferable.

Then, in the case of using as a sol component, in general, a hydrolyzate of the foregoing organosilane compound and/or a partial condensate thereof is produced by treating the foregoing organosilane compound in the presence of a catalyst. Examples of the catalyst include inorganic acids such as hydrochloric acid, sulfuric acid, and nitric acid; organic acids such as oxalic acid, acetic acid, formic acid, methanesulfonic acid, and toluenesulfonic acid; inorganic bases such as sodium hydroxide, potassium hydroxide, and ammonia; organic bases such as triethylamine and pyridine; metal alkoxides such as triisopropoxyaluminum and tetrabutoxyzirconium; and metal chelate compounds containing a metal (for example, Zr, Ti, and Al) as a central metal. In the invention, it is preferred to use a metal chelate compound or an acid catalyst such as inorganic acids and organic acids. Hydrochloric acid and sulfuric acid are preferable as the inorganic acid; and ones having an acid dissociation constant (pKa value (at 25° C.)) in water of not more than 4.5 are preferable as the organic acid. Hydrochloric acid, sulfuric acid, and an organic acid having an acid dissociation constant in water of not more than 3.0 are more preferable; hydrochloric acid, sulfuric acid, and an organic acid having an acid dissociation constant in water of not more than 2.5 are further preferable; and an organic acid having an acid dissociation constant in water of not more than 2.5 is especially preferable. Concretely, methanesulfonic acid, oxalic acid, phthalic acid, and malonic acid are preferable, with oxalic acid being especially preferable.

As the metal chelate compound, ones containing, as a central metal, a metal selected from Zr, Ti and Al, in which an alcohol represented by the formula, $R^3OH$ (wherein $R^3$ represents an alkyl group having from 1 to 10 carbon atoms) and a compound represented by the formula, $R^4COCH_2COR^5$ (wherein $R^4$ represents an alkyl group having from 1 to 10 carbon atoms; and $R^5$ represents an alkyl group having from 1 to 10 carbon atoms or an alkoxy group having from 1 to 10 carbon atoms) function as ligands, can be suitably used without particular limitations. Two or more kinds of metal chelate compounds may be used together within this scope. The metal chelate compound which is used in the invention is preferably selected from the group of compounds represented by the formulae, $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$ and acts to accelerate a condensation reaction of a hydrolyzate of the foregoing organosilane compound and/or a partial condensate thereof.

In the foregoing metal chelate compounds, $R^3$ and $R^4$ may be the same or different and each represents an alkyl group having from 1 to 10 carbon atoms. Specific examples of the alkyl group include an ethyl group, an n-propyl group, an isopropyl group, an n-butyl group, a sec-butyl group, a t-butyl group, an n-pentyl group, and a phenyl group. Furthermore, $R^5$ represents an alkyl group having from 1 to 10 carbon atoms the same as in the foregoing or an alkoxy group having from 1 to 10 carbon atoms. Examples of the alkoxy group include a methoxy group, an ethoxy group, an n-propoxy group, an isopropoxy group, an n-butoxy group, a sec-butoxy group, and a t-butoxy group. Moreover, in the foregoing metal chelate compounds, p1, p2, q1, q2, r1 and r2 each represents an integer which is determined such that the relations: (p1+p2)=4, (q1+q2)=4 and (r1+r2)=3 are satisfied, Specific examples of such a metal chelate compound include zirconium chelate compounds such as zirconium tri-n-butoxyethylacetoacetate, zirconium di-n-butoxybis(ethylacetoacetate), zirconium n-butoxytris(ethylacetoacetate), zirconium tetrakis(n-propylaetoacetate), zirconnium tetrakis (acetylacetoacetate), and zirconium tetrakis(ethylacetoacetate); titanium chelate compounds such as titanium diisopropoxy.bis(ethylacetoacetate), titanium diisopropoxy.bis (acetylacetate), and titanium diisopropoxy.bis(acetylcetone); and aluminum chelate compounds such as aluminum diisopropoxyethylacetoacetate, aluminum diisopropoxyacetylacetate, aluminum isopropoxybis(ethylacetoacetate), aluminum isopropoxybis(acetylacetonate), aluminum tris (ethylacetoacetate), aluminum tris(acetylacetonate), and aluminum monoacetylacetonato.bis(ethylacetoacetate).

Of these metal chelate compounds, zirconium tri-n-butoxyethylacetoacetate, titanium diisopropoxybis(acetylacetonate), aluminum diisopropoxyethylacetoacetate, and aluminum tris(ethylacetoacetate) are preferable. Such a metal chelate compound can be used singly or in admixture of two or more kinds thereof A partial hydrolyzate of such a metal chelate compound can also be used.

Furthermore, it is preferable that a β-diketone compound and/or a β-ketoester compound is further added in the composition for low refractive index layer. This will be further described below.

A β-diketone compound and/or a β-ketoester compound represented by the formula, $R^4COCH_2COR^5$ is preferable as the β-diketone compound and/or the β-ketoester compound and acts as a stability improving agent of the composition for low refractive index layer. Here, $R^4$ represents an alkyl group having from 1 to 10 carbon atoms; and $R^5$ represents an alkyl group having from 1 to 10 carbon atoms or an alkoxy group having from 1 to 10 carbon atoms. That is, it is thought that when this compound coordinates with the metal atom in the metal chelate compound (for example, zirconium, titanium and/or aluminum compounds), it inhibits an action of acceleration of a condensation reaction of a hydrolyzate of the organosilane compound and/or a partial condensate thereof by such a metal chelate compound, thereby acting to improve the storage stability of the resulting composition. $R^4$ and $R^5$ which constitute the β-diketone compound and/or β-ketoester compound are synonymous with $R^4$ and $R^5$ which constitute the foregoing metal chelate compound.

Specific examples of this β-diketone compound and/or β-ketoester compound include acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,3-hexane-dione, 2,4-heptane-dione, 3,5-heptane-dione, 2,4-octane-dione, 2,4-nonane-dione, and t-methylhexane-dione. Of these, ethyl acetoacetate and acetylacetone are preferable; and acetylacetone is especially preferable. Such a β-diketone compound and/or β-ketoester compound can be used singly or in admixture of two or more kinds thereof. In the invention, the β-diketone compound and/or β-ketoester compound is preferably used in an amount of 2 moles or more, and more preferably from 3 to 20 moles per mole of the metal chelate compound. When the amount of the β-diketone compound and/or β-ketoester compound is less than 2 moles, the storage stability of the resulting composition may possibly be deteriorated, and therefore, such is not preferable.

The blending amount of the foregoing organosilane compound is preferably from 0.1 to 50% by weight, more preferably from 0.5 to 30% by weight, and most preferably from 1 to 20% by weight of the whole of solids of the low refractive index layer.

Though the foregoing organosilane compound may be added directly in the hardenable composition (for example, a coating solution for internal scattering layer or low refractive index layer), it is preferable that the foregoing organosilane compound is previously treated in the presence of a catalyst to prepare a hydrolyzate of the foregoing organosilane compound and/or a partial condensate thereof and the foregoing hardenable composition is prepared by using the resulting reaction solution (sol solution). In the invention, it is preferable that a composition containing a hydrolyzate of the foregoing organosilane compound and/or a partial condensate and a metal chelate compound is first prepared and a solution resulting from adding a β-dietone compound and/or a β-ketoestr compound in this composition is then contained in a coating solution for at least one layer of an internal scattering layer or a low refractive index layer, followed by coating.

The amount of use of the sol component of the organosilane with respect to the fluorine-containing polymer in the low refractive index layer is preferably from 5 to 100% by weight, more preferably from 5 to 40% by weight, further preferably from 8 to 35% by weight, and especially preferably from 10 to 30% by weight. When the amount of use of the sol component is too low, the effect of the invention is hardly obtained, whereas when it is too high, the refractive index likely increases and the shape or surface properties of the film are likely deteriorated, and therefore, such is not preferable.

(Sol-Gel Raw Material)

A variety of sol-gel raw materials can be used as a raw material for the low refractive index layer. As such a sol-gel raw material, there can be used metal alcoholate (for examples, alcoholates of silicon, titanium, aluminum, zirconium, or the like), organoalkoxy metal compounds, and hydrolyzates thereof. Above all, alkoxysilanes, organoalkoxysilanes, and hydrolyzates thereof are especially preferable. Examples thereof include tetraalkoxysilanes (for example, tetramethoxysilane and tetraethoxysilane), alkyltrialkoxysilanes (for example, methyltrimethoxysilane and ethyltrimethoxysilane), aryltrialkoxysilanes (for example, phenyltrimethoxysilane), di-alkyldialkoxysilanes, and diaryldialkoxysilanes. Also, organoalkoxysilanes having a variety of functional groups (for example, vinyltrialkoxysilanes, methylvinyldialkoxy-silanes, γ-glycidyloxypropyltrialkoxysilanes, γ-glycidyloxypropyldialkoxysilanes, β-(3,4-epoxydicyclohexyl)ethyltrialkoxysilanes, γ-methacryloyloxypropyltrialkoxysilanes, γ-aminopropyltrialkoxysilanes, γ-mercaptopropyltrialkoxysilanes, and γ-chloropropyltrialkoxysilanes), perfluoroalkyl group-containing silane compounds (for example, (hepta-decafluoro-1,1,2,2-tetradecyl)triethoxysilane and 3,3,3-trifluoropropyltrimethoxysilane) are preferably used. Use of a fluorine-containing silane compound is especially preferable in view of realizing a low refractive index of the layer and imparting water repellency or oil repellency.

(Other Substance to be Contained in the Composition for Low Refractive Index Layer)

In addition to the foregoing fluorine-containing polymer, inorganic fine particle and organosilane compound, a variety of additives and a radical polymerization initiator or a cationic polymerization initiator can be added in the composition for low refractive index layer as the need arises. On that occasion, though the concentration of solids such as additives is properly selected depending upon the application, it is generally from about 0.01 to 60% by weight, preferably from about 0.5 to 50% by weight, and especially preferably from about 1 to 20% by weight.

From the viewpoints of interfacial adhesiveness between the low refractive index layer and a lower layer coming into direct contact therewith and so on, a small amount of a hardening agent such as polyfunctional (meth)acrylate compounds, polyfunctional epoxy compounds, polyisocyanate compounds, aminoplasts, and polybasic acids or anhydride thereof can be added. In the case of adding such a hardening agent, it is preferably added in an amount in the range of not more than 30% by weight, more preferably in the range of not more than 20% by weight, and especially preferably in the range of not more than 10% by weight based on the whole of solids of the low refractive index layer film.

Furthermore, for the purpose of imparting characteristics such as antifouling properties, water-proof properties, chemical resistance, and slipperiness, known antifouling agents and slipping agents made of a silicone based compound or a fluorine based compound and so on can be properly added. In the case where such an additive is added, the amount of addition of the additive is preferably in the range of from 0.01 to 20% by weight, more preferably in the range of from 0.05 to 10% by weight, and especially preferably in the range of from 0.1 to 5% by weight of the whole of solids of the low refractive index layer.

Preferred examples of the silicone based compound include compounds containing plural dimethylsilyloxy units as a repeating unit and containing a substituent in a terminal and/or a side chain of the chemical chain thereof Furthermore, a structural unit other than dimethylsilyloxy may be contained in the chemical chain containing dimethylsilyloxy as a repeating unit. The substituent may be the same or different, and it is preferable that plural substituents are contained. Preferred examples of the substituent include groups containing, for example, an acryloyl group, a methacryloyl group, a vinyl group, an aryl group, a cinnamoyl group, an oxetanyl group, a fluoroalkyl group, a polyoxyalkylene group, a carboxyl group, or an amino group. Though the molecular weight of this polysiloxane based compound is not particularly limited, it is preferably not more than 100,000, more preferably not more than 50,000, especially preferably from 3,000 to 30,000, and most preferably from 10,000 to 20,000. Though the silicon atom content of the silicone based compound is not particularly limited, it is preferably 18.0% by weight or more, especially preferably from 25.0 to 37.0% by weight, and most preferably from 30.0 to 37.0% by weight. Preferred examples of the silicone based compound include X-22-174DX, X-22-2426, X-22-164B, X-22-164C, and X-22-1821 (all of which are a trade name of Shin-Etsu Chemical Co., Ltd.); FM-0725, FM-7725, FM-6621, and FM-1121 (all of which are a trade name of Chisso Corporation); and DMS-U22, RMS-033, RMS-083, UMS-182, DMS-H21, DMS-H31, HMS-301, FMS121, FMS123, FMS131, FMS141, and FMS221 (all of which are a trade name of Gelest, Inc.).

The fluorine based compound is preferably a compound containing a fluoroalkyl group are preferable. The subject fluoroalkyl group preferably has from 1 to 20 carbon atoms, and more preferably from 1 to 10 carbon atoms. The fluoroalkyl group may be of a linear structure (for example, $-CF_2CF_3$, $-CH_2(CF_2)_4H$, $-CH_2(CF_2)_8CF_3$, and $-CH_2CH_2(CF_2)_4H$), a branched structure (for example, $CH(CF_3)_2$, $CH_2CF(CF_3)_2$, $CH(CH_3)CF_2CF_3$, and $CH(CH_3)(CF_2)_5CF_2H$), or an alicyclic structure (preferably a 5-membered ring or a 6-membered ring; for example, a perfluorocyclohexyl group, a perfluorocyclopentyl group, and an alkyl group substituted with the preceding group); and may contain an ether bond (for example, $CH_2OCH_2CF_2CF_3$, $CH_2CH_2OCH_2C_4F_8H$, $CH_2CH_2OCH_2CH_2C_8F_{17}$, and $CH_2CH_2OCF_2CF_2OCF_2CF_2H$). Plural fluoroalkyl groups may be contained in the same molecule.

It is preferable that the fluorine based compound further contains a substituent which contributes to the formation of binding to a low refractive index layer film or compatibility therewith. The subject substituent may be the same or different, and it is preferable that plural substituents are contained. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine based compound may be a polymer or oligomer with a fluorine atom-free compound. Its molecular weight is not particularly limited. Though the fluorine atom content of the fluorine based compound is not particularly limited, it is preferably 20% by weight or more, especially preferably from 30 to 70% by weight, and most preferably from 40 to 70% by weight. Preferred examples of the fluorine based compound include R-2020, M-2020, R-3833, and M-3833 (all of which are a trade name of Daikin Industries, Ltd.); and MEGAFAC F-171, MEGAFAC F-172 and MEGAFAC F-170A, and DEFENSA MCF-300 (all of which are a trade name of Dainippon Ink and Chemical, Incorporated). However, it should not be construed that the invention is limited thereto.

For the purpose of imparting characteristics such as dust removal properties and antistatic properties, dust removing agents or antistatic agents such as known cationic surfactants and polyoxyalkylene based compounds can also be properly added. With respect to such a dust removing agent or antistatic agent, its structural unit may be contained as a part of the function in the foregoing silicone based compound or fluorine based compound. When such a dust removing agent or antistatic agent is added as an additive, it is preferably added in an amount ranging from 0.01 to 20% by weight, more preferably from 0.05 to 10% by weight, and especially preferably from 0.1 to 5% by weight of the whole of solids of the low refractive index layer. Preferred examples of the dust removing agent or antistatic agent include MEGAFAC F-150 (a trade name of Dainippon Ink and Chemicals, Incorporated) and SH-3748 (a trade name of Dow Corning Toray Co., Ltd.). However, it should not be construed that the invention is limited thereto.

Furthermore, an inorganic filler other than the foregoing inorganic fine particle can be added in the composition for low refractive index layer within the range where the desired effect of the invention is not hindered. As the inorganic filler, those as described previously can be used.

(Solvent for Low Refractive Index Layer)

As a solvent which is used in a coating composition for forming the low refractive index layer, a variety of solvents which are selected from the viewpoints that each component can be dissolved or dispersed therein; that uniform surface properties are liable to be obtained in a coating step and a drying step; that liquid preservability can be ensured; and that they have a proper saturated vapor pressure can be used. It is preferable from the viewpoint of a drying load that a solvent having a boiling point of not higher than 100° C. at room temperature under atmospheric pressure is used as the major component, whereas a small amount of a solvent having a boiling point of 100° C. or higher is contained for the purpose of adjusting the drying speed.

Examples of the solvent having a boiling point of not higher than 100° C. include hydrocarbons such as hexane (boiling point: 68.7° C.), heptane (boiling point: 98.4° C.), cyclohexane (boiling point: 80.7° C.), and benzene (boiling point: 80.1° C.); halogenated hydrocarbons such as dichloromethane (boiling point: 39.8° C.), chloroform (boiling point: 61.2° C.), carbon tetrachloride (boiling point: 76.8° C.), 1,2-dichloroethane (boiling point: 83.5° C.), and trichloroethylene (boiling point: 87.2° C.); ethers such as diethyl ether (boiling point: 34.6° C.), diisopropyl ether (boiling point: 68.5° C.), dipropyl ether (boiling point: 90.5° C.), and tetrahydrofuran (boiling point: 66° C.); esters such as ethyl formate (boiling point: 54.2° C.), methyl acetate (boiling point: 57.8° C.), ethyl acetate (boiling point: 77.1° C.), and isopropyl acetate (boiling point: 89° C.); ketones such as acetone (boiling point: 56.1° C.) and 2-butanone (the same as methyl ethyl ketone, boiling point: 79.6° C.); alcohols such as methanol (boiling point: 64.5° C.), ethanol (boiling point: 78.3° C.), 2-propnaol (boiling point: 82.4° C.), and 1-propanol (boiling point: 97.2° C.); cyano compounds such as acetonitrile (boiling point: 81.6° C.) and propionitrile (boiling point: 97.4° C.); and carbon disulfide (boiling point: 46.2°

C.). Of these, ketones and esters are preferable; and ketones are especially preferable. Among the ketones, 2-butanol is especially preferable.

Examples of the solvent having a boiling point of 100° C. or higher include octane (boiling point: 125.7° C.), toluene (boiling point: 110.6° C.), xylene (boiling point: 138° C.), tetrachloroethylene (boiling point: 121.2° C.), chlorobenzene (boiling point: 131.7° C.), dioxane (boiling point: 101.3° C.), dibutyl ether (boiling point: 142.4° C.), isobutyl acetate (boiling point: 118° C.), cyclohexanone (boiling point: 155.7° C.), 2-methyl-4-pentanone (the same as MIBK, boiling point: 115.9° C.), 1-butanol (boiling point: 117.7° C.), N,N-dimethylformamide (boiling point: 153° C.), N,N-dimethylacetamide (boiling point: 166° C.), and dimethyl sulfoxide (boiling point: 189° C.). Of these, cyclohexanone and 2-methyl-4-pentanone are preferable.

[Transparent Conductive Layer]

In the antireflection film of the invention, for the antistatic purpose, it is preferred from the standpoint of destaticization on the film surface to provide a transparent conductive layer. When it is required to decrease a surface resistivity value from the display side, the transparent conductive layer is effective in the case where contamination on the surface is of a problem. Examples of a method of forming a transparent conductive layer include known methods such as a method of coating a conductive coating solution containing a conductive particle and a reactive hardenable resin; and a method of forming a conductive thin film by vapor deposition or sputtering of a metal or metal oxide capable of forming a transparent film, etc. In the case of coating, the coating method is not particularly limited, and an optimum method is selected and performed among known methods such as roll coating, gravure coating, bar coating, and extrusion coating depending upon the characteristics and coating amount of the coating solution.

The transparent conductive layer can be formed on the transparent or the internal scattering layer directly or via a primer layer capable of strengthening adhesion thereto.

The transparent conductive layer preferably has a thickness of from 0.01 to 10 µm, more preferably from 0.03 to 7 µm, and further preferably from 0.05 to 5 µm. The antistatic layer preferably has a surface resistivity of from $10^5$ to $10^{12}$ Ω/sq, more preferably from $10^5$ to $10^9$ Ω/sq, and most preferably from $10^5$ to $10^8$ Ω/sq. The surface resistivity can be measured by a four probe method.

It is preferable that the transparent conductive layer is substantially transparent. Concretely, the transparent conductive layer preferably a haze of not more than 10%, more preferably not more than 5%, further preferably not more than 3%, and most preferably not more than 1%. The antistatic layer preferably has a transmittance against light having a wavelength of 550 nm of 50% or more, more preferably 60% or more, further preferably 65% or more, and most preferably 70% or more.

The transparent conductive layer of the invention is excellent in strength. Concretely, the transparent conductive layer preferably has a strength of H or more, more preferably 2H or more, further preferably 3H or more, and most preferably 4H or more in terms of a pencil hardness (as defined in JIS K5400) with a load of 1 kg.

(Conductive Particle)

A primary particle of the conductive particle which is used for the transparent conductive layer preferably has an average particle size of from 1 to 150 nm, more preferably from 5 to 100 nm, and most preferably from 5 to 70 nm. The conductive particle in the transparent conductive layer to be formed has an average particle size of from 1 to 200 nm, preferably from 5 to 150 nm, more preferably from 10 to 100 nm, and most preferably from 10 to 80 nm. The average particle size of the conductive particle is an average particle size expecting the weight of the particle as a weight and can be measured by a light scattering method or from an electron microscopic photograph.

The conductive particle preferably has a specific surface area of from 10 to 400 $m^2/g$, more preferably from 20 to 200 $m^2/g$, and most preferably from 30 to 150 $m^2/g$.

It is preferable that the conductive particle is formed of a metal oxide or nitride. Examples of the metal oxide or nitride include tin oxide, indium oxide, zinc oxide, and titanium nitride. Of these, tin oxide and indium oxide are especially preferable.

The conductive particle contains, as the major component, such a metal oxide or nitride and can further contain other element. The "major component" as referred to herein means a component having the highest content (% by weight) among the components which constitute the particle. Examples of other element include Ti, Zr, Sn, Sb, Cu, Fe, Mn, Pb, Cd, As, Cr, Hg, Zn, Al, Mg, Si, P, S, B, Nb, In, V, and halogen atoms. For the purpose of enhancing the conductivity of tin oxide and indium oxide, it is preferred to use Sb, P, B, Nb, In, V, or a halogen atom. Tin oxide containing Sb (ATO) and indium oxide containing Sn (ITO) are especially preferable. A proportion of Sb in ATO is preferably from 3 to 20% by weight; and a proportion of Sn in ITO is preferably from 5 to 20% by weight.

The conductive particle may be subjected to a surface treatment. The surface treatment is carried out by using an inorganic compound or an organic compound. Examples of the inorganic compound which is used for the surface treatment include alumina and silica. A silica treatment is especially preferable. Examples of the organic compound which is used for the surface treatment include polyols, alkanolamines, stearic acid, silane coupling agents, and titanate coupling agents. Of these, silane coupling agents are the most preferable. The surface treatment may be carried out by combining two or more kinds of surface treatments.

It is preferable that the shape of the conductive particle is a rice grain form, a spherical form, a cubic form, a spindle-like shape, or an amorphous form.

A proportion of the conductive inorganic particle in the transparent conductive layer is preferably from 20 to 90% by weight, more preferably from 25 to 85% by weight, and further preferably from 30 to 80% by weight.

Two or more kinds of conductive particles may be used together within the transparent conductive layer.

The conductive particle can be used in a state of a dispersion in the transparent conductive layer. It is preferred to use a liquid having a boiling point of from 60 to 170° C. as a dispersion medium of the conductive particle. Examples of the dispersion medium include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate, and butyl formate), aliphatic hydrocarbons (for example, hexane and cyclohexane), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofuran), and ether alcohols (for example, 1-methoxy-2-propanol). Of these, toluene, xylene, methyl ethyl ketone, methyl isobutyl ketone, cyclohexanone, and butanol are especially preferable. The conductive particle can be dispersed by using a dispersion machine. Examples of the dispersion machine include a sand grinder mill (for example, a pin-provided bead mill), a high-speed impeller mill, a pebble mill, a roller mill, an attritor, and a colloid mill. Of these, a sand grinder mill and a high-speed impeller mill are especially preferable. Furthermore, a preliminary dispersion treatment may be carried out. Examples of a dispersion machine which is used for the preliminary dispersion treatment include a ball mill, a three-roll mill, a kneader, and an extruder.

(Binder of Transparent Conductive Layer)

In the transparent conductive layer, a crosslinked polymer can be used as a binder. It is preferable that the crosslinked polymer contains an anionic group. The crosslinked anionic group-containing polymer has a structure in which the principal chain of an anionic group-containing polymer is crosslinked. The anionic group has a function to keep the dispersed state of the conductive particle. The crosslinking structure has a function to impart a coating film-forming ability to the polymer, thereby reinforcing the transparent conductive layer.

Examples of the principal chain of the polymer include polyolefins (saturated hydrocarbons), polyethers, polyurethanes, polyesters, polyamines, polyamides, and melamine resins. Above all, a polyolefin principal chain, a polyether principal chain and a polyurea principal chain are preferable; a polyolefin principal chain and a polyether principal chain are more preferable; and a polyolefin principal chain is the most preferable.

The polyolefin principal chain is composed of a saturated hydrocarbon. The polyolefin principal chain is obtained by, for example, an addition polymerization reaction of an unsaturated polymerizable group.

In the polyether principal chain, a repeating unit thereof is bound via an ether bond (—O—). The polyether principal chain is obtained by, for example, a ring opening polymerization reaction of an epoxy group.

In the polyurea principal chain, a repeating unit thereof is bound via a urea bond (—NH—CO—NH—). The polyurea principal chain is obtained by, for example, a condensation polymerization reaction between an isocyanate group and an amino group. In the polyurethane principal chain, a repeating unit thereof is bound via a urethane bond (—NH—CO—O—).

The polyurethane principal chain is obtained by, for example, a condensation polymerization reaction between an isocyanate group and a hydroxyl group (including an N-methylol group).

In the polyester principal chain, a repeating unit thereof is bound via an ester bond (—CO—O—). The polyester principal chain is obtained by, for example, a condensation polymerization reaction between a carboxyl group (including an acid halide group) and a hydroxyl group (including an N-methylol group).

In the polyamine principal chain, a repeating unit thereof is bound via an imino bond (—NH—). The polyamine principal chain is obtained by, for example, a ring opening polymerization reaction of an ethyleneimine group. In the polyamide principal chain, a repeating unit thereof is bound via an amide bond (—NH—CO—).

The polyamide principal chain is obtained by, for example, a reaction between an isocyanate group and a carboxyl group (including an acid halide group).

The melamine resin principal chain is obtained by, for example, a condensation polymerization reaction between a triazine group (for example, melamine) and an aldehyde (for example, formaldehyde). Incidentally, in the melamine resin, the principal chain itself has a crosslinking structure.

The anionic group is bound directly to the polymer principal chain or bound to the principal chain via a connecting group. It is preferable that the anionic group is bound as a side chain to the principal chain via a connecting group.

Examples of the anionic group include a carboxylic acid group (carboxyl), a sulfonic acid group (sulfo), and a phosphoric acid group (phosphono), with the sulfonic acid group and the phosphoric acid group being preferable.

The anionic group may be in a salt state. A cation which forms a salt together with the anionic group is preferably an alkali metal ion. Furthermore, a proton of the anionic group may be dissociated.

It is preferable that the connecting group which binds the anionic group to the polymer principal chain is a divalent group selected from —CO—, —O—, an alkylene group, an arylene group, and combinations thereof.

The crosslinking structure undergoes chemical binding (preferably covalent binding) of two or more principal chains and preferably undergoes covalent binding of three or more principal chains. It is preferable that the crosslinking structure is composed of divalent or polyvalent groups selected from —CO—, —O—, —S—, a nitrogen atom, a phosphorus atom, an aliphatic residue, an aromatic residue, and combinations thereof.

It is preferable that the crosslinked anionic group-containing polymer is a copolymer containing an anionic group-containing repeating unit and a repeating unit having a crosslinking structure. A proportion of the anionic group-containing repeating unit in the copolymer is preferably from 2 to 96% by weight, more preferably from 4 to 94% by weight, and most preferably from 6 to 92% by weight. The repeating unit may contain two or more anionic groups. A proportion of the repeating unit having a crosslinking structure in the copolymer is preferably from 4 to 98% by weight, more preferably from 6 to 96% by weight, and most preferably from 8 to 94% by weight.

The repeating unit of the crosslinked anionic group-containing polymer may have both an anionic group and a crosslinking structure. Furthermore, other repeating unit (repeating unit having neither an anionic group nor a crosslinking structure) may be contained.

As other repeating unit, a repeating unit containing an amino group or a quaternary ammonium group and a repeating unit containing a benzene ring are preferable. The amino group or quaternary ammonium group has a function to hold a dispersed state of an inorganic particle similar to the anionic group. Incidentally, even when the amino group, the quaternary ammonium group or the benzene ring is contained in the anionic group-containing repeating unit or the repeating unit having a crosslinking structure, the same effect is obtainable.

In the repeating unit containing an amino group or a quaternary ammonium group, the amino group or the quaternary ammonium group is bound directly to the polymer principal chain or bound to the principal chain via a connecting group. It is preferable that the amino group or the quaternary ammonium group is bound as a side chain to the principal chain via a connecting group.

The amino group or the quaternary ammonium group is preferably a secondary amino group, a tertiary amino group, or a quaternary ammonium group, and more preferably a tertiary amino group or a quaternary ammonium group. In the secondary amino group, tertiary amino group or quaternary ammonium group, a group which is bound to the nitrogen atom is preferably an alkyl group, more preferably an alkyl group having from 1 to 12 carbon atoms, and most preferably an alkyl group having from 1 to 6 carbon atoms.

It is preferable that a counter ion of the quaternary ammonium group is a halide ion. It is preferable that the connecting group which binds the secondary amino group, tertiary amino group or quaternary ammonium group to the polymer principal chain is a divalent group selected from —CO—, —NH—, —O—, an alkylene group, an arylene group, and combinations thereof. In the case where the crosslinked anionic group-containing polymer contains a repeating unit containing an amino group or a quaternary ammonium group, a proportion of the repeating unit is preferably from 0.06 to 32% by weight, more preferably from 0.08 to 30% by weight, and most preferably from 0.1 to 28% by weight.

The following reactive organosilicon compound which is described in, for example, JP-A-2003-39586 can be used together with the foregoing binder. The reactive organosilicon compound is used in an amount in the range of from 10 to 100% by weight based on the total sum of the ionizing radiation hardenable resin and the reactive organosilicon compound. In particular, in the case of using the following ionizing radiation hardenable organosilicon compound (3), it is possible to form a conductive layer by using only this compound as a resin component.

(1) Silicon Alkoxide:

A silicon alkoxide is a compound represented by $R_mSi(OR')_n$, wherein R and R' each represents an alkyl group having from 1 to 10 carbon atoms; and $m$ and $n$ each represents an integer such that the relationship: (m+n)=4 is satisfied. Examples of the silicon alkoxide include tetramethoxysilane, tetraethoxysilane, tetraisopropoxysilane, tetra-n-butoxysilane, tetra-n-butoxysilane, tetra-sec-butoxysilane, tetra-tert-butoxysilane, tetrapentaethoxysilane, tetrapentaisopropoxysilane, tetra-penta-n-propoxysilane, tetrapenta-n-butoxysilane, tetrapenta-sec-butoxysilane, tetra-penta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethyl-propoxysilane, dimethylbutoxysilane, methyldimethoxysilane, methyldiethoxysilane, and hexyltrimethoxysilane.

(2) Silane Coupling Agent:

Examples of a silane coupling agent include γ-(2-aminoethyl)aminopropyltrimethoxysilane, γ-(2-aminoethyl)amino-propylmethyldimethoxysilane, β-(3,4-epoxycyclohexyl)ethyltrimethoxysilane, γ-aminopropyltriethoxysilane, γ-methacryloxypropyltrimethoxysilane, N-β-(N-vinyl-benzylaminoethyl)-γ-aminopropylmethoxysilane hydrochloride, γ-glycydoxy-propyltrimethoxysilane, aminosilane, methyltrimethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(tri-methoxysilyl)propyl]ammonium chloride, methyltrichlorosilane, and dimethyldichlorosilane.

(3) Ionizing Radiation Hardenable Silicon Compound:

Examples of an ionizing radiation hardenable silicon compound include organosilicon compounds having a molecular weight of not more than 5,000 and containing plural groups capable of causing reaction and crosslinking by ionizing radiations, for example, a polymerizable double bond group. Examples of such a reactive organosilicon compound include one-terminal vinyl functional polysilanes, both-terminal vinyl functional polysilanes, one-terminal vinyl functional polysiloxanes, and both-terminal vinyl functional polysiloxanes; and vinyl functional polysilanes or vinyl functional polysiloxanes resulting from reaction of the foregoing compounds.

Examples of other compounds include (meth)acryloxysilane compounds such as 3-(meth)acryloxypropyltrimethoxysilane and 3-(meth)acryloxypropylmethyldimethoxysilane.

In order to more reveal the antistatic function, it is also preferable that a conductive particle is dispersed in the internal scattering layer of the invention, thereby bringing a function as an anisotropic conductive film as described in JP-A-2003-39586.

[Transparent Support]

As the transparent support of the antireflection film, it is preferred to use a plastic film. Examples of a polymer capable of forming a plastic film include cellulose acylates (for example, triacetyl cellulose, diacetyl cellulose, cellulose acetate propionate, and cellulose acetate butyrate, and representatively TAC-TD80U and TD80UL as manufactured by Fuji Photo Film Co., Ltd.), polyamides, polycarbonates, polyesters (for example, polyethylene terephthalate, and polyethylene naphthalate), polystyrene, polyolefins, norbornene based resins (for example, ARTON: a trade name of JSR Corporation), and amorphous polyolefins (for example, ZEONEX: a trade name of Zeon Corporation). Of these, triacetyl cellulose, polyethylene terephthalate, norbornene based resins, and amorphous polyolefins are preferable; and triacetyl cellulose is especially preferable.

The cellulose acylate is made of a single layer or plural layers. The cellulose acylate made of a single layer is prepared by drum casting or band casting or other means as disclosed in JP-A-7-11055; and the latter cellulose acylate made of plural layers is prepared by a so-called co-casting method as disclosed in JP-A-61-94725 and JP-B-62-43846. That is, this method is a method in which in casting a solution (referred to as "dope") prepared by dissolving a raw material flake in a solvent such as halogenated hydrocarbons (for example, dichloromethane), alcohols (for example, methanol, ethanol, and butanol), esters (for example, methyl formate and methyl acetate), and ethers (for example, dioxane, dioxolan, and diethyl ether) and optionally adding thereto a variety of additives such as a plasticizer, an ultraviolet ray absorber, an anti-deterioration agent, a slipping agent, and a peeling accelerator on a support composed of a horizontal endless metal belt or a rotatory drum by a dope feed measure (referred to as "die"), a single dope is subjected to single layer casting in the case of a single layer, or a low-concentration dope is subjected to co-casting on the both sides of a high-concentration cellulose ester dope in the case of plural layers; the dope is dried on the support to some extent, thereby separating a film to which rigidity has been imparted from the support; and the film is then passed through a drying section by a conveyance measure, thereby removing the solvent.

As the solvent for dissolving the foregoing cellulose acylate, dichloromethane is representative. However, from the viewpoint of the global environment or working environment, it is preferable that the solvent does not substantially contain a halogenated hydrocarbon such as dichloromethane. It is meant by the terms "does not substantially contain" that a proportion of the halogenated hydrocarbon in the organic solvent is less than 5% by weight (preferably less than 2% by weight).

The foregoing various cellulose acylate films (for example, films made of triacetyl cellulose) and production methods thereof are described in *Journal of Technical Disclosure* No. 2001-1745, issued by the Japan Institute of Invention and Innovation (Mar. 15, 2001).

The cellulose acylate film preferably has a thickness of from 40 μm to 120 μm. Taking into account handling adaptability, coating adaptability, and so on, the thickness of the cellulose acylate film is preferably approximately 80 μm; and since a requirement for thinning of a polarizing plate becomes large due to the recent trend toward thinning of a display device, from the viewpoint of thinning of a polarizing plate, the thickness of the cellulose acylate film is preferably from approximately 40 μm to 60 μm. In the case of using such a thin cellulose acylate film as the transparent support of the antireflection film of the invention, it is preferred to avoid the foregoing problems such as handling and coating adaptability by optimizing a solvent of the layer on which the cellulose acylate film is directly coated, film thickness, crosslinking and shrinkage degree, and so on.

[Re: Other Layers]

[Other Layers]

Examples of other layers which may be provided between the transparent support and the internal scattering layer of the invention include a moisture-proof layer, an adhesiveness improving layer, and a layer for preventing spectral unevenness (interference unevenness). Such a layer can be formed by a known method.

[Production Method of Antireflection Film]

The antireflection film of the invention can be formed in the following method, but it should not be construed that the invention is limited thereto.

(Preparation of Coating Solution)

First of all, a coating solution containing components for forming each layer is prepared. On that occasion, by minimizing the amount of volatilization of a solvent, it is possible to suppress an increase of the water content in the coating solution. The water content in the coating solution is preferably not more than 5%, and more preferably not more than 2%. Suppression of the amount of volatilization of the solvent is achieved by, for example, improving tightness at the time of stirring after charging the respective raw materials in a tank and minimizing an air contact area of the coating solution at the time of liquid transfer works. Furthermore, a measure for lowering the water content in the coating solution during coating or before or after coating may be provided.

It is preferable that the coating solution for forming the internal scattering layer is subjected to filtration such that foreign substances having a size corresponding to a dry thickness (from about 50 nm to 120 m) of the low refractive index layer to be formed directly thereon can be substantially removed (to an extent of 90% or more). Since the translucent fine particle is equal to or larger than the thickness of the low refractive index layer, it is preferable that the foregoing filtration is applied to an intermediate solution in which all raw materials other than the translucent fine particle are added. Furthermore, in the case where a filter capable of removing the foregoing foreign substances having a small particle size is not available, it is preferable that the filtration is carried out such that foreign substances corresponding to a wet thickness (from about 1 to 10 μm) of at least a layer to be formed directly thereon can be substantially removed. By such a measure, a point defect of the layer to be formed directly thereon can be reduced.

(Coating)

Next, the coating solution for forming the internal scattering layer and optionally the coating solution for forming the low refractive index layer are coated on the transparent support by a coating method such as an extrusion method (die coating method) and a microgravure method, followed by heating and drying. Thereafter, the monomers and hardenable resin for forming the internal scattering layer or the low refractive index layer are hardened upon irradiation with light and/or by heating. In this way, the internal scattering layer and the low refractive index layer are formed.

In order to feed the antireflection film with high productivity, an extrusion coating method (die coating method) is preferably employed. In particular, a die coater which can be preferably employed in a region with a small wet coating amount (not more than 20 cc/m$^2$) such as the hard coat layer and the antireflection layer will be described below.

<Configuration of Die Coater>

Figure 3:
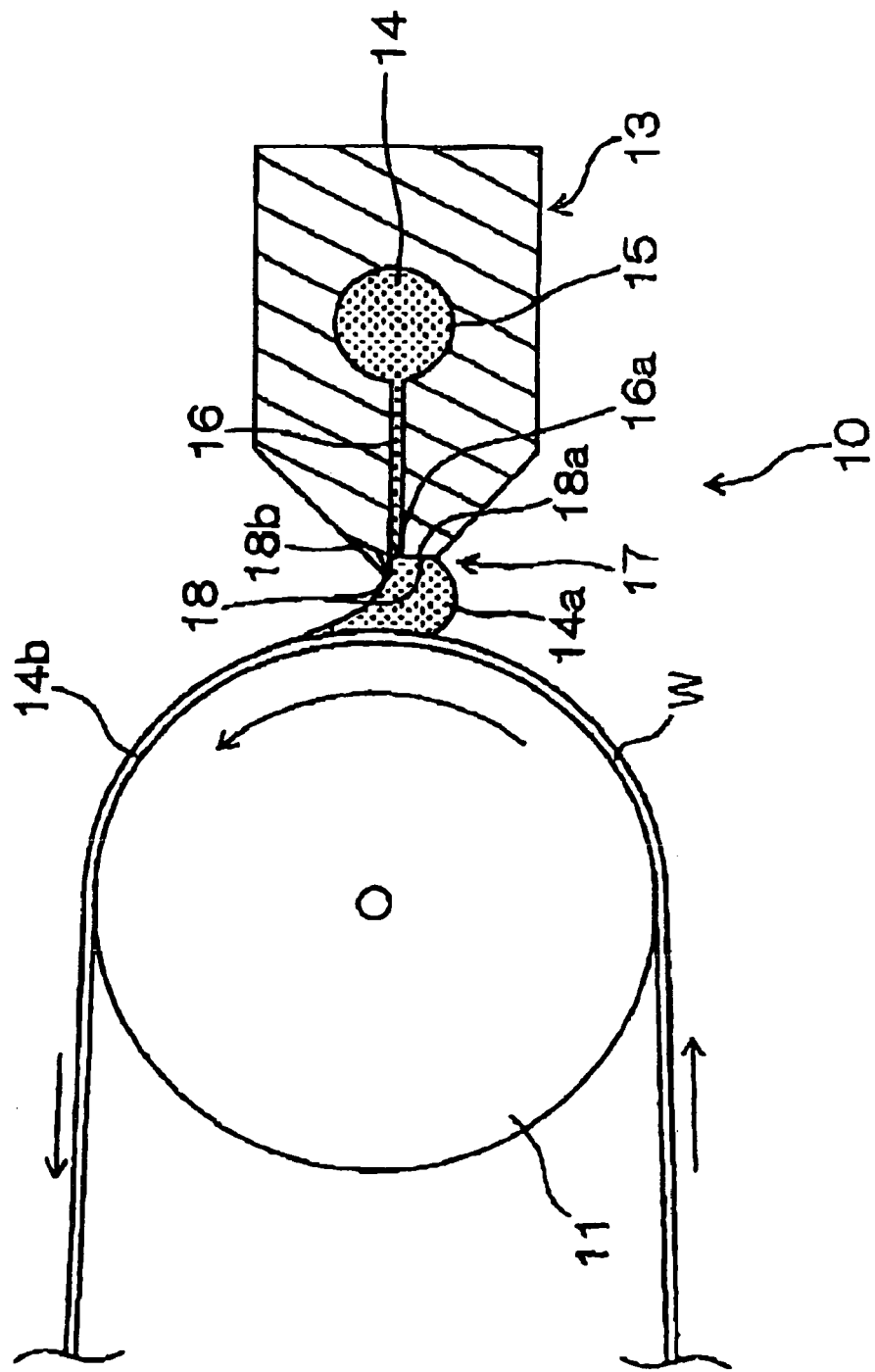
FIG. 3 is a cross-sectional view of a coater 10 using a slot die 13 for carrying out the invention.

FIG. 3 is a cross-sectional view of a coater using a slot die for carrying out the invention. In a coater 10, a coating solution 14 in a form of a bead 14$a$ is coated on a web W which is supported by a backup roll 11 and continuously runs from a slot die 13, thereby forming a coating film 14$b$ on the web W.

Figure 6:
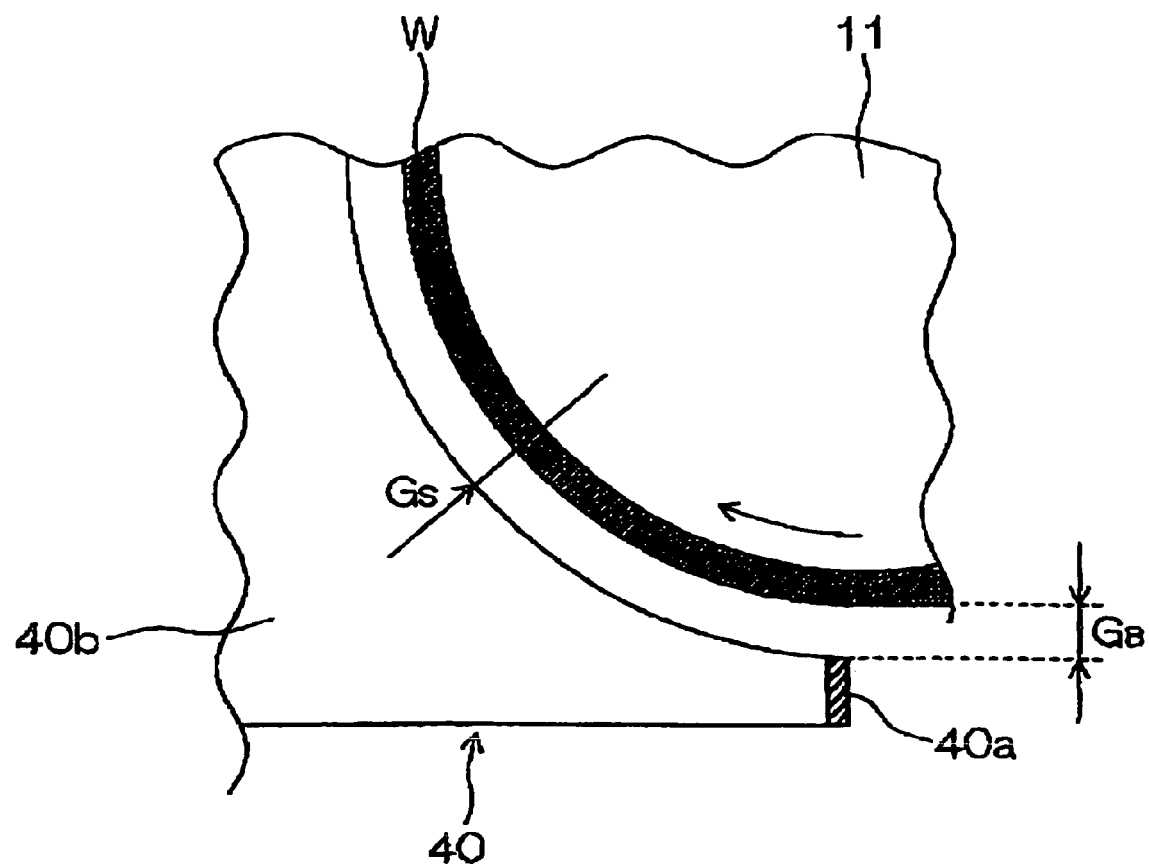
FIG. 6 is a cross-sectional view to show a vacuum chamber 40 and a web W adjacent to each other (a back plate 40a is integrated with a main body of the vacuum chamber 40).

A pocket 15 and a slot 16 are formed inside a slot die 13. In the pocket 15, its cross-section is constructed of a curved line and a straight line, and as illustrated in FIG. 6, it may be substantially circular or semicircular. In the pocket 15, in general, a space for collecting a coating solution as extended while having its cross-sectional shape in a width direction of the slot die 13 is formed such that an effective extended length thereof is equal to or slightly longer than a coating width. Feed of the coating solution 14 into the pocket 15 is carried out from the side face of the slot die 13 or from the center of the face in the opposite side to a slot opening 16$a$. Furthermore, the pocket 15 is provided with a plug for preventing the leakage of the coating solution 14 from occurring.

The slot 16 is a passage of the coating solution 14 from the pocket 15 to the web W and has its cross-sectional shape in the width direction of the slot die 13 likewise the pocket 15; and the opening 16$a$ positioned in the web side is generally adjusted so as to have a width substantially equal to the coating width by using a non-illustrated width regulating plate. In the slot tip of this slot 16, an angle of the backup roll 11 in the web running direction to the tangential line is preferably 30° or more and not more than 90°.

A tip lip 17 of the slot die 13 at which the opening 16$a$ of the slot 16 is positioned is formed in a tapered form, and its tip forms a flat part 18 called a land. In this land 18, an upstream side in the direction of movement of the web W against the slot 18 is named as an upstream side lip land 18$a$, and a downstream side thereof is named as a downstream side lip land 18$b$.

Figure 4A:
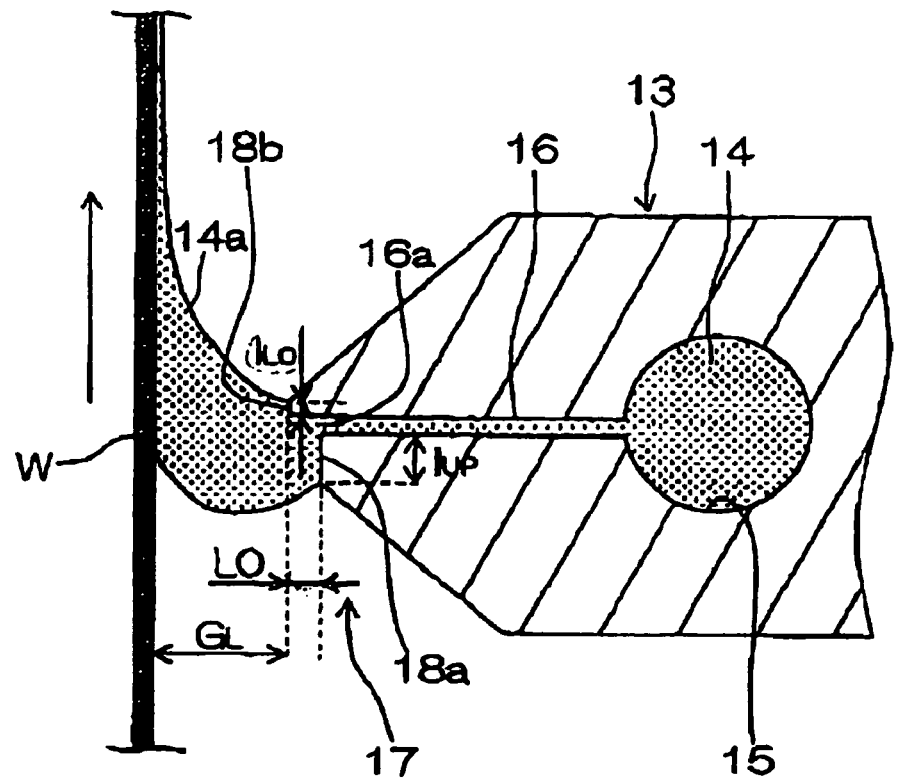
FIG. 4A shows a cross-sectional shape of a slot die 13 of the invention.
Figure 4B:
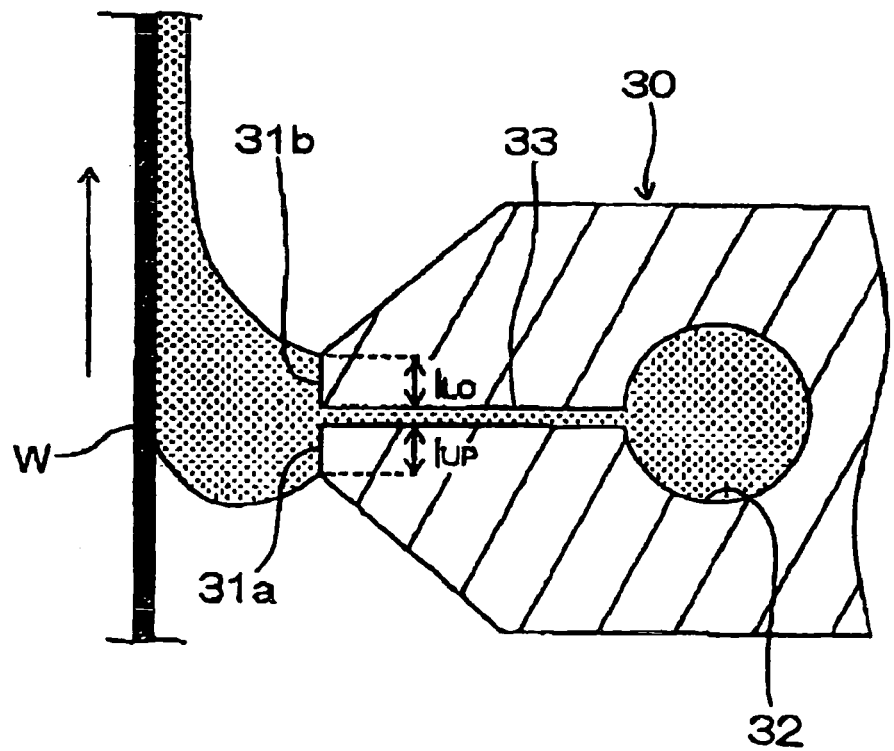
FIG. 4B is a cross-sectional shape of a conventional slot die 30.

FIG. 4 shows a cross-sectional shape of the slot die 13 in comparison with a conventional slot die, in which FIG. 4A shows the slot die 13 as illustrated in FIG. 3, and FIG. 4B shows a conventional slot die 30. In the conventional slot die 30, a distance between an upstream side lip land 31$a$ and a web W is equal to that between a downstream side lip land 31$b$ and the web W. Incidentally, a symbol 32 shows a pocket, and a symbol 33 shows a slot. On the other hand, in the slot die 13 of the invention, a length $I_{LO}$ of the downstream side lip land 18$b$ is made short, whereby coating with a wet film thickness of not more than 20 μm can be carried out with good accuracy.

Though a land length $I_{UP}$ of the upstream side lip land 18$a$ is not particularly limited, it is preferably in the range of from 500 μm to 1 mm. The land length $I_{LO}$ of the downstream side lip land 18$b$ is 30 μm or more and not more than 100 μm, preferably 30 μm or more and not more than 80 μm, and more preferably 30 μm or more and not more than 60 μm. When the land length $I_{LO}$ of the downstream side lip land 18$b$ is shorter than 30 µm, an edge or a land of the tip lip is liable to be broken and a stripe is liable to be generated in the coating film, resulting in making it unable to perform coating. Furthermore, it becomes difficult to set up the position of a wet line in the downstream side so that a problem that the coating solution is likely spread in the downstream side is caused. It has hitherto been known that this wet spreading of the coating solution in the downstream side means heterogeneity of the wet line, leading to a problem that a defective shape such as a stripe on the coating surface is brought. On the other hand, when the land length $I_{LO}$ of the downstream side lip land 18b is longer than 100 µm, since a bead itself cannot be formed, it is impossible to perform thin layer coating.

In addition, since the downstream side lip land 18b is in an overbite shape close to the web W as compared with the upstream side lip land 18a, a degree of vacuum can be increased so that it becomes possible to form a bead suitable for thin film coating. A difference in distance between the downstream side lip land 18b and the upstream side lip land 18b from the web W (hereinafter referred to as "overbite length LO") is preferably 30 µm or more and not more than 120 µm, more preferably 30 µm or more and not more than 100 µm, and most preferably 30 µm or more and not more than 80 µm. When the slot die 13 is in an overbite shape, a gap $G_L$ between the tip lip 17 and the web W shows a gap between the downstream side lip land 18b and the web W.

Figure 5:
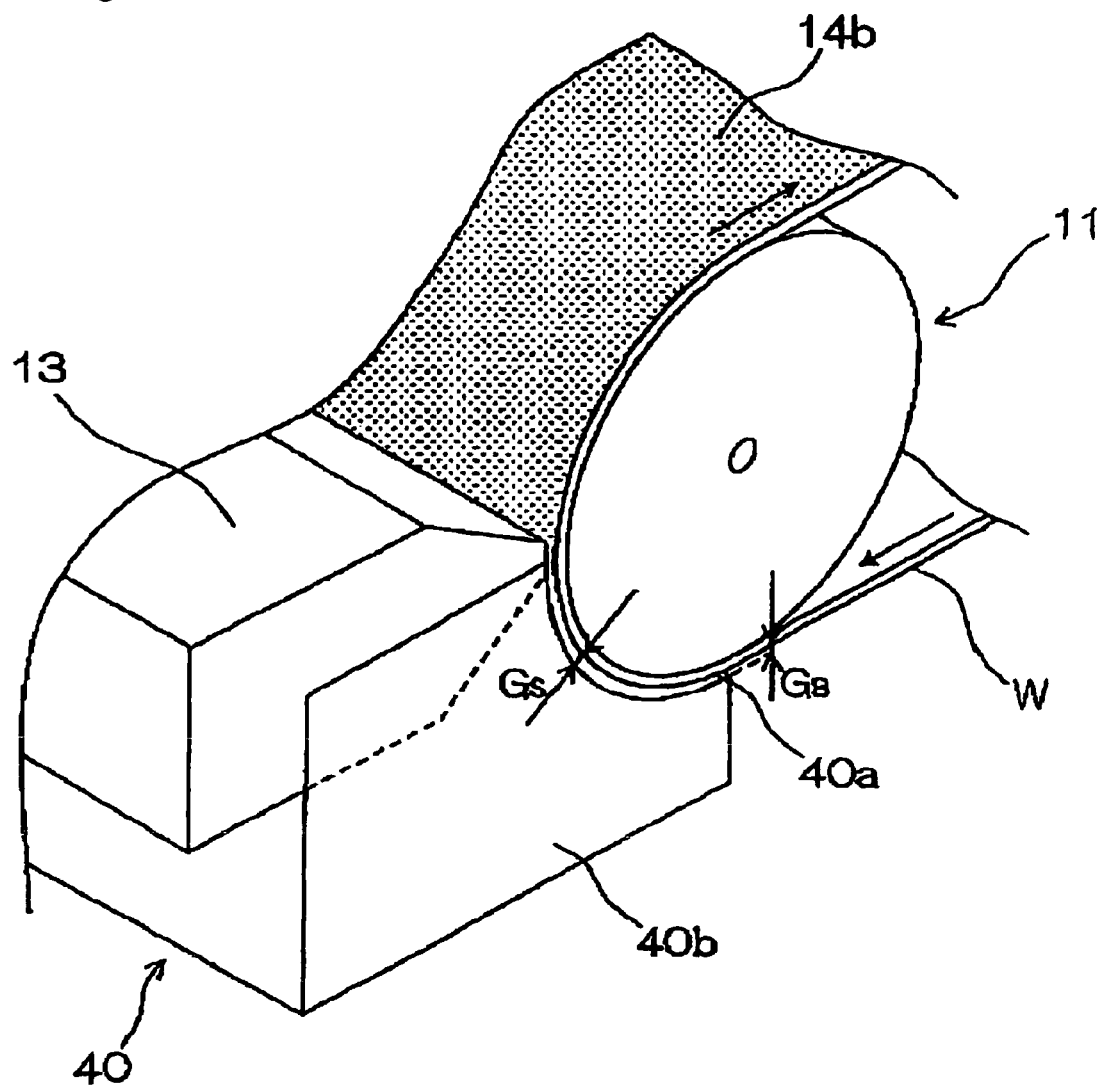
FIG. 5 is an oblique view to show a slot die 13 in a coating step for carrying out the invention and its surroundings.
Figure 7:
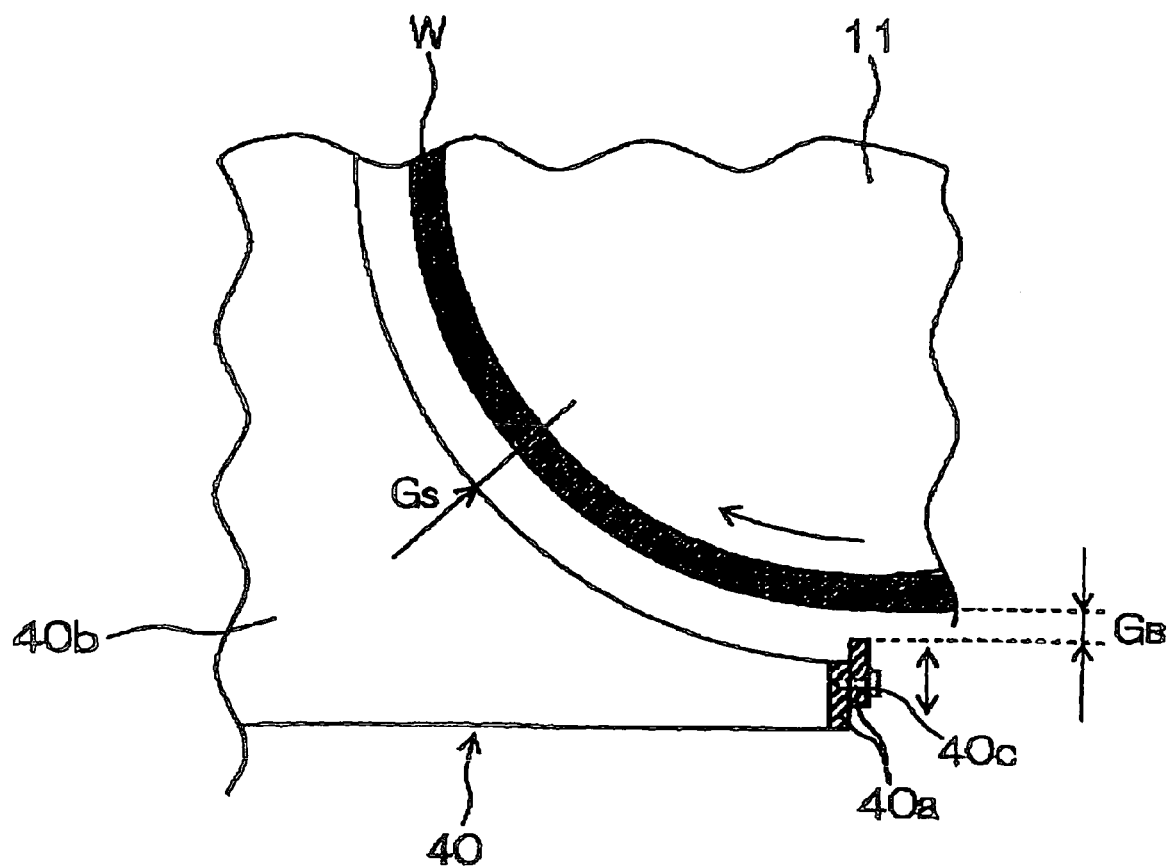
FIG. 7 is a cross-sectional view to show a vacuum chamber 40 and a web W adjacent to each other (a back plate 40a is engaged with the vacuum chamber 40 by a screw 40c).

FIG. 5 is an oblique view to show a slot die in the coating step for carrying out the invention and its surroundings. In an opposite side to the side of the direction of movement of the web W, a vacuum chamber 40 is placed at a position not coming into contact with the web W such that the vacuum adjustment can be thoroughly achieved against the bead 14a. The vacuum chamber 40 is provided with a back plate 40a and a side plate 40b for keeping its working efficiency; and gaps $G_B$ and $G_S$ are present between the back plate 40a and the web W and between the side plate 40b and the web W, respectively. FIG. 6 and FIG. 7 are each a cross-sectional view to show the vacuum chamber 40 and the web W adjacent to each other. The side plate and the back plate may be integrated with the chamber main body as illustrated in FIG. 5, or may have a structure in which the side plate and the back plate are engaged with the chamber by a screw 40c or the like so as to properly change the gap as illustrated in FIG. 7. In all of these structures, actually opened portions between the back plate 40a and the web W and between the side plate 40b and the web W are defined as gap $G_B$ and $G_S$, respectively. In the case where the vacuum chamber 40 is placed beneath the web W and the slot die 13 as illustrated in FIG. 5, the gap $G_B$ between the back plate 40a of the vacuum chamber 40 and the web W exhibits a gap from the uppermost end of the back plate 40a to the web W (FIGS. 6 and 7).

It is preferable that the gap $G_B$ between the back plate 40a and the web W is made larger than the gap $G_L$ between the tip lip 17 of the slot die 13 and the web W. In this way, it is possible to suppress a change of vacuum degree in the vicinity of the bead as caused due to eccentricity of the backup roll 11. For example, when the gap $G_L$ between the tip lip 17 of the slot die 13 and the web W is 30 µm or more and not more than 100 µm, the gap $G_B$ between the backup plate 40a and the web W is preferably from 100 µm or more and not more than 500 µm.

<Material and Precision>

With respect to the length of the tip lip in a side of the direction of movement of the web in a running direction of the web, the longer this length, the more disadvantageous for bead formation is. When this length is scattered between arbitrary places in the width direction of the slot die, the bead becomes instable due to slight disturbance. Accordingly, it is preferable that a fluctuation width of this length in the width direction of the slot die falls within 20 µm.

Furthermore, with respect to the material of the tip lip of the slot die, when a material such as stainless steel is used, sagging occurs in a stage of die processing so that even when the length of the tip lip of the slot die in the running direction of the web is in the range of from 30 to 100 µm as described previously, the precision of the tip lip cannot be satisfied. Accordingly, in order to keep a high processing precision, it is important to use a super hard material quality as described in Japanese Patent No. 2817053. Concretely, it is preferable that at least the tip lip of the slot die is made of a cemented carbide in which a carbide crystal having an average particle size of not more than 5 µm is bound therein. Examples of the cemented carbide include those in which a carbide crystal particle such as tungsten carbide (hereinafter referred to as "WC") is bound by a binder metal such as cobalt. In addition to cobalt, examples of the binder metal which can be used include titanium, tantalum, niobium, and mixed metals thereof. The average particle size of the WC crystal is more preferably not more than 3 µm.

In order to realize coating with a high precision, scattering in the gap in the width direction of the slot die between the foregoing length of the land of the tip lip in the side of the direction of movement of the web and the web is an important factor, too. It is desired to achieve a combination of these two factors, namely a straightness falling within the range where a fluctuation width of the gap is suppressed to some extent. Preferably, a straightness of the tip lip and the backup roll is brought such that the fluctuation width of the gap in the width direction of the slot die is not more than 5 µm.

<Coating Speed>

By achieving the foregoing precision of the backup roll and the tip lip, a coating system which is preferably employed in the invention is high in stability at the time of high-speed coating. In addition, since the coating system according to the present embodiment is a pre-metering system, it is easy to ensure a stable film thickness even at the time of high-speed coating. For a coating solution of low coating amount as in the antireflection film of the invention, the foregoing coating system can achieve coating at a high speed with good stability in film thickness. Though coating can be achieved by other coating system, according to a dip coating method, vibration of the coating solution in a liquid receiver tank is unavoidable so that unevenness in a step-like form is likely caused. According to a reverse roll coating method, unevenness in a step-like form is likely caused due to eccentricity or bending of a roll related to coating. Furthermore, since these coating systems are a post-metering system, it is difficult to ensure a stable film thickness. In the production process of the invention, from the standpoint of productivity, it is preferable that coating is carried out at 25 m/min or more.

<Wet Coating Amount>

In forming the internal scattering layer, it is preferable that the coating solution is coated on the substrate film directly or via other layer in a wet coating film thickness in the range of from 6 to 30 µm. From the viewpoint of preventing drying unevenness from occurring, the wet coating film thickness is more preferably in the range of from 3 to 20 µm. Furthermore, in forming the low refractive index layer, the coating solution is preferably coated on the internal scattering layer directly or via other layer in a wet coating film thickness in the range of from 1 to 10 µm, and more preferably in the range of from 2 to 6 µm.

(Drying)

After coating on the substrate film directly or via other layer, the internal scattering layer and the low refractive index layer are conveyed into a zone heated for drying the solvent by means of a web. On that occasion, the temperature of the drying zone is preferably from 25° C. to 140° C.; and it is preferable that the temperature of the first half of the drying zone is relatively low, whereas the temperature of the second half of the drying zone is relatively high. However, it is preferable that the temperature is not higher than the temperature at which volatilization of the components other than the solvent to be contained in the coating composition of each layer starts. For example, among commercially available photo radical generators which are used together with an ultraviolet ray hardenable resin, there are ones in which a several tens % portion thereof is volatilized within several minutes in warm air of 120° C. Furthermore, among monofunctional or bifunctional acrylate monomers, there are ones in which volatilization proceeds in warm air of 100° C. In such case, it is preferable that the temperature of the drying zone is not higher than the temperature at which volatilization of the components other than the solvent to be contained in the coating composition of each layer starts.

Furthermore, it is preferable that with respect to the dry air after coating the coating composition of each layer on the support, when the solids content of the coating composition is from 1 to 50%, for the purpose of preventing drying unevenness from occurring, it is preferable that the air velocity on the surface of the coating film is in the range of from 0.1 to 2 m/sec.

Moreover, after coating the coating composition of each layer on the substrate film, when a difference in temperature between a conveyance roll coming into contact with an opposite surface of the substrate film to a coating surface and the substrate film is made to fall within the range of from 0° C. to 20° C. in the drying zone, drying unevenness due to heat transmission unevenness on the conveyance roll can be prevented from occurring, and therefore, such is preferable.

It is possible to control the surface irregularities to some degree by a drying condition. In the invention, it has been found that by blowing dry air quickly after coating, the formation of surface irregularities can be suppressed, whereby the surface irregularities can be controlled to a preferred range.

(Hardening)

After the drying zone of the solvent, each coating film is passed through a zone capable of hardening the coating film by ionizing radiations and/or heat by the web, thereby hardening the coating film. For example, when the coating film is hardenable with ultraviolet rays, it is preferable that ultraviolet rays are irradiated at an irradiation dose of from 10 mJ/cm$^2$ to 1,000 mJ/cm$^2$ by an ultraviolet ray lamp, thereby hardening each layer. On that occasion, the irradiation dose distribution in a width direction of the web including the both ends is preferably from 50 to 100%, and more preferably from 80 to 100% on the basis of a maximum irradiation dose in the center. In addition, in the case where it is necessary to lower an oxygen concentration by purging with a nitrogen gas or the like for the purpose of accelerating surface hardening, the oxygen concentration is preferably from 0.01% to 5%, and the distribution in the width direction is preferably not more than 2% in terms of an oxygen concentration.

Furthermore, in the case where a hardening rate [100−(residual functional group content)] of the internal scattering layer is a value less than 100%, in providing the low refractive index layer thereon and hardening the low refractive index layer by ionizing radiations and/or heat, when the hardening rate of the internal scattering layer as a lower layer thereof is higher than that before providing the low refractive index layer, the adhesiveness between the internal scattering layer and the low refractive index layer is improved, and therefore, such is preferable.

By using the thus produced antireflection film to prepare a polarizing plate, it is possible to use it for a liquid crystal display device. In this case, the antireflection film is disposed on the outermost layer of a display by providing an adhesive layer on one surface thereof or other means. It is preferable that the antireflection film of the invention is used for at least one of two protective films sandwiching a polarizing film in the polarizing plate from the both sides.

The antireflection film of the invention also functions as a protective film so that the production costs of a polarizing plate can be reduced. Furthermore, by using the antireflection film of the invention for the outermost layer, reflection of external light or the like is prevented so that a polarizing plate having excellent scar resistance and antifouling properties can be formed.

In preparing a polarizing plate by using the antireflection film as one of two surface protective films of the polarizing film, it is preferred to improve the adhesion on the adhesive surface by hydrophilizing the antireflection film on the surface of the transparent support in the opposite side to the side having an antireflection structure, namely the surface in a side at which the polarizing film is stuck. The hydrophilized surface is effective for improving the adhesiveness to the adhesive layer containing, as the major component, polyvinyl alcohol. As to the hydrophilization treatment of the antireflection film, it is preferred to carry out the following saponification treatment. (Saponification treatment)

(1) Method of Dipping in an Alkaline Solution:

This method is a measure in which the antireflection film is dipped in an alkaline solution, thereby saponifying all of the surfaces having reactivity with an alkali on the entire surface of the film. Since this method does not require special equipment, it is preferable from the viewpoint of costs. A sodium hydroxide aqueous solution is preferable as the alkaline solution. A concentration of the alkaline solution is preferably from 0.5 to 3 moles/L, and especially preferably from 1 to 2 moles/L; and a liquid temperature of the alkaline solution is preferably from 30 to 75° C., and especially preferably from 40 to 60° C.

Though the foregoing combination of the saponification condition is a combination of relatively mild conditions, it can be set up by the raw material and configuration of the film and a desired contact angle.

After dipping in the alkaline solution, it is preferable that the film is thoroughly washed with water or that the film is dipped in a dilute acid, thereby neutralizing an alkaline component such that the alkaline component does not remain in the film.

With respect to the saponification treatment, it is preferable from the viewpoint of adhesion to the polarizing film that the contact angle of the surface of the transparent support in the opposite side to the side at which the internal scattering layer or the low refractive index layer is present against water is low as far as possible. On the other hand, in the dipping method, since the film is damaged by the alkali at the same time over from the surface at which the coating layer is present to the inside of the film, it is important to employ a necessary and minimum condition. In the case where the contact angle of the transparent support on the surface in the opposite side against water is employed as an index of the damage which each layer receives by the alkali, especially when the transparent support is triacetyl cellulose, the contact angle is preferably from 10° to 50°, more preferably from 30° to 50°, and further preferably from 40° to 50°. When the contact angle exceeds 50°, a problem is caused in the adhesion to the polarizing film, and therefore, such is not preferable. On the other hand, when it is less than 10°, the damage which the antireflection film receives becomes too large, the physical strength is hindered, and therefore, such is not preferable.

(2) Method of Coating an Alkaline Solution:

As a measure for avoiding the damage against each film in the foregoing dipping method, there is preferably employed a method of coating an alkaline solution by coating an alkaline solution only on the surface in the opposite side to the surface on which the coating layer is present, followed by heating, washing with water and drying. Incidentally, in this case, the "coating" as referred to herein means that the alkaline solution or the like is brought into contact with only the surface on which the saponification is carried out. In addition to the coating, spraying, contacting with a liquid-containing belt, or other means is also included. By employing such a method, since equipment and step for coating the alkaline solution are separately required, this method is inferior to the dipping method (1) from the viewpoint of costs. On the other hand, since the alkaline solution comes into contact with only the surface to which the saponification treatment is applied, a layer using a raw material which is weak against the alkaline solution can be provided on the surface in the opposite side. For example, in a vapor deposited film or a sol-gel film, a variety of influences such as corrosion, dissolution and peeling are caused due to the alkaline solution. Accordingly, though it is not desired to provide such vapor deposited film or sol-gel film by the dipping method, since the film does not come into contact with the solution in this coating method, it is possible to use such a vapor deposited film or a sol-gel film without any problem.

In all of the foregoing saponification methods (1) and (2), since the saponification can be carried out after winding out the film from the support in a rolled state and forming the respective layers, it may be added after the foregoing production step of the antireflection film and achieved in a series of operations. In addition, by continuously carrying out a sticking step to a polarizing plate made of a similarly wound out support collectively, it is possible to prepare a polarizing plate with good efficiency as compared with the case of carrying out the same operations sheet by sheet.

(3) Method of Achieving Saponification by Protecting the Internal Scattering Layer or Antireflection Layer by a Laminate Film:

Likewise the foregoing method (2), in the case where the internal scattering layer and/or the low refractive index layer is insufficient in resistance to an alkaline solution, after forming an ultimate layer, by sticking a laminate film onto the surface on which the ultimate layer has been formed and then dipping in an alkaline solution, it is possible to hydrophilize only the triacetyl cellulose surface in an opposite side to the surface on which the ultimate layer has been formed and then peeling away the laminate film. According to this method, it is also possible to apply a hydrophilization treatment enough as a protective film for polarizing plate to only the surface of the triacetyl cellulose film in an opposite side to the surface on which the ultimate layer has been formed without damaging the coating layer. In comparison with the foregoing method (2), this method involves an advantage such that though the laminate film is generated as a waste, a special device for coating an alkaline solution is not required.

(4) Method of Dipping in an Alkaline Solution after Forming the Internal Scattering Layer:

In the case where though the internal scattering layer has resistance to an alkaline solution, the low refractive index layer is insufficient in resistance to an alkaline solution, after forming the internal scattering layer, it is possible to dip the film in an alkaline solution, thereby hydrophilizing the both surfaces thereof and then forming the low refractive index layer on the internal scattering layer. The production process becomes complicated. However, in particular, in the case where the low refractive index layer contains a hydrophilic group as in a fluorine-containing sol-gel film, etc., there is brought an advantage that interlaminar adhesiveness between the internal scattering layer and the low refractive index layer is improved.

(5) Method of Forming the Internal Scattering Layer or the Antireflection Layer on a Previously Saponified Triacetyl Cellulose Film:

The internal scattering layer or the low refractive index layer may be formed on either one surface of a triacetyl cellulose film which has been previously saponified by dipping in an alkaline solution or other means directly or via other layer. In the case where the triacetyl cellulose film is saponified by dipping in an alkaline solution, interlaminar adhesiveness between the internal scattering layer or other layer and the triacetyl cellulose surface which has been hydrophilized by the saponification may possibly be deteriorated. In such case, it is possible to deal with this problem by subjecting only the surface on which the internal scattering layer or other layer is formed after the saponification to a corona discharge or glow discharge treatment or other means, thereby removing the hydrophilized surface. Furthermore, in the case where the internal scattering layer or other layer contains a hydrophilic group, the interlaminar adhesiveness may possibly become good.

A polarizing plate using the antireflection film of the invention and a liquid crystal display device using the polarizing film will be described below.

[Polarizing Plate]

In a preferred polarizing plate of the invention, the antireflection film of the invention is present as at least one of protective films of a polarizing film (protective films for polarizing plate). It is preferable that in the protective film for polarizing plate, the surface of the transparent support in an opposite side to the die having the internal scattering layer or the low refractive index layer, namely the surface in a side to which the polarizing film is stuck, has a contact angle against water in the range of from 10° to 50° as described previously.

By using the antireflection film of the invention as a protective film for polarizing plate, a polarizing plate having a light scattering function with excellent physical strength and light fastness or an antireflection function can be prepared, thereby enabling one to largely reduce the costs and make a display device thin.

Furthermore, by preparing a polarizing plate in which the antireflection film of the invention is used as one of protective films for polarizing plate and an optically anisotropic optical compensating film as described later is used as the other protective film of the polarizing film, it is possible to prepare a polarizing plate in which the visibility and contrast of a liquid crystal device in a bright room can be further improved and a viewing angle in all directions can be extremely expanded.

(Optical Compensating Film)

By using an optical compensating film for the polarizing plate, a viewing angle characteristic of a liquid crystal display screen can be improved. The optical compensating film in which an optical compensating film can be preferably used in an opposite side of the antireflection film of the invention across a polarizer may be stuck on a protective film in one side of the polarizing plate or may be used as a protective film of one side. From the viewpoint of thickness of the polarizing plate, it is especially desired that the antireflection film of the invention is used as a protective film in one side, whereas the optical compensating film is used as a protective film in an opposite side across a polarizer. With respect to the optical compensating film, by containing a substance having optical anisotropy in the film itself or stretching the film, or performing the both, the film itself may be made to have specific anisotropy, or an optical anisotropic layer (retardation layer) may be provided on the film.

Though a known optical compensating film can be used as the optical compensating film, a film having optical anisotropy, which is made of a compound having a discotic structural unit, is desirable from the standpoint of widening a viewing angle. Concretely, there are enumerated wide view films as manufactured by Fuji Photo Film Co., Ltd. (for example, WV-A and WV-SA). However, it should not be construed that the invention is limited thereto.

Furthermore, for the purposes of improving the contrast of a liquid display and improving the color taste, it is preferred to use a cellulose acylate film which is small in optical anisotropy (Re and Rth) and hence, is substantially optically isotropic and is small in wavelength dispersion of the optical anisotropy (Re and Rth). Also, in the case of a reflection type display, it is preferred to use a film having a function of a $\lambda/4$ plate, which is made of a single film or plural films.

In the case where the optical compensating film is used as a protective film of a polarizing film, it is preferable that the surface in a side at which the optical compensating film is stuck to the polarizing film is subjected to a saponification treatment. The saponification treatment is preferably carried out in conformity to the foregoing saponification treatment.

(Polarizing Film)

As the polarizing film, known polarizing films and polarizing films which are cut out from a longitudinal polarizing film whose absorption axis is neither parallel nor vertical to the longitudinal direction may be used. The longitudinal polarizing film whose absorption axis is neither parallel nor vertical to the longitudinal direction is prepared by the following method.

That is, this polarizing film is a polarizing film as prepared by stretching a continuously fed polymer film by imparting a tension while holding the both ends thereof by holding units. The polarizing film can be produced in a stretching method in which the film is stretched in a ratio of from 1.1 to 20.0 times in at least a film width direction; a difference in movement speed in a longitudinal direction between the holding units in the both film ends is within 3%; and the direction of movement of the film is bent in a state of holding the both film ends such that an angle between the direction of movement of the film in an outlet of the step for holding the both film ends and the substantial stretching direction of the film is inclined at from 20° to 70°. In particular, a polarizing film in which the subject angle is inclined at 45° is preferably used from the viewpoint of productivity.

The stretching method of the polymer film is described in detail in JP-A-2002-86554, paragraphs [0020] to [0030].

[Image Display Device]

The antireflection film of the invention can be applied to image display devices such as a liquid crystal display device (LCD), a plasma display panel (PDP), an electroluminescence display device (ELD), a cathode ray tube display device (CRT), a field emission display (FED), and a surface-conduction electron-emitter display (SED). Since the antireflection film of the invention has a transparent support, it is used by making the side of the transparent support adhere to an image display face of an image display device.

It is especially preferable that the antireflection film of the invention is used as one of surface protective films of a polarizing film to prepare a polarizing plate and applied to the surface of a liquid crystal display device. In this case, the antireflection film of the invention can be preferably used for transmission type, reflection type or semi-transmission type liquid crystal display devices of a twisted nematic (TN) mode, a super twisted nematic (STN) mode, a vertical alignment (VA) mode, an in-plane switching (IPS) mode, an optically compensatory bend cell (OCB) mode, or the like. In particular, the antireflection film of the invention can be preferably used in a VA, IPS or OCB mode or the like for applications such as a large-sized liquid crystal television set; and it can also be preferably used in a TN or STN mode or the like for applications such as a middle- or small-sized display device. With respect to applications such as a liquid crystal television set, the diagonal of a display screen is 13 inches or more, and especially preferably 20 inches or more. In the antireflection film of the invention, since the surface haze value and roughness and so on fall within the preferred ranges, it is substantially free from a problem of glare and is able to be used without limitations as to the definition. In particular, the antireflection film of the invention can be used for XGA or less [(1024×768) or less in a display device having an aspect ratio of ¾].

The liquid crystal cell of a VA mode includes, in addition to (1) a liquid crystal cell of a VA mode in a narrow sense in which a rod-like liquid crystalline molecule is substantially vertically aligned at the time of applying no voltage, whereas it is substantially horizontally aligned at the time of applying a voltage (as described in JP-A-2-176625), (2) a liquid crystal cell of a multi-domained VA mode (MVA mode) for enlarging a viewing angle (as described in *SID 97, Digest of Tech. Papers,* 28 (1997), page 845), (3) a liquid crystal cell of a mode (n-ASM mode) in which a rod-like liquid crystalline molecule is substantially vertically aligned at the time of applying no voltage and is subjected to twisted multi-domain alignment at the time of applying a voltage (as described in *Preprints of Forum on Liquid Crystal*, pages 58 to 59 (1998), and (4) a liquid crystal cell of a SURVIVAL mode (as announced in *LCD International* 98).

A liquid crystal cell of an OCB mode is a liquid crystal cell of a bend alignment mode in which a rod-like liquid crystalline molecule is aligned in a substantially reverse direction (in a symmetric manner) in the upper and lower parts of a liquid crystal cell and is disclosed in U.S. Pat. Nos. 4,583,825 and 5,410,422. Since the rod-like liquid crystalline molecule is symmetrically aligned in the upper and lower parts of a liquid crystal cell, the liquid crystal cell of a bend alignment mode has a self optical compensating ability. For that reason, this liquid crystal mode is named as an OCB (optically compensatory bend) liquid crystal mode. A liquid crystal display device of a bend alignment mode involves an advantage such that the response speed is fast.

In a liquid crystal cell of an ECB mode, a rod-like liquid crystalline molecule is substantially horizontally aligned at the time of applying no voltage. The liquid crystal cell of an ECB mode is most frequently utilized as a color TFT liquid crystal display device and described in a number of references. For example, it is described in *EL, PDP and LCD Displays*, published by Toray Research Center, Inc. (2001).

EXAMPLES

The invention will be described below in detail with reference to the Examples, but it should not be construed that the invention is limited thereto. In the following Examples and Synthesis Examples, the terms "parts" and "%" are on a weight basis unless otherwise indicated.

(Synthesis of perfluoroolefin copolymer (1))
Perfluoroolefin copolymer (1)

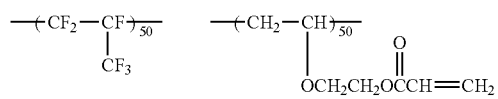

(The term "50/50" means a molar ratio.)

In a stainless steel-made stirrer-equipped autoclave having an internal volume of 100 mL, 40 mL of ethyl acetate, 14.7 g of hydroxyethyl vinyl ether and 0.55 g of dilauroyl peroxide were charged, and the inside of the system was deaerated and purged with a nitrogen gas. In addition, 25 g of hexafluoropropylene (HFP) was introduced into the autoclave, and the temperature was raised to 65° C. At a point of time when the temperature in the autoclave reached 65° C., the pressure was 0.53 MPa (5.4 kg/cm$^2$). The reaction was continued for 8 hours while keeping the subject temperature, and at a point of time when the pressure reached 0.31 MPa (3.2 kg/cm$^2$), the heating was stopped, followed by allowing it to stand for cooling. At a point of time when the internal temperature dropped to room temperature, the unreacted monomers were expelled, the autoclave was opened, and the reaction solution was taken out. The obtained reaction solution was thrown into a large excess of hexane, the solvent was removed by decantation, and a precipitated polymer was taken out. In addition, this polymer was dissolved in a small amount of ethyl acetate and reprecipitated twice from hexane, thereby completely removing the residual monomers. After drying, 28 g of a polymer was obtained. Next, 20 g of this polymer was dissolved in 100 mL of N,N-dimethylacetamide, 11.4 g of acrylic chloride was added dropwise thereto under ice cooling, and the mixture was then stirred at room temperature for 10 hours. Ethyl acetate was added to the reaction solution, the mixture was washed with water, and an organic layer was extracted and then concentrated. The thus obtained polymer was reprecipitated from hexane to obtain 19 g of a perfluoroolefin copolymer (1). The thus obtained polymer had a refractive index of 1.421.

(Preparation of Sol Solution (a))

In a reactor equipped with a stirrer and a reflux condenser, 120 parts of methyl ethyl ketone, 100 parts of acryloyloxypropyl trimethoxysilane (KBM-5103, manufactured by Shin-Etsu Chemical Co., Ltd.) and 3 parts of diisopropoxyaluminum ethyl acetoacetate were added and mixed. After adding 30 parts of ion exchanged water, the mixture was allowed to react at 60° C. for 4 hours, followed by cooling to room temperature, thereby obtaining a sol solution (a). The reaction product had a weight average molecular weight of 1,600, and among components including oligomer or polymer components, components having a molecular weight of from 1,000 to 20,000 accounted for 100%. Furthermore, the gas chromatographic analysis revealed that the starting acryloyloxypropyl trimethoxysilane did not remain at all.

(Preparation of Dispersion A)

To 500 g of a hollow silica fine particle sol (isopropyl alcohol silica sol, average particle size: 60 nm, shell thickness: 10 nm, silica concentration: 20% by weight, refractive index of silica particle: 1.31; as prepared by changing the size in conformity to Preparation Example 4 of JP-A-2002-79616), 30 g of acryloyloxypropyl trimethoxysilane (manufactured by Shin-Etsu Chemical Co., Ltd.) and 1.5 g of diisopropoxyaluminum ethyl acetoacetate were added and mixed. After adding 9 g of ion exchanged water, the mixture was allowed to react at 60° C. for 8 hours. After cooling to room temperature, 1.8 g of acetyl acetone was added. Solvent substitution was carried out by distillation in vacuo under a pressure of 20 kPa while adding cyclohexanone to 500 g of this dispersion such that the content of silica became constant. The dispersion was free from the generation of a foreign substance. When the solids content was adjusted with cyclohexanone at 20% by weight, the viscosity was found to be 5 mPa·s at 25° C. The residual amount of isopropyl alcohol in the obtained dispersion A was analyzed by gas chromatography. As a result, it was found to be 1.5%.

Example 1

(Preparation of Coating Solution A for Internal Scattering Layer)

71.0 g of a mixture of pentaerythritol triacrylate and pentaerythritol tetraacrylate (PET-30, manufactured by Nippon Kayaku Co., Ltd.), 3.0 g of a polymerization initiator (IRGACURE 184, manufactured by Ciba Speciality Chemicals), 0.1 g of a fluorine based surface modifier (EP-149), and 11.9 g of a silane coupling agent (KBK-5103, manufactured by Shin-Etsu Chemical Co., Ltd.) were added in a mixed solvent of methyl isobutyl ketone and methyl ethyl ketone, and the mixture was stirred for 60 minutes by an air dispersion device, thereby completely dissolving the solutes. A coating film obtained by coating this solution and hardening by ultraviolet rays had a refractive index of 1.520. 6.3 g of a crosslinked poly(styrene) polymer having an average particle size of 3.5 μm (refractive index: 1.600) and 7.7 g of a crosslinked poly(acryl-styrene) particle having an average particle size of 3.5 μm (copolymerization composition ratio: 50/50, refractive index: 1.536) were dispersed by a Polytron dispersing machine at 10,000 rpm for 20 minutes, respectively, thereby forming a 30% methyl isobutyl ketone dispersion. Methyl isobutyl ketone and methyl ethyl ketone were then added to adjust a ratio of methyl isobutyl ketone to methyl ethyl ketone at 70/30 and a solids content at 45% by weight, followed by stirring for 10 minutes by an air dispersion device.

The foregoing mixed solution was filtered by a polypropylene-made filter having a pore size of 30 μm, thereby preparing a coating solution A for internal scattering layer.

(Preparation of Coating Solution A for Low Refractive Index Layer)

To 783.3 parts by parts (47.0 parts by weight as a solids content) of OPSTAR JTA113 (heat crosslinking fluorine-containing silicone polymer composition solution (solids content: 6%) as manufactured by JSR Corporation), 195 parts (39.0 parts by weight as a solids content of the total sum of silica and surface treating agent) of the dispersion A, 30.0 parts by weight (9.0 parts by weight as a solids content) of a colloidal silica dispersion (silica having a different particle size from MEK-ST, average particle size: 45 nm, solids content: 30%, manufactured by Nissan Chemical Industries, Ltd.), and 17.2 parts by weight (5.0 parts by weight as a solids content) of the sol solution (a). The mixture was diluted with cyclohexane and methyl ethyl ketone such that the solids content of the entire coating solution was 6% by weight and that a ratio of cyclohexane to methyl ethyl ketone was 10/90, thereby preparing a coating solution A for low refractive index layer. A layer formed from this coating solution had a refractive index of 1.39.

(1) Coating of Internal Scattering Layer:

An 80 μm-thick triacetyl cellulose film (TAC-TD80U, manufactured by Fuji Photo Film Co., Ltd.) was wound out in a rolled state; the coating solution A for internal scattering layer was coated by a die coating method of the following device configuration and coating condition; and after drying at 30° C. for 15 seconds and further at 90° C. for 20 seconds, the coating layer was hardened upon irradiation with ultraviolet rays having an irradiation dose of 90 mJ/cm$^2$ by using an air-cooled metal halide lamp (manufactured by Eyegraphics Co., Ltd.) of 160 W/cm under purging with nitrogen, thereby forming an internal scattering layer having a thickness of 7.2 μm, followed by winding up. By controlling a time of initiating to blow dry air during a period of from 2 to 10 seconds after coating, the attitude of surface irregularities was controlled. The formed film had a particle density of 1.21 g/m$^2$.

Basic Condition:

As a slot die 13, one having an upstream side lip land length $I_{UP}$ of 0.5 mm, a downstream side lip land length $I_{LO}$ of 50 μm, a length of an opening of a slot 16 in a web running direction of 150 μm, and a length of the slot 16 of 50 mm was used. A gap between a upstream side lip land 18a and a web W was set up at 50 μm longer than a gap between a downstream side lip land 18b and the web W (hereinafter referred as "overbite length of 50 μm"), and a gap $G_L$ between the downstream side lip land 18b and the web W was set up at 50 μm. Furthermore, a gap $G_S$ between a side plate 40b of a vacuum chamber 40 and the web W and a gap $G_B$ between a back plate 40a and the web W were set up at 200 μm, respectively.

(2) Coating of Low Refractive Index Layer:

The triacetyl cellulose film coated with an internal scattering layer by coating the foregoing coating solution A for internal scattering layer was again wound out, on which was then coated the foregoing coating solution A for low refractive index layer under the foregoing basic condition; and after drying at 120° C. for 150 seconds and further at 140° C. for 8 minutes, the coating layer was hardened upon irradiation with ultraviolet rays having an irradiation dose of 300 mJ/cm$^2$ by using an air-cooled metal halide lamp (manufactured by Eyegraphics Co., Ltd.) of 240 W/cm under purging with nitrogen in an oxygen concentration of 0.1% by volume, thereby forming a low refractive index layer having a thickness of 100 μm, followed by winding up.

(3) Saponification Treatment of Antireflection Film:

After film formation of the foregoing low refractive index layer, the foregoing sample was subjected to the following treatment.

A sodium hydroxide aqueous solution of 1.5 moles/L was prepared and kept at 55° C. A dilute sulfuric acid aqueous solution of 0.01 moles/L was prepared and kept at 35° C. The prepared antireflection film was dipped in the foregoing sodium hydroxide aqueous solution for 2 minutes and then dipped in water, thereby thoroughly washing away the sodium hydroxide aqueous solution. Next, the resulting sample was dipped in the foregoing dilute sulfuric acid aqueous solution for one minute and then dipped in water, thereby thoroughly washing away the dilute sulfuric acid aqueous solution. Finally, the sample was thoroughly dried at 120° C.

There was thus prepared a saponified antireflection film. This is named as Example 1-1.

Examples 1-2 to 1-5 were prepared in the same preparation method as in Example 1-1, except for changing the amounts of addition of the two kinds of particles of the coating solution A for internal scattering layer so as to have a particle ratio and a particle density as shown in Table 2.

Example 1-6 was prepared in the same preparation method as in Example 1-1, except for using a crosslinked poly(acryl-styrene) particle having an average particle size of 3.5 μm (copolymerization composition ratio: 30/70, refractive index: 1.561) in place of the crosslinked poly(acryl-styrene) particle having an average particle size of 3.5 μm (copolymerization composition ratio: 50/50, refractive index: 1.536) of the coating solution A for internal scattering layer and changing the amounts of addition of the two kinds of particles of the coating solution A for internal scattering layer so as to have a particle ratio and a particle density as shown in Table 2.

(Preparation of Coating Solution B for Internal Scattering Layer)

70.9 g of a mixture of pentaerythritol triacrylate and pentaerythritol tetraacrylate (PET-30, manufactured by Nippon Kayaku Co., Ltd.), 3.4 g of a polymerization initiator (IRGACURE 184, manufactured by Ciba Speciality Chemicals), 0.1 g of a fluorine based surface modifier (EP-149), and 13.0 g of a silane coupling agent (KBK-5103, manufactured by Shin-Etsu Chemical Co., Ltd.) were added in methyl isobutyl ketone and methyl ethyl ketone, and the mixture was stirred for 60 minutes by an air dispersion device, thereby completely dissolving the solutes. A coating film obtained by coating this solution and hardening by ultraviolet rays had a refractive index of 1.523. 12.6 g of a crosslinked poly(acryl-styrene) particle having an average particle size of 3.5 μm (copolymerization composition ratio: 30/70, refractive index: 1.561) was dispersed by a Polytron dispersing machine at 10,000 rpm for 20 minutes, thereby forming a 30% methyl isobutyl ketone dispersion. Methyl isobutyl ketone and methyl ethyl ketone were then added to adjust a solids content at 43.5% by weight, followed by stirring for 10 minutes by an air dispersion device. A ratio of methyl isobutyl ketone to methyl ethyl ketone was adjusted at 80/20.

The foregoing mixed solution was filtered by a polypropylene-made filter having a pore size of 30 μm, thereby preparing a coating solution B for internal scattering layer.

Example 1-7 was prepared in the same preparation method as in Example 1-1, except for using the coating solution B for internal scattering layer. Example 1-7 had a thickness of the layer of 5.8 μm and a particle density in the formed film of 0.90 g/m$^2$.

Examples 1-8 to 1-11 were prepared in the same preparation method as in Example 1-7, except for replacing a part of the crosslinked poly(acryl-styrene) particle having an average particle size of 3.5 μm (copolymerization composition ratio: 30/70, refractive index: 1.561) of the coating solution B for internal scattering layer with a crosslinked poly(acryl-styrene) particle (copolymerization composition ratio: 50/50, refractive index: 1.536) and changing the amounts of addition of the two kinds of particles so as to have a particle ratio and a particle density as shown in Table 2.

Examples 1-12 to 1-13 were prepared in the same preparation method as in Example 1-7, except for replacing a part of the crosslinked poly(acryl-styrene) particle having an average particle size of 3.5 μm (copolymerization composition ratio: 30/70, refractive index: 1.561) of the coating solution B for internal scattering layer with a crosslinked poly(styrene) particle (refractive index: 1.600) and changing the amounts of addition of the two kinds of particles so as to have a particle ratio and a particle density as shown in Table 2.

Example 1-14 was prepared in the same preparation method as in Example 1-1, except that the low refractive index layer was not provided.

Comparative Examples 1-1 to 1-4 were prepared in the same preparation method as in Example 1-1, except for changing the amounts of addition of the two kinds of particles of the coating solution A for internal scattering layer so as to have a particle ratio and a particle density as shown in Table 2.

Comparative Examples 1-5 to 1-8 were prepared in the same preparation method as in Example 1-1, except for changing the amounts of addition of the two kinds of particles of the coating solution for internal scattering layer as used in Example 1-8 so as to have a particle ratio and a particle density as shown in Table 2.

Comparative Example 1-9 was prepared in the same preparation method as in Example 1-1, except for changing the amounts of addition of the two kinds of particles of the coating solution A for internal scattering layer so as to have a particle ratio and a particle density as shown in Table 2, adjusting the coating amount and changing the film thickness.

Comparative Example 1-10 was prepared in the same preparation method as in Example 1-7, except for changing the amount of addition of the particle of the coating solution B for internal scattering layer so as to have a particle density as shown in Table 2, adjusting the coating amount and changing the film thickness.

TABLE 2

| | Particle A | Particle B | Particle C | Particle density (g/m$^2$) | Thickness (μm) |
|---|---|---|---|---|---|
| Example 1-1 | 45 | | 55 | 1.21 | 7.2 |
| Example 1-2 | 68 | | 32 | 0.9 | 7.2 |
| Example 1-3 | 58 | | 42 | 0.98 | 7.2 |
| Example 1-4 | 31 | | 68 | 1.83 | 7.2 |
| Example 1-5 | 6 | | 94 | 2.44 | 7.2 |
| Example 1-6 | 9 | 91 | | 1.21 | 7.2 |
| Example 1-7 | | 100 | | 0.9 | 5.8 |
| Example 1-8 | | 12 | 84 | 0.98 | 5.8 |
| Example 1-9 | | 83 | 17 | 1.21 | 5.8 |
| Example 1-10 | | 58 | 42 | 1.83 | 5.8 |
| Example 1-11 | | 22 | 78 | 2.44 | 5.8 |
| Example 1-12 | 41 | 59 | | 0.9 | 5.8 |
| Example 1-13 | 40 | 60 | | 0.98 | 5.8 |
| Example 1-14 | 45 | | 55 | 1.21 | 7.2 |
| Comparative Example 1-1 | 75 | | 25 | 1.21 | 7.2 |
| Comparative Example 1-2 | 5 | | 95 | 1.21 | 7.2 |
| Comparative Example 1-3 | 45 | | 55 | 0.7 | 7.2 |
| Comparative Example 1-4 | 45 | | 55 | 3.5 | 7.2 |
| Comparative Example 1-5 | | 26 | 74 | 0.9 | 5.8 |
| Comparative Example 1-6 | | 53 | 47 | 0.9 | 5.8 |
| Comparative Example 1-7 | | 83 | 17 | 0.7 | 5.8 |
| Comparative Example 1-8 | | 83 | 17 | 3.5 | 5.8 |
| Comparative Example 1-9 | 45 | | 55 | 1.21 | 9 |
| Comparative Example 1-10 | | 100 | | 0.9 | 2.9 |

Particle A: Crosslinked poly(styrene) particle having an average particle size of 3.5 μm (refractive index: 1.600)

Particle B: Crosslinked poly(acryl-styrene) particle having an average particle size of 3.5 μm (copolymerization composition ratio: 30/70, refractive index: 1.561)

Particle C: Crosslinked poly(acryl-styrene) particle having an average particle size of 3.5 μm (copolymerization composition ratio: 50/50, refractive index: 1.536)

(Evaluation of Film)

The obtained films were evaluated with respect to the following items. The results are shown in Table 3.

(1) Reflection Photogoniometry:

On one surface of a stack as prepared by sticking a polarizing plate having a smooth surface on both the front and back surfaces of a 1 mm-thick glass plate (MICRO SLIDE GLASS Product No. S9111, manufactured by Matsunami Glass Ind., Ltd.) in a crossed nicols state, the antireflection film of the invention was stuck in a side opposite to the side at which the antireflection layer was coated via an adhesive sheet, thereby preparing a sample piece for measurement. Subsequently, by using "GoniophotoMeter" as manufactured by Murakami color Research Laboratory Co., Ltd., a quantity of light was measured in a light receiver at 0.1° intervals from 90° to 180° to −90° while defining an incident angle as 0°, thereby determining a whole quantity of light $I_a$ as the total sum thereof.

Subsequently, the incident angle was set up at −60°; the quantity of reflected light was measured at 1° intervals in the range of from 40° to 50° against the light having a quantity of incident light $I_0$ while being inclined by −60° against the vertical direction from the low refractive index layer side of the sample piece; a numeral value as to a quantity of reflected light $I^{45°}$ as inclined by 45° was read; and a value of $-LOG_{10}(I^{45°}/I_0)$ at each angle was calculated.

(2) Integral Reflectance:

The back surface of the film was roughed by sand paper and then treated with a black ink. In a state that the back surface was free from reflection, the front surface side was measured for an integral spectral reflectance in a wavelength region of from 380 to 780 nm by using a spectrophotometer (manufactured by JASCO Corporation). For the result, an arithmetical average value of integral reflectance at from 450 to 650 nm was employed.

(3) Mirror Reflectance:

The back surface of the film was roughed by sand paper and then treated with a black ink. In a state that the back surface was free from reflection, the front surface side was measured for a mirror spectral reflectance at an incident angle 5° in a wavelength region of from 380 to 780 nm by using a spectrophotometer (manufactured by JASCO Corporation). For the result, an arithmetical average value of mirror reflectance at from 450 to 650 nm was used.

(4) Haze:

The obtained film was measured for total haze (H), internal haze (Hi) and surface haze (Hs) by the following measurements.

[1] A total haze value (H) of the obtained film was measured in conformity to JIS K7136.

[2] A few drops of silicone oil was added on the front surface of the film in the side of the low refractive index layer and the back surface thereof; the film was sandwiched by two sheets of a glass plate having a thickness of 1 mm (MICRO SLIDE GLASS Product No. S9111, manufactured by Matsunami Glass Ind., Ltd.) from the front and back sides, thereby completely bringing the film into optically intimate contact with the two glass plates; a haze was measured in a state that a surface haze was eliminated; and a value obtained by subtracting a haze as separately measured by putting only silicone oil between two sheets of a glass plate therefrom was calculated as an internal haze (Hi) of the film.

[3] A value obtained by subtracting the internal haze (Hi) as calculated above in [2] from the total haze (H) as measured above in [1] was calculated as a surface haze (Hs).

(4) Image Sharpness:

Transmitted image sharpness was measured by using an optical comb with a slit width of 0.5 mm in conformity to JIS K7105.

(5) Center Line Mean Roughness:

The obtained film was measured for central line mean roughness (Ra) in conformity to JIS B0601.

(6) Reflection:

A face was reflected into a sample piece for photogoniometry measurement, and the strength of a reflected image was evaluated according to the following criteria.

A: Reflection is weak so that the reflection is not conscious.
B: Reflection is strong so that the reflection is conscious.
C: Reflection is very strong so that the reflection is very conscious.

TABLE 3

|  | Integral reflectance (%) | Mirror reflectance (%) | Difference between integral reflectance and mirror reflectance (%) | Internal haze (%) | Surface haze (%) | Total haze (%) | Ra (%) | Reflection |
|---|---|---|---|---|---|---|---|---|
| Example 1-1 | 1.64 | 1.01 | 0.63 | 24.2 | 0.6 | 24.8 | 0.09 | A |
| Example 1-2 | 1.67 | 1.21 | 0.46 | 23.3 | 0.4 | 23.7 | 0.06 | A |
| Example 1-3 | 1.72 | 1.11 | 0.61 | 23.0 | 0.7 | 23.7 | 0.10 | A |
| Example 1-4 | 1.60 | 0.98 | 0.62 | 30.0 | 0.7 | 30.7 | 0.10 | A |
| Example 1-5 | 1.62 | 0.88 | 0.74 | 21.5 | 0.9 | 22.4 | 0.12 | A |
| Example 1-6 | 1.69 | 1.10 | 0.59 | 28.9 | 0.4 | 29.3 | 0.06 | A |
| Example 1-7 | 1.70 | 1.22 | 0.48 | 21.5 | 0.3 | 21.8 | 0.05 | A |
| Example 1-8 | 1.65 | 1.08 | 0.57 | 20.1 | 0.2 | 20.3 | 0.04 | A |

TABLE 3-continued

| | Integral reflectance (%) | Mirror reflectance (%) | Difference between integral reflectance and mirror reflectance (%) | Internal haze (%) | Surface haze (%) | Total haze (%) | Ra (%) | Reflection |
|---|---|---|---|---|---|---|---|---|
| Example 1-9 | 1.68 | 1.07 | 0.61 | 24.4 | 0.6 | 25 | 0.08 | A |
| Example 1-10 | 1.65 | 0.92 | 0.73 | 29.8 | 1.0 | 30.8 | 0.12 | A |
| Example 1-11 | 1.59 | 1.21 | 0.38 | 24.3 | 0.4 | 24.7 | 0.05 | A |
| Example 1-12 | 1.62 | 1.33 | 0.29 | 24.8 | 0.4 | 25.2 | 0.04 | A |
| Example 1-13 | 1.60 | 1.14 | 0.46 | 27.7 | 0.5 | 28.2 | 0.06 | A |
| Example 1-14 | 4.40 | 3.50 | 0.90 | 26.0 | 0.8 | 26.8 | 0.12 | B |
| Comparative Example 1-1 | 1.67 | 1.23 | 0.44 | 42.5 | 0.3 | 42.8 | 0.05 | A |
| Comparative Example 1-2 | 1.66 | 1.35 | 0.31 | 10.1 | 0.4 | 10.4 | 0.06 | A |
| Comparative Example 1-3 | 1.65 | 1.19 | 0.46 | 12.9 | 0.4 | 13.3 | 0.05 | A |
| Comparative Example 1-4 | 1.70 | 1.23 | 0.47 | 68.5 | 0.4 | 68.9 | 0.06 | A |
| Comparative Example 1-5 | 1.69 | 1.06 | 0.63 | 11.2 | 0.8 | 1.2 | 0.10 | A |
| Comparative Example 1-6 | 1.71 | 1.04 | 0.67 | 12.8 | 0.8 | 13.6 | 0.12 | A |
| Comparative Example 1-7 | 1.64 | 0.97 | 0.67 | 12.1 | 0.7 | 12.8 | 0.10 | A |
| Comparative Example 1-8 | 1.65 | 1.02 | 0.63 | 65.4 | 0.7 | 66.1 | 0.08 | A |
| Comparative Example 1-9 | 1.57 | 0.70 | 0.87 | 24.1 | 8.0 | 32.1 | 0.18 | A |
| Comparative Example 1-10 | 1.59 | 0.52 | 1.07 | 20.9 | 15.0 | 35.9 | 0.31 | A |

In all of the samples of Examples 1-1 to 1-13, the transmitted image sharpness was in the range of from 60 to 99%, and the value of $-\text{LOG}_{10}(I^{45°}/I_0)$ fell within the range of from 4.3 to 5.0.

Furthermore, since the sample pieces as used for the photogoniometry were cut by the polarizing plate in which the reflected light on the back surface was orthogonal, the appearance was close to the black display of the panel. The sample pieces of Examples 1-1 to 1-13 were reduced in white blurring by the visual observation and found deeply black. On the other hand, the sample pieces of Comparative Examples 1-9 and 1-10, even a region whose axis was deviated from the vicinity of the mirror reflection was glared white, and the appearance close to white blurring was revealed. The sample piece of Example 1-14 was of practical level with respect to the white blurring and the reflection, but it was inferior to the sample pieces of Examples 1-1 to 1-13 and its result did not show sufficient effect of the invention.

(Preparation of Coating Solution B for Low Refractive Index Layer)

15.2 g of the perfluoroolefin copolymer (1), 2.1 g of a hollow silica sol (refractive index: 1.31, average particle size: 60 nm, solids content: 20%), 0.3 g of reactive silicone X-22-164B (a trade name of Shin-Etsu Chemical Co., Ltd.), 7.3 g of the sol solution (a), 0.76 g of a photopolymerization initiator (IRGACURE 907 (a trade name), manufactured by Ciba Speciality Chemicals), 301 g of methyl ethyl ketone, and 9.0 g of cyclohexanone were added and stirred. Thereafter, the mixture was filtered by a polypropylene-made filter having a pore size of 5 μm, thereby preparing a coating solution B for low refractive index layer. A layer formed from this coating solution had a refractive index of 1.40.

(Preparation of Coating Solution C for Low Refractive Index Layer)

A coating solution C was prepared in the same manner as in the coating solution A, except for decreasing the amount of addition of the OPSTAR JTA113 (heat crosslinking fluorine-containing silicone polymer composition solution (solids content: 6%) as manufactured by JSR Corporation) and increasing the amount of addition of the dispersion A and making a layer formed from this coating solution have a refractive index of 1.36.

(Preparation of Coating Solution D for Low Refractive Index Layer)

13 g of a heat crosslinking fluorine-containing silicone polymer containing a polysiloxane and a hydroxyl group and having a refractive index 1.44 (JTA113, solids content: 6%, manufactured by JSR Corporation), 1.3 g of a colloidal silica dispersion MEK-ST-L (a trade name, average particle size: 45 nm, solids content: 30%, manufactured by Nissan Chemical Industries, Ltd.), 0.6 g of the sol solution (a), 5 g of methyl ethyl ketone, and 0.6 g of cyclohexanone were added and stirred. Thereafter, the mixture was filtered by a polypropylene-made filter having a pore size of 1 μm, thereby preparing a coating solution D for low refractive index layer. A layer formed from this coating solution had a refractive index of 1.45.

Furthermore, antireflection films were prepared in the same manner as in Example 1-1, except for replacing the coating solution A for low refractive index layer with the coating solution C for low refractive index layer. As a result, the integral average reflectance in Examples 1-1 to 1-13 was improved to from 1.1 to 1.3%.

Furthermore, antireflection films were prepared in the same manner as in Example 1-1, except for replacing the coating solution A for low refractive index layer with the coating solution B for low refractive index layer and changing the condition of the drying after coating to at 100° C. for 30 seconds and changing the irradiation dose of ultraviolet rays after coating to 900 mJ/cm². As a result, the integral reflectance was from 1.6 to 1.9%, values of which were slightly larger than those of Examples 1-1 to 1-13. However, since the coating solution C for low refractive index layer also works for the heat hardening, the scar resistance could be improved.

Furthermore, antireflection films were prepared in the same manner as in Example 1-1, except for replacing the coating solution A for low refractive index layer with the coating solution D for low refractive index layer. As a result, the integral reflectance was from 2.6 to 2.9%, values of which were larger than those of Examples 1-1 to 1-13. Though the reflection became small as compared with the case of not using an antireflection film, the prevention of reflection was not sufficient as compared with the case of using other coating solution for low refractive index layer.

Example 2

An 80 μm-thick triacetyl cellulose film (TAC-TD80U, manufactured by Fuji Photo Film Co., Ltd.) which had been dipped in an NaOH aqueous solution of 1.5 moles/L at 55° C. for 2 minutes, neutralized and then washed with water and each of the saponified antireflection films as prepared in Example 1 (Examples 1-1 to 1-14 and Comparative Examples 1-1 to 1-10) were made to adhere for protection to the both surfaces of a polarizer as prepared by adsorbing iodine on polyvinyl alcohol and stretching, thereby preparing a polarizing plate. The thus prepared polarizing plates were designated as Examples 2-1 to 2-14 and Comparative Examples 2-1 to 2-10.

Furthermore, a polarizing plate was prepared by using the foregoing saponified triacetyl cellulose film as a protective film of the both surfaces and was designated as Comparative Example 2-11.

Example 3

(Evaluation of Polarizing Plate)

Each of the polarizing plates of Examples 2-1 to 2-14 and Comparative Examples 2-1 to 2-11 as prepared in Example 2 was stuck in place of a polarizing plate in a viewing side of a liquid crystal television set. As the liquid crystal television set, "LC-37GD4" (MVA mode) as manufactured by Sharp Corporation was used.

The resulting display devices were evaluated with respect to the following items. The results are shown in Table 4.

(1) White Blurring:

With respect to an LCD television panel (VA mode) having a definition and an image size as shown in the table, a polarizing plate of the surface side was replaced by the polarizing plate of this Example; the entire surface was displayed black; a naked fluorescent lamp (8,000 cd/m²) not provided with a louver was reflected from the upper direction at an angle of 60° in a dark room; and in the visual observation from the front, the white light state (white blurring) of the entire face was evaluated according to the following criteria.

A: White blurring is not conscious so that it is preferable.
B: White blurring is barely noted, but it is relatively preferable.
C: White blurring is slightly conscious.
D: White blurring is noticeable so that it is not preferable.

(2) Dark Room Contrast:

By using the LCD panel as prepared above in (1), the front contrast and the contrast in an oblique direction were measured in a dark room. With respect to the contrast in an oblique direction, an average value at a polar angle of 60° in four directions of 45° was employed.

(3) Dark Room Black Display (Visually Inspected)

By using the LCD panel produced in the foregoing (1), black was displayed in a dark room, and was evaluated visually from right front according to the following criterions.

B: Preferable with little light leakage
D: Not preferable with large light leakage (4) White Gradation Loss in Oblique Direction (Visually Inspected)

By using the LCD panel produced in the foregoing (1), a whitish image was displayed in a dark room, and white gradation loss was evaluated visually from a polar angle of 80° in the oblique 45° direction according to the following criterions.

B: White gradation loss is to the degree of not disturbing the observer.
D: White gradation loss is to the degree of disturbing the observer.

(5) Reflection:

A naked fluorescent lamp (8,000 cd/m²) not provided with a louver was reflected on the obtained liquid crystal television set from an angle of 45°, and in the observation from a direction of −45°, a degree of reflection of the fluorescent lamp was evaluated according to the following criteria.

A: No reflection is observed such that the outline of the fluorescent lamp is not substantially noted.
B: The fluorescent lamp is slightly reflected, but it is not conscious.
C: The fluorescent lamp is reflected so that it is conscious.
D: The fluorescent lamp is completely reflected.

TABLE 4

|  | Polarizing plate | White blurring | Front contrast | Contrast in oblique direction | Reflection | White gradation loss in oblique direction | Dark room black display |
|---|---|---|---|---|---|---|---|
| Example 3-1 | Example 2-1 | A | 800 | 46 | B | B | B |
| Example 3-2 | Example 2-2 | A | 800 | 46 | B | B | B |
| Example 3-3 | Example 2-3 | A | 800 | 46 | B | B | B |
| Example 3-4 | Example 2-4 | A | 780 | 47 | B | B | B |

TABLE 4-continued

|  | Polarizing plate | White blurring | Front contrast | Contrast in oblique direction | Reflection | White gradation loss in oblique direction | Dark room black display |
|---|---|---|---|---|---|---|---|
| Example 3-5 | Example 2-5 | B | 810 | 46 | B | B | B |
| Example 3-6 | Example 2-6 | A | 780 | 47 | B | B | B |
| Example 3-7 | Example 2-7 | A | 810 | 46 | B | B | B |
| Example 3-8 | Example 2-8 | A | 810 | 46 | B | B | B |
| Example 3-9 | Example 2-9 | A | 800 | 46 | B | B | B |
| Example 3-10 | Example 2-10 | B | 780 | 47 | B | B | B |
| Example 3-11 | Example 2-11 | A | 800 | 46 | B | B | B |
| Example 3-12 | Example 2-12 | A | 790 | 46 | B | B | B |
| Example 3-13 | Example 2-13 | A | 790 | 47 | B | B | B |
| Example 3-14 | Example 2-14 | C | 795 | 46 | C | B | B |
| Comparative Example 3-1 | Comparative Example 2-1 | A | 750 | 48 | B | B | D |
| Comparative Example 3-2 | Comparative Example 2-2 | A | 840 | 45 | B | D | B |
| Comparative Example 3-3 | Comparative Example 2-3 | A | 830 | 45 | B | D | B |
| Comparative Example 3-4 | Comparative Example 2-4 | A | 650 | 57 | B | B | D |
| Comparative Example 3-5 | Comparative Example 2-5 | A | 840 | 45 | B | D | B |
| Comparative Example 3-6 | Comparative Example 2-6 | B | 830 | 45 | B | D | B |
| Comparative Example 3-7 | Comparative Example 2-7 | A | 840 | 45 | B | D | B |
| Comparative Example 3-8 | Comparative Example 2-8 | A | 660 | 56 | B | B | D |
| Comparative Example 3-9 | Comparative Example 2-9 | D | 800 | 46 | A | B | B |
| Comparative Example 3-10 | Comparative Example 2-10 | D | 810 | 46 | A | B | B |
| Comparative Example 3-11 | Comparative Example 2-11 | A | 880 | 45 | D | D | B |

In Comparative Examples 3-1, 3-4 and 3-8, a reduction of the front contrast was large, and the image appearance was not good. In Comparative Examples 3-2, 3-3 and 3-5 to 3-7, an improvement in the contrast in an oblique direction was not sufficient, and the image appearance was not good. Also, the white color appeared slightly yellowish. Comparative Examples 3-10 and 3-11 were problematic in view of the reflection. In all of Examples 3-1 to 3-13, a reduction of the contrast in the front direction was small; an improvement effect in the contrast in an oblique direction was high, and a display performance of a display was excellent in all directions. Although, in Example 3-14, an improvement effect in the contrast was high same as in Example 3-1, sufficient effects could not be obtained compared to other Examples, in the viewpoint of the white blurring and the reflection.

The following are clear from the results as shown in Table 4.

The antireflection film of the invention is reduced in white blurring in black display and excellent in visibility. Furthermore, when applied to a liquid crystal television set, both a reduction of deterioration in the front contrast and an improvement in the contrast in an oblique direction can be realized.

Example 4

A viewing angle enlargement film (WIDE VIEW FILM SA 12B, manufactured by Fuji Photo Film Co., Ltd.) was used as a protective film in a liquid crystal cell side of a polarizing plate in a viewing side of a transmission type TN liquid crystal cell and as a protective film in a liquid crystal cell side of a polarizing plate in a backlight side. As a result, a liquid crystal display device having a very wide viewing angle in all directions, extremely excellent visibility and high display quality was obtained.

Example 5

The internal scattering layer and the low refractive index layer of Example 1-1 were coated by a bar coating method. A No. 10 bar was used for the internal scattering layer, and a No. 2.9 bar was used for the low refractive index layer. As a result, in the internal scattering layer, stripe-like unevenness in surface properties was caused at a coating rate of 15 m/min or more, and in the low refractive index layer, stripe-like unevenness in surface properties was caused at a coating rate of 20 m/min or more.

This application is based on Japanese Patent application JP 2005-223979, filed Aug. 2, 2005, the entire content of which is hereby incorporated by reference, the same as if set forth at length.

What is claimed is:

1. An optical film comprising: a transparent support; and a layer having internal scattering properties, wherein the optical film has an image sharpness, as measured in an optical comb width of 0.5 mm in conformity to JIS K7105, of from 30.0% to 99.9%, a haze value as caused by surface scattering of not more than 1.0%, and a haze value as caused by internal scattering of from 20 to 32%, wherein the layer having internal scattering properties contains a translucent resin and at least one of a translucent particle and has a thickness of from 3 μm to 12 μm; the translucent particle has a particle size of from 3 to 4 μm and is contained in an amount of from 5 to 30% by weight of a whole of solids contained in the layer having internal scattering properties; the translucent resin has a refractive index falling within the range of 1.52±0.02; and 30% or more of the translucent particle has a difference in refractive index from the translucent resin of 0.008 or more and not more than 0.05.

2. An antireflection film comprising: a transparent support; a layer having internal scattering properties; and a low refractive index layer in this order, wherein the low refractive index layer has a refractive index of at least 0.04 lower than a refractive index of the layer having internal scattering properties, and the antireflection film has an integral reflectance of not more than 3.5%, an image sharpness, as measured in an optical comb width of 0.5 mm in conformity to JIS K7105, of from 30.0% to 99.9%, a haze value as caused by surface scattering of not more than 1.0%, and a haze value as caused by internal scattering of from 20 to 32%, wherein the layer having internal scattering properties contains a translucent resin and at least one of a translucent particle and has a thickness of from 3 μm to 12 μm; the translucent particle has a particle size of from 3 to 4 μm and is contained in an amount of from 5 to 30% by weight of a whole of solids contained in the layer having internal scattering properties; the translucent resin has a refractive index falling within the range of 1.52±0.02; and 30% or more of the translucent particle has a difference in refractive index from the translucent resin of 0.008 or more and not more than 0.05.

3. The antireflection film according to claim 2, wherein the antireflection film has a mirror reflectance of 0.5% or more and not more than 3.3%.

4. The optical film according to claim 1, wherein the optical film has a center line mean roughness Ra of from 0.01 to 0.25 μm and a ten-point mean roughness Rz of five times or more of the center line mean roughness Ra.

5. The antireflection film according to claim 2, wherein the antireflection film has a center line mean roughness Ra of from 0.01 to 0.12 μm and an image sharpness, as measured in an optical comb width of 0.5 mm in conformity to JIS K7105, of from 45.0% to 90.0%; and a quantity of reflected light $I^{45°}$ in a direction inclined at +45° to a quantity of incident light $I_0$ as inclined at −60° against a vertical direction from the low refractive index layer side is satisfied with the following expression (A1):

$$-\mathrm{LOG}_{10}(I^{45}/I_0) \geq 4.3 \quad (A1).$$

6. The optical film according to claim 1, wherein a density of the translucent particle is from 0.8 to 3.2 g/m².

7. The optical film according to claim 1, wherein the translucent particle having a difference in refractive index from the translucent resin of 0.008 or more and not more than 0.05 comprises a crosslinked poly(styrene-acryl) copolymer or a crosslinked acrylic resin and has a mole fraction of acryl component of from 20 to 100% by weight.

8. The optical film according to claim 1, wherein the layer having internal scattering properties is formed by coating a coating composition containing a translucent resin, a translucent particle and at least two solvents on a transparent support, and drying and hardening the coated composition.

9. The antireflection film according to claim 2, wherein the low refractive index layer is a hardened film formed by coating a hardenable composition containing at least two members of (A) a thermally hardenable and/or ionizing radiation hardenable fluorine-containing compound, (B) an inorganic particle, and (C) at least one member selected from an organosilane compound represented by the following formula (I), a hydrolyzate of the organosilane, and a partial condensate of the hydrolyzate of the organosilane, and hardening the coated composition:

$$(R^{10})_m\mathrm{-Si(X)}_{4-m} \quad (1)$$

wherein $R^{10}$ represents a substituted or unsubstituted alkyl group or a substituted or unsubstituted aryl group; X represents a hydroxyl group or a hydrolyzable group; and m represents an integer of from 1 to 3.

10. The antireflection film according to claim 9, wherein the thermally hardenable and/or ionizing radiation hardenable fluorine-containing compound contains a fluorine atom in an amount of from 35 to 80% by weight.

11. The antireflection film according to claim 9, wherein the inorganic particle has an average particle size of 10% or more and not more than 100% of a thickness of the low refractive index layer.

12. The antireflection film according to claim 9, wherein the inorganic particle has a hollow structure within the particle thereof and has a refractive index of from 1.17 to 1.40.

13. The antireflection film according to claim 2, wherein both of the layer having internal scattering properties and the low refractive index layer are a hardened film formed by coating a hardenable coating composition containing at least one of a hydrolyzate of an organosilane represented by the following formula (1) and a partial condensate thereof, and hardening the coated composition:

$$(R^{10})_m\mathrm{-Si(X)}_{4-m} \quad (1)$$

wherein $R^{10}$ represents a substituted or unsubstituted alkyl group or a substituted or unsubstituted aryl group; X represents a hydroxyl group or a hydrolyzable group; and m represents an integer of from 1 to 3.

14. The antireflection film according to claim 2, further comprising a transparent conductive layer between the layer having internal scattering properties and the transparent support, or between the layer having internal scattering properties and the low refractive index layer.

15. The optical film according to claim 1, wherein the optical film further comprises a transparent conductive layer between the layer having internal scattering properties and the transparent support, or comprises a conductive particle within the layer having internal scattering properties.

16. A polarizing plate comprising a polarizing film and two protective films for protecting both surfaces of a front side and a rear side of the polarizing film, wherein at least one of the two protective films is the optical film according to claim 1.

17. The polarizing plate according to claim 16, wherein one of the two protective films is the optical film according to claim 1, and the other of the two protective films is an optical compensating film.

18. An image display device comprising the optical film according to claim 1 or a polarizing plate comprising a polarizing film and two protective films for protecting both surfaces of a front side and a rear side of the polarizing film, wherein at least one of the two protective films is the optical film.

19. A liquid crystal display device comprising a polarizer on both surfaces of a liquid crystal cell and comprising at least one of a retardation compensating element between the liquid crystal cell and the polarizer, wherein the liquid crystal display device further comprises the optical film according to claim 1 on a surface of the liquid crystal display device.

20. A process for producing the optical film according to claim 1, which includes a step for coating a coating composition for the layer having internal scattering properties, which contains a translucent particle, a translucent resin and a solvent, from a slot of a tip lip while making a land of the tip lip of a slot die close to a surface of a web of a continuously running transparent support as supported by a backup roll.

21. A process for producing the antireflection film according to claim 2, which includes a step for coating at least one of: a coating composition for the layer having internal scattering properties, which contains a translucent particle, a translucent resin and a solvent; and a coating composition for the low refractive index layer, from a slot of a tip lip while making a land of the tip lip of a slot die close to a surface of a web of a continuously running transparent support as supported by a backup roll.

* * * * *